US011939255B2

(12) United States Patent
Haley et al.

(10) Patent No.: US 11,939,255 B2
(45) Date of Patent: Mar. 26, 2024

(54) METHOD OF FORMING A WEB FROM FIBROUS MATERIAL

(71) Applicant: Owens Corning Intellectual Capital, LLC, Toledo, OH (US)

(72) Inventors: Glenn Haley, Granville, OH (US); David J. Gaul, Granville, OH (US); Michael T. Pellegrin, Newark, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days.

(21) Appl. No.: 14/279,554

(22) Filed: May 16, 2014

(65) Prior Publication Data

US 2014/0245797 A1     Sep. 4, 2014

Related U.S. Application Data

(60) Division of application No. 13/839,350, filed on Mar. 15, 2013, which is a continuation-in-part of
(Continued)

(51) Int. Cl.
*C03B 37/04* (2006.01)
*C03C 25/1095* (2018.01)
(Continued)

(52) U.S. Cl.
CPC .......... *C03B 37/04* (2013.01); *C03C 25/1095* (2013.01); *D04H 1/4218* (2013.01);
(Continued)

(58) Field of Classification Search
CPC ...... C03B 37/04; D04H 1/498; D04H 1/4374; D04H 1/4218; D04H 1/46; D04H 3/004
See application file for complete search history.

(56) References Cited

U.S. PATENT DOCUMENTS

| 1,827,035 A | 10/1931 | Mottweiler et al. |
| 2,083,132 A | 6/1937 | Williams et al. |
(Continued)

FOREIGN PATENT DOCUMENTS

| CA | 2584932 | 4/2006 |
| CN | 2633912 | 8/2004 |
(Continued)

OTHER PUBLICATIONS

International Search Report and Written Opinion from PCT/US14/28836 dated Aug. 1, 2014.
(Continued)

*Primary Examiner* — Jodi C Franklin
(74) *Attorney, Agent, or Firm* — Calfee, Halter & Griswold LLP

(57) ABSTRACT

Fibrous material webs and methods of making the fibrous material webs. Binderless webs can be formed in a continuous process where fiber material, such as glass is melted and formed into fibers. The fibers are formed into a web of binderless glass fibers or a web with a dry binder. The binderless web or the web with dry binder can be layered and/or the fibers that make up the web can be mechanically entangled, for example, by needling.

8 Claims, 27 Drawing Sheets

Related U.S. Application Data application No. 13/632,895, filed on Oct. 1, 2012, now abandoned.

(60) Provisional application No. 61/541,162, filed on Sep. 30, 2011.

(51) Int. Cl.
| | |
|---|---|
| *D04H 1/4218* | (2012.01) |
| *D04H 1/4374* | (2012.01) |
| *D04H 1/46* | (2012.01) |
| *D04H 1/488* | (2012.01) |
| *D04H 1/498* | (2012.01) |
| *D04H 1/60* | (2006.01) |
| *D04H 1/724* | (2012.01) |
| *D04H 3/004* | (2012.01) |
| *D04H 3/08* | (2006.01) |
| *D04H 13/00* | (2006.01) |

(52) U.S. Cl.
CPC .......... *D04H 1/4374* (2013.01); *D04H 1/46* (2013.01); *D04H 1/488* (2013.01); *D04H 1/498* (2013.01); *D04H 1/60* (2013.01); *D04H 1/724* (2013.01); *D04H 3/004* (2013.01); *D04H 3/08* (2013.01); *D04H 13/008* (2013.01); *Y10T 442/608* (2015.04); *Y10T 442/609* (2015.04); *Y10T 442/667* (2015.04); *Y10T 442/67* (2015.04)

(56) References Cited

U.S. PATENT DOCUMENTS

| | | | | |
|---|---|---|---|---|
| 2,150,040 | A | 3/1939 | Baba et al. | |
| 2,288,072 | A * | 6/1942 | Collins | C04B 26/02 118/63 |
| 2,325,940 | A | 8/1943 | Low | |
| 2,467,291 | A * | 4/1949 | Sheidley | D04H 1/64 156/204 |
| 2,477,555 | A | 7/1949 | Roberts et al. | |
| 2,514,170 | A | 7/1950 | Walter et al. | |
| 2,644,780 | A | 7/1953 | Simkins et al. | |
| 2,671,496 | A * | 3/1954 | Howden | D04H 1/60 264/122 |
| 2,682,085 | A | 6/1954 | Novotny | |
| 2,684,206 | A | 7/1954 | Zettel | |
| 2,736,362 | A | 2/1956 | Slayter et al. | |
| 2,921,342 | A * | 1/1960 | Siefert | C03B 37/06 65/476 |
| 2,931,422 | A * | 4/1960 | Long | C03C 25/14 65/517 |
| 2,936,479 | A * | 5/1960 | Morrison | C03B 37/048 65/356 |
| 3,092,529 | A | 6/1963 | Pearson | |
| 3,338,777 | A * | 8/1967 | Irwin | D04H 1/46 428/362 |
| 3,357,878 | A * | 12/1967 | Newman | D04H 1/54 156/305 |
| 3,388,194 | A * | 6/1968 | Vinicki | D04H 13/00 425/84 |
| 3,608,166 | A | 9/1971 | Gruget | |
| 3,616,928 | A | 11/1971 | Rosenblatt | |
| 3,670,348 | A * | 6/1972 | Irwin | A47C 31/001 5/954 |
| 3,822,764 | A * | 7/1974 | Val | B32B 19/042 442/409 |
| 3,849,223 | A | 11/1974 | Kent | D04H 11/04 156/181 |
| 3,872,044 | A * | 3/1975 | Hervey | C09D 11/102 101/114 |
| 4,006,272 | A | 2/1977 | Sakaguchi et al. | |
| 4,058,386 | A * | 11/1977 | Faulkner | C03B 37/048 425/7 |
| 4,101,185 | A * | 7/1978 | van Esdonk | H01J 9/395 445/26 |
| 4,167,404 | A | 9/1979 | Loeffler et al. | |
| 4,237,180 | A | 12/1980 | Jaskowski | |
| 4,263,033 | A | 4/1981 | Michalek | |
| 4,266,960 | A | 5/1981 | Scott et al. | |
| 4,279,610 | A | 7/1981 | Reba | |
| 4,300,931 | A | 11/1981 | Phillips | |
| 4,354,986 | A * | 10/1982 | Maczuga | H01M 50/489 264/518 |
| 4,361,619 | A * | 11/1982 | Forsten | D04H 1/43835 442/403 |
| 4,368,755 | A * | 1/1983 | King | F04B 39/102 137/512.3 |
| 4,390,574 | A * | 6/1983 | Wood | D04H 1/48 428/36.1 |
| 4,442,585 | A | 4/1984 | McGehee | |
| 4,466,151 | A * | 8/1984 | Barch | B05C 17/0207 2/167 |
| 4,468,504 | A * | 8/1984 | Kuemmel | C08K 5/55 528/254 |
| 4,472,328 | A | 9/1984 | Sugimoto et al. | |
| 4,514,450 | A * | 4/1985 | Nowobilski | B32B 15/14 220/592.27 |
| 4,518,408 | A * | 5/1985 | Bhatti | C03B 37/0805 228/174 |
| 4,522,673 | A | 6/1985 | Fell et al. | |
| 4,522,876 | A * | 6/1985 | Hiers | B32B 5/06 55/DIG. 35 |
| 4,550,045 | A * | 10/1985 | Hutson | D04B 23/10 428/102 |
| 4,556,082 | A | 12/1985 | Riley et al. | |
| 4,671,979 | A | 6/1987 | Adiletta | |
| 4,703,604 | A | 11/1987 | Muller | |
| 4,847,140 | A | 7/1989 | Jaskowski | |
| 48,889,764 | | 12/1989 | Chenoweth et al. | |
| 4,923,547 | A * | 5/1990 | Yamaji | D04H 1/558 156/181 |
| 4,946,738 | A | 8/1990 | Chenoweth et al. | |
| 4,971,604 | A | 11/1990 | Dockrell | |
| 5,093,069 | A * | 3/1992 | Mellem | D04H 1/4209 264/510 |
| 5,139,839 | A | 8/1992 | Lim | |
| 5,221,371 | A | 6/1993 | Miller | |
| 5,236,754 | A | 8/1993 | McBride et al. | |
| 5,272,000 | A | 12/1993 | Chenoweth et al. | |
| 5,277,955 | A | 1/1994 | Schelhorn et al. | |
| 5,302,332 | A | 4/1994 | Simola et al. | |
| 5,318,644 | A | 6/1994 | McBride | |
| 5,352,260 | A * | 10/1994 | Carlson | C03B 37/04 65/480 |
| 5,374,477 | A | 12/1994 | Lawless | |
| 5,454,145 | A | 10/1995 | Wattel et al. | |
| 5,458,822 | A * | 10/1995 | Bakhshi | D01D 5/18 264/211.1 |
| 5,468,572 | A | 11/1995 | Zguris et al. | |
| 5,486,401 | A | 1/1996 | Grant et al. | |
| 5,500,305 | A | 3/1996 | Bridges et al. | |
| 5,508,079 | A | 4/1996 | Grant et al. | |
| 5,509,953 | A | 4/1996 | Gavin | |
| 5,533,242 | A | 7/1996 | Profe | |
| 5,551,212 | A | 9/1996 | Odenthal | |
| 5,571,610 | A * | 11/1996 | Loftus | B29B 15/12 428/297.4 |
| 5,595,585 | A * | 1/1997 | Aschenbeck | D04H 1/74 65/505 |
| 5,601,629 | A | 2/1997 | Helbing | |
| 5,603,743 | A * | 2/1997 | Aschenbeck | D04H 1/72 65/459 |
| 5,605,556 | A * | 2/1997 | Aschenbeck | D04H 1/72 65/459 |
| 5,609,934 | A * | 3/1997 | Fay | D04H 1/54 65/102 |
| 5,614,132 | A | 3/1997 | Bakhshi et al. | |
| 5,618,327 | A | 4/1997 | Aschenbeck et al. | |
| 5,618,328 | A | 4/1997 | Lin et al. | |
| 5,620,497 | A | 4/1997 | Aschenbeck et al. | |

(56) References Cited

U.S. PATENT DOCUMENTS

| | | |
|---|---|---|
| 5,620,541 A | 4/1997 | Herzberg |
| 5,622,903 A | 4/1997 | Rapp et al. |
| 5,629,089 A | 5/1997 | Berdan et al. |
| 5,641,368 A | 6/1997 | Romes |
| 5,646,908 A | 7/1997 | Aschenbeck et al. |
| 5,649,343 A | 7/1997 | Profe |
| 5,666,780 A | 9/1997 | Romes et al. |
| 5,672,429 A | 9/1997 | Berdan, II et al. |
| 5,674,307 A | 10/1997 | Huey et al. |
| 5,679,126 A | 10/1997 | Loftus et al. |
| 5,698,304 A | 12/1997 | Brandon et al. |
| 5,733,624 A | 3/1998 | Syme et al. |
| 5,736,475 A | 4/1998 | Bakshi et al. |
| 5,755,851 A | 5/1998 | Scott et al. |
| 5,755,900 A | 5/1998 | Weir et al. |
| 5,786,082 A * | 7/1998 | Evans .................. E04B 1/7604 65/438 |
| 5,871,830 A | 2/1999 | Miller |
| 5,873,150 A | 2/1999 | Gerard |
| 5,876,529 A * | 3/1999 | Grant .................. D01D 5/18 156/62.4 |
| 5,879,615 A | 3/1999 | Miller |
| 5,900,206 A | 5/1999 | Pellegrin et al. |
| 5,906,669 A * | 5/1999 | Tonder .................. C03B 37/055 65/455 |
| 5,918,436 A | 7/1999 | Alderman |
| 5,972,434 A * | 10/1999 | Kajander .................. C03C 25/26 427/372.2 |
| 5,972,500 A * | 10/1999 | Gross .................. C03B 37/022 428/370 |
| 5,979,131 A | 11/1999 | Remmele |
| 5,980,680 A | 11/1999 | Miller |
| 5,983,586 A | 11/1999 | Berdan, II et al. |
| 6,071,641 A | 6/2000 | Zguris |
| 6,071,651 A | 6/2000 | Forte et al. |
| 6,108,879 A | 8/2000 | Forte et al. |
| 6,113,818 A | 9/2000 | Pellegrin et al. |
| 6,135,747 A | 10/2000 | Syme et al. |
| 6,151,763 A | 11/2000 | Kruszewski |
| 6,161,763 A | 11/2000 | Kruszewski |
| 6,227,009 B1 | 5/2001 | Cusick et al. |
| 6,244,075 B1 | 6/2001 | Patel et al. |
| 6,357,504 B1 | 3/2002 | Patel et al. |
| 6,399,694 B1 | 6/2002 | McGrath et al. |
| 6,564,437 B2 | 5/2003 | Meng et al. |
| 6,635,329 B1 | 10/2003 | Arndt et al. |
| 6,645,598 B2 | 11/2003 | Alderman |
| 6,669,265 B2 | 12/2003 | Tilton et al. |
| 6,735,835 B2 | 5/2004 | Wong |
| 6,776,013 B2 | 8/2004 | Butler |
| 6,794,321 B2 * | 9/2004 | Bauer .................. C03C 13/00 501/36 |
| 6,852,391 B2 | 2/2005 | Kannankeril |
| 6,854,166 B2 | 2/2005 | Mohammadi |
| 6,857,238 B2 | 2/2005 | Alderman |
| 6,881,467 B2 | 4/2005 | Jung et al. |
| 6,905,563 B2 | 6/2005 | Dong |
| 6,984,709 B2 | 1/2006 | Meltzer et al. |
| 7,097,728 B2 | 8/2006 | Kissell et al. |
| 7,148,160 B2 | 12/2006 | Porter |
| 7,159,620 B2 | 1/2007 | Kissell |
| 7,252,868 B2 | 8/2007 | Suda |
| 7,264,422 B2 | 9/2007 | Hasselbach et al. |
| 7,281,622 B2 * | 10/2007 | Qi .................. B65G 57/32 53/450 |
| 7,294,218 B2 | 11/2007 | Haque et al. |
| 7,329,456 B2 | 2/2008 | Tilton et al. |
| 7,493,679 B2 | 2/2009 | Meadows |
| 7,509,714 B2 | 3/2009 | Rocher et al. |
| 7,726,518 B2 | 6/2010 | Brouwer |
| 7,730,685 B1 | 6/2010 | Keene |
| 7,780,886 B2 | 8/2010 | Lembo |
| 7,842,631 B2 * | 11/2010 | Tucker .................. C03C 13/06 501/36 |
| 7,954,618 B2 | 6/2011 | Fischer |
| 7,958,752 B2 | 6/2011 | Yokoo et al. |
| 8,104,311 B2 * | 1/2012 | Baker .................. C03B 37/045 65/459 |
| 8,156,703 B2 | 4/2012 | Alderman |
| 8,245,381 B2 * | 8/2012 | Potter .................. F24F 13/0263 29/458 |
| 8,322,111 B2 | 12/2012 | Near et al. |
| 8,402,961 B2 | 3/2013 | Choudhary et al. |
| 8,404,330 B2 | 3/2013 | Bletsos et al. |
| 8,453,393 B2 | 6/2013 | Schroth et al. |
| 8,549,806 B2 | 10/2013 | Snyder |
| 8,613,181 B2 | 12/2013 | Jay et al. |
| 8,621,799 B2 | 1/2014 | Sade |
| 8,650,913 B2 * | 2/2014 | Chacko .................. D04H 1/49 65/459 |
| 8,652,288 B2 * | 2/2014 | Blinkhorn .................. D04H 1/485 156/308.2 |
| 8,741,393 B2 | 6/2014 | Brabbs |
| 8,753,672 B2 * | 6/2014 | Hassingboe .................. D01F 4/00 424/445 |
| 8,753,732 B2 | 6/2014 | Jorgensen |
| 8,793,952 B2 | 8/2014 | Olang |
| 8,806,825 B2 | 8/2014 | Egan et al. |
| 8,882,483 B2 | 11/2014 | O'Leary |
| 8,966,843 B2 | 3/2015 | Paul et al. |
| 9,366,023 B2 | 6/2016 | Ciuperca |
| 9,487,953 B2 * | 11/2016 | Nagarajan .................. B32B 17/02 |
| 9,938,712 B2 * | 4/2018 | Potter .................. C03B 37/048 |
| 10,703,668 B2 * | 7/2020 | Haley .................. C03C 25/1095 |
| 11,192,986 B2 * | 12/2021 | Albani .................. C08K 3/28 |
| 11,292,742 B2 * | 4/2022 | Rich .................. C03C 4/20 |
| 11,428,361 B2 * | 8/2022 | Gawryla .................. B32B 5/02 |
| 11,813,833 B2 * | 11/2023 | Grant .................. E04B 1/7604 |
| 2002/0116793 A1 * | 8/2002 | Schmidt .................. D01G 25/00 19/296 |
| 2003/0008214 A1 * | 1/2003 | Zguris .................. H01M 50/44 429/251 |
| 2003/0022580 A1 | 1/2003 | Bogrett et al. |
| 2003/0039793 A1 | 2/2003 | Tilton et al. |
| 2003/0082369 A1 | 5/2003 | Arndt |
| 2003/0208891 A1 * | 11/2003 | Mohammadi .................. D04H 1/46 28/103 |
| 2004/0000112 A1 | 1/2004 | Alderman |
| 2004/0053003 A1 * | 3/2004 | Coates .................. D04H 1/58 428/98 |
| 2004/0059010 A1 | 3/2004 | Nutt et al. |
| 2004/0121110 A1 | 6/2004 | Schmidt et al. |
| 2004/0163345 A1 | 8/2004 | Alderman |
| 2004/0163724 A1 | 8/2004 | Trabbold |
| 2004/0180176 A1 | 9/2004 | Rusek, Jr. |
| 2004/0217507 A1 * | 11/2004 | Yang .................. C03C 25/26 264/129 |
| 2005/0016418 A1 * | 1/2005 | Holbek .................. C03C 25/42 106/602 |
| 2005/0026527 A1 | 2/2005 | Schmidt et al. |
| 2005/0118390 A1 | 6/2005 | Wagner |
| 2005/0124255 A1 | 6/2005 | Mohammadi |
| 2005/0233107 A1 | 10/2005 | Hartman |
| 2006/0010454 A1 * | 1/2006 | Napoli .................. G06T 15/00 719/328 |
| 2006/0035054 A1 | 2/2006 | Stephanian |
| 2006/0090958 A1 * | 5/2006 | Coates .................. G10K 11/168 181/290 |
| 2006/0201493 A1 | 9/2006 | Chacko et al. |
| 2006/0204737 A1 | 9/2006 | Ziegler |
| 2006/0281622 A1 | 12/2006 | Maricourt |
| 2007/0004306 A1 | 1/2007 | Leeser |
| 2007/0014995 A1 * | 1/2007 | Chacko .................. C03C 25/34 65/447 |
| 2007/0017625 A1 | 1/2007 | Otaki et al. |
| 2007/0060005 A1 | 3/2007 | Yang |
| 2007/0101561 A1 | 5/2007 | Rocher |
| 2007/0254548 A1 | 11/2007 | Meadows |
| 2008/0246379 A1 | 10/2008 | Choudhary et al. |
| 2008/0280131 A1 | 11/2008 | Chacko et al. |
| 2008/0311367 A1 | 12/2008 | Mohammadi |
| 2009/0060800 A1 | 3/2009 | Fernandes, Jr. |

(56) References Cited

U.S. PATENT DOCUMENTS

| | | | |
|---|---|---|---|
| 2009/0098358 A1 | 4/2009 | Murakami | |
| 2009/0107068 A1 | 4/2009 | Fay et al. | |
| 2009/0140097 A1 | 6/2009 | Collier et al. | |
| 2009/0258559 A1* | 10/2009 | Anantharamaiah | D04H 1/74 442/334 |
| 2009/0286059 A1 | 11/2009 | Ogawa et al. | |
| 2010/0000170 A1* | 1/2010 | Parks | B32B 7/06 52/746.1 |
| 2010/0007135 A1 | 1/2010 | Lee | |
| 2010/0031584 A1 | 2/2010 | Wagner | |
| 2010/0147032 A1 | 6/2010 | Chacko et al. | |
| 2010/0151223 A1 | 6/2010 | Chacko et al. | |
| 2010/0154338 A1 | 6/2010 | Riccelli et al. | |
| 2010/0260997 A1* | 10/2010 | Aubourg | F16L 59/153 138/146 |
| 2010/0307198 A1 | 12/2010 | Knapp et al. | |
| 2011/0016875 A1 | 1/2011 | Tsypkaykin et al. | |
| 2011/0091710 A1* | 4/2011 | Mirth | E04B 1/7662 428/297.4 |
| 2011/0150715 A1 | 6/2011 | Kumar | |
| 2011/0206897 A1 | 8/2011 | Warren et al. | |
| 2011/0287216 A1 | 11/2011 | Groft | |
| 2011/0312237 A1 | 12/2011 | Meltzer | |
| 2013/0052401 A1 | 2/2013 | Snyder et al. | |
| 2013/0084445 A1 | 4/2013 | Haley | |
| 2013/0115842 A1 | 5/2013 | Squires et al. | |
| 2013/0295303 A1 | 7/2013 | Parks et al. | |
| 2013/0266784 A1 | 10/2013 | Haley | |
| 2014/0041330 A1 | 2/2014 | McClure | |
| 2014/0099851 A1 | 4/2014 | Haley | |
| 2014/0144539 A1 | 5/2014 | Niwa et al. | |
| 2014/0248815 A1 | 9/2014 | Haley | |
| 2014/0364031 A1 | 12/2014 | Haley | |
| 2015/0118434 A1 | 4/2015 | Nagarajan | |
| 2015/0247270 A1 | 9/2015 | Thaxton | |
| 2015/0361653 A1 | 12/2015 | Grant | |
| 2021/0179485 A1* | 6/2021 | Yokota | C03C 3/087 |

FOREIGN PATENT DOCUMENTS

| | | | |
|---|---|---|---|
| CN | 2572395 | 1/2006 | |
| CN | 101460304 | 6/2009 | |
| EP | 648286 | 4/1995 | |
| EP | 682134 A2 | 11/1995 | |
| EP | 0682134 A2 * | 11/1995 | D04H 1/70 |
| EP | 1111113 | 6/2001 | |
| EP | 1116810 | 7/2001 | |
| EP | 889981 | 11/2001 | |
| EP | 947011 | 12/2001 | |
| EP | 1178161 | 2/2002 | |
| EP | 1236818 | 9/2002 | |
| EP | 1048887 | 1/2003 | |
| EP | 928346 | 5/2003 | |
| EP | 1086054 | 11/2004 | |
| EP | 1650022 | 4/2006 | |
| EP | 1669485 | 6/2006 | |
| EP | 1200659 | 10/2006 | |
| EP | 1595980 | 6/2007 | |
| EP | 1564338 | 11/2007 | |
| EP | 1950184 | 8/2008 | |
| EP | 2065534 | 6/2009 | |
| EP | 2536893 | 12/2012 | |
| FR | 2357353 | 2/1978 | |
| GB | 1604680 A * | 12/1981 | B01D 17/0208 |
| GB | 2089382 A * | 6/1982 | D04H 1/46 |
| GB | 2368814 | 5/2002 | |
| IN | 6054/DENP/2011 | 10/2013 | |
| JP | 52-124977 | 10/1977 | |
| JP | H0171298 U | 5/1989 | |
| JP | H03-041296 A | 2/1991 | |
| JP | 06-330599 | 11/1994 | |
| JP | 2006-002429 A | 1/2006 | |
| JP | 2007-239143 | 9/2007 | |
| JP | 2008-019534 | 1/2008 | |
| JP | 2010-196220 | 9/2010 | |
| JP | 2010276184 A | 12/2010 | |
| JP | 2011-026755 | 2/2011 | |
| JP | 2011085306 A | 4/2011 | |
| JP | 2011181258 A | 9/2011 | |
| WO | 89/10513 A1 | 11/1989 | |
| WO | 94/001608 | 1/1994 | |
| WO | 95/030036 | 11/1995 | |
| WO | 96/09427 | 3/1996 | |
| WO | 97/032069 | 9/1997 | |
| WO | 97/45259 | 12/1997 | |
| WO | 98/012759 | 3/1998 | |
| WO | 98/013541 | 4/1998 | |
| WO | 99/051535 | 10/1999 | |
| WO | 01/009420 | 2/2001 | |
| WO | 01/023312 | 4/2001 | |
| WO | WO-02059412 A2 * | 8/2002 | B32B 5/26 |
| WO | 04/044028 | 5/2004 | |
| WO | 04/082932 | 9/2004 | |
| WO | 2005/024107 | 3/2005 | |
| WO | 05/071176 | 8/2005 | |
| WO | 05/087868 | 9/2005 | |
| WO | 06/240013 | 3/2006 | |
| WO | 2006059752 A1 | 6/2006 | |
| WO | 07/008412 | 1/2007 | |
| WO | 2010/002958 | 1/2010 | |
| WO | 2010049164 | 5/2010 | |
| WO | 11/100751 | 8/2011 | |
| WO | 2014144427 A1 | 9/2014 | |

OTHER PUBLICATIONS

Office action from U.S. Appl. No. 13/632,895 dated Feb. 13, 2015.
Office action from U.S. Appl. No. 13/839,350 dated Feb. 11, 2015.
Office action from New Zealand Application No. 623,187 dated Jan. 27, 2015.
International Search Report and Written Opinion from PCT/US12/58339 dated Jan. 4, 2013.
Office action from U.S. Appl. No. 13/632,895 dated Jun. 5, 2014.
Office action from U.S. Appl. No. 13/839,350 dated Jun. 9, 2014.
Examiner's Answer from U.S. Appl. No. 13/632,895 dated Mar. 25, 2016.
http://www.mathgoodies.com/lessons/decimals/read_write.html., accessed Mar. 2, 2016.
Examiner's Answer from U.S. Appl. No. 13/839,350 dated Mar. 25, 2016.
Office Action from U.S. Appl. No. 14/101,680 dated Apr. 13, 2016.
Office Action from Chinese Application No. 201280058632.2 dated Aug. 5, 2015.
Communication from European Application No. 12836804.0 dated May 29, 2015.
Communication from European Application No. 14765782.9 dated Oct. 23, 2015.
Office Action from Chinese Application No. 201280058632.2 dated Apr. 11, 2016.
Guoliang, Xin, "Building Materials and Non-Metallic Mineral Products", pp. 307-308, China Material Press, Feb. 29, 1988.
Office action from U.S. Appl. No. 14/719,447 dated Nov. 17, 2015.
Office action from U.S. Appl. No. 14/719,447 dated May 20, 2016.
DuPont Tyvek brochure, Understanding High Perm vs. Low Perm, 6 pgs., copyright 2007.
Owens Corning PinkWrap Housewrap, the brand trusted to protect your home from moisture and the elements, brochure, 4 pgs., printed Feb. 2009.
Office action from U.S. Appl. No. 13/839,350 dated Aug. 19, 2016.
Office action from U.S. Appl. No. 14/101,680 dated Aug. 22, 2016.
Office action from U.S. Appl. No. 13/632,895 dated Aug. 22, 2016.
Advisory action from U.S. Appl. No. 14/719,447 dated Aug. 8, 2016.
International Search Report and Written Opinion from PCT/US16/31715 dated Aug. 8, 2016.
Office action from U.S. Appl. No. 14/465,908 dated Sep. 2, 2016.
Office action from Chinese Application No. 20140026976.4 dated Aug. 29, 2016.

(56) References Cited

OTHER PUBLICATIONS

Search Report from European Application No. 14765782.9 dated Aug. 26, 2016.
Office action from Japanese Application No. 2014-533481 dated Sep. 28, 2016.
Office action from U.S. Appl. No. 14/719,447 dated Sep. 21, 2016.
Office action from U.S. Appl. No. 13/632,895 dated Jan. 27, 2017.
Office action from U.S. Appl. No. 13/839,350 dated Jan. 26, 2017.
Office action from U.S. Appl. No. 14/101,680 dated Jan. 26, 2017.
Office action from U.S. Appl. No. 14/279,566 dated Jan. 27, 2017.
Office action from U.S. Appl. No. 14/465,908 dated Apr. 13, 2017.
Office action from U.S. Appl. No. 14/719,447 dated Apr. 3, 2017.
Office action from Chinese Application No. 201280058632.2 dated Dec. 14, 2016.
Office action from Chinese Application No. 201480026976.4 dated Mar. 22, 2017.
Search Report from European Application No. 16186016.8 dated Nov. 29, 2016 received on Feb. 24, 2017.
Office action from Chinese Application No. 201280058632.2 dated May 10, 2017.
Office action from U.S. Appl. No. 14/279,566 dated Jun. 2, 2017.
Office action from Japanese Application No. 2014-533481 dated Apr. 14, 2017.
Interview Summary from U.S. Appl. No. 13/839,350 dated May 9, 2017.
Office action from U.S. Appl. No. 13/839,350 dated Jun. 30, 2017.
Office action from U.S. Appl. No. 13/632,895 dated Jun. 29, 2017.
Office action from U.S. Appl. No. 14/101,680 dated Jun. 28, 2017.
Notice of Opposition from European Application No. 12836804.0 dated Jul. 5, 2017.
Office action from U.S. Appl. No. 14/465,908 dated Aug. 25, 2017.
Office action from U.S. Appl. No. 14/715,849 dated Sep. 8, 2017.
Office action from Chinese Application No. 201480026976.4 dated Sep. 17, 2017.
Office action from Chinese Application No. 201280058632.2 dated Sep. 22, 2017.
Office action from U.S. Appl. No. 14/279,566 dated Nov. 3, 2017.
Interview Summary from U.S. Appl. No. 13/839,350 dated Oct. 2, 2017.
Interview Summary from U.S. Appl. No. 13/632,895 dated Oct. 3, 2017.
Communication from European Application No. 14765782.9 dated Aug. 2, 2017.
Office action from Chinese Application No. 201280058632.2 dated Oct. 24, 2017 along with English translation of relevant portions of action.
Office action from U.S. Appl. No. 13/632,895 dated May 30, 2018.
Office action from U.S. Appl. No. 13/839,350 dated May 31, 2018.
Office action from U.S. Appl. No. 14/101,680 dated May 31, 2018.
Office action from U.S. Appl. No. 14/279,566 dated May 30, 2018.
Midha et al., "Bulk and physical properties of needle-punched nonwoven fabrics," Jun. 2005, Indian Journal of Fibre and Textile Research, vol. 30, pp. 218-229.
Office action from U.S. Appl. No. 13/632,895 dated Dec. 29, 2017.
Office action from U.S. Appl. No. 13/839,350 dated Dec. 29, 2017.
Office action from U.S. Appl. No. 14/101,680 dated Feb. 9, 2018.
Office action from U.S. Appl. No. 14/465,908 dated Feb. 23, 2018.
Office action from U.S. Appl. No. 14/715,849 dated Feb. 23, 2018.
Office action from U.S. Appl. No. 15/722,144 dated Dec. 28, 2017.
Communication from European Application No. 16186016.8 dated Feb. 27, 2018.
Office action from Japanese Application No. 2016-502916 dated Apr. 2, 2018.
Office action from U.S. Appl. No. 14/465,908 dated Aug. 27, 2018.
Office action from U.S. Appl. No. 14/715,849 dated Aug. 10, 2018.
Office action from U.S. Appl. No. 15/722,144 dated Jul. 5, 2018.
Office action from Canadian application No. 2,850,215 dated Jul. 26, 2018.
Office action from Korean Application No. 10-2014-7011613 dated Sep. 17, 2018.
Office action from Chinese Application No. 201480026976.4 dated Sep. 20, 2018.
Office action from U.S. Appl. No. 14/715,849 dated Dec. 28, 2018.
Office action from U.S. Appl. No. 15/722,144 dated Dec. 3, 2018.
Office action from Chinese Application No. 201680036686.7 dated Dec. 17, 2018.
Extend European Search Report from European Application No. 16796951.8 dated Dec. 6, 2018.
Office action from Chinese Application No. 201480026976.4 dated Dec. 26, 2018.
Communication from European Application No. 16186016.8 dated Jan. 15, 2019.
Office action from U.S. Appl. No. 13/632,895 dated May 16, 2019.
Office action from U.S. Appl. No. 14/101,680 dated May 16, 2019.
Office action from U.S. Appl. No. 14/279,566 dated May 31, 2019.
Office action from U.S. Appl. No. 14/715,849 dated May 31, 2019.
Office action from Chinese Application No. 201680036686.7 dated Jul. 11, 2019.
Office action from Brazilian Application No. BR112014007777-0 dated Jul. 29, 2019.
Office action from U.S. Appl. No. 13/839,350 dated Apr. 5, 2019.
Office action from U.S. Appl. No. 14/279,566 dated Feb. 8, 2019.
Office action from U.S. Appl. No. 14/465,908 dated Apr. 8, 2019.
Extend European Search Report from European Application No. 18190560.5 dated Apr. 11, 2019.
Office action from U.S. Appl. No. 13/632,895 dated Jan. 9, 2020.
Office action from U.S. Appl. No. 13/839,350 dated Sep. 6, 2019.
Office action from U.S. Appl. No. 14/101,680 dated Oct. 7, 2019.
Office action from U.S. Appl. No. 14/279,566 dated Jan. 23, 2020.
Office action from U.S. Appl. No. 14/465,908 dated Sep. 6, 2019.
Office action from U.S. Appl. No. 14/715,849 dated Dec. 9, 2019.
Office action from Chinese Application No. 201680036686.7 dated Dec. 6, 2019.
Office action from Korean Application No. 10-2019-7015737 dated Sep. 2, 2019.
Office action from U.S. Appl. No. 13/632,895 dated May 29, 2020.
Office action from U.S. Appl. No. 14/279,566 dated May 29, 2020.
Office action from U.S. Appl. No. 14/715,849 dated May 14, 2020.
Office action from Chinese Application No. 201810382145.0 dated Jun. 2, 2020.
Office action from Korean Application No. 10-2019-7015737 dated Apr. 28, 2020.
Notice of Allowance from U.S. Appl. No. 14/101,680 dated Mar. 10, 2020.
Office action from U.S. Appl. No. 14/465,908 dated Mar. 5, 2020.
Communication from European Application No. 16186016.8 dated Feb. 5, 2020.
Communication from European Application No. 18190560.5 dated Feb. 5, 2020.
Office action from U.S. Appl. No. 13/632,895 dated Nov. 12, 2020.
Office action from U.S. Appl. No. 14/279,566 dated Nov. 12, 2020.
Office action from U.S. Appl. No. 14/715,849 dated Oct. 5, 2020.
Office action from Chinese Application No. 201680036686.7 dated Nov. 2, 2020.
Office action from Korean Application No. 10-2019-7015737 dated Oct. 29, 2020.
Office action from U.S. Appl. No. 13/839,350 dated Aug. 4, 2020.
Office action from U.S. Appl. No. 14/465,908 dated Aug. 6, 2020.
Office action from Chinese Application No. 201680036686.7 dated Jul. 16, 2020.
Office action from Japanese Application No. 2017-560142 dated Jun. 29, 2020.
Office action from U.S. Appl. No. 14/465,908 dated Jan. 21, 2021.
Communication from European Application No. 18190560.5 dated Nov. 26, 2020.
Office action from U.S. Appl. No. 13/632,895 dated Jul. 21, 2021.
Office action from U.S. Appl. No. 13/839,350 dated Jul. 21, 2021.
Office action from U.S. Appl. No. 14/279,566 dated Aug. 10, 2021.
Office action from U.S. Appl. No. 14/465,908 dated Jul. 21, 2021.
Office action from Brazilian Application No. BR112014007777-0 dated Jun. 28, 2021.
Communication from European Application No. 21151479.9 dated Jun. 15, 2021.

(56) References Cited

OTHER PUBLICATIONS

Office action from Japanese Application No. 2020-123477 dated Jun. 14, 2021.
Office action from U.S. Appl. No. 13/839,350 dated Mar. 16, 2021.
Office action from U.S. Appl. No. 14/715,849 dated Apr. 21, 2021.
Office action from Brazilian Application No. BR112014007777-0 dated Mar. 2, 2021.
Office action from Japanese Application No. 2017-560142 dated Apr. 22, 2021.
Office action from U.S. Appl. No. 13/632,895 dated Jan. 28, 2022.
Office action from U.S. Appl. No. 14/279,566 dated Jan. 14, 2022.
Office action from U.S. Appl. No. 14/465,908 dated Jan. 14, 2022.
Communication from European Application No. 18190560.5 dated Jan. 17, 2022.
Office action from Japanese Application No. 2017-560142 dated Dec. 6, 2021.
Office action from Korean Application No. 10-2021-7036876 dated Jan. 5, 2022.
Definition of "adjacent" available at www.dictionary.com/browse/adjacent, accessed on Jan. 11, 2022.
Office action from U.S. Appl. No. 13/839,350 dated Mar. 30, 2022.
Office action from U.S. Appl. No. 14/715,849 dated Mar. 30, 2022.
Office action from Chinese Application No. 201911250197.3 dated Mar. 15, 2022.
Communication from European Application No. 16796951.8 dated Mar. 2, 2022.
Office action from Japanese Application No. 2017-560142 dated May 11, 2022.
Office action from Mexican Application No. 17/14795 dated Apr. 22, 2022.
"Handbook of Flame Retardant Materials", edited by Yu Yongzhong et al., Mass Press, Mar. 1997, pp. 718-721.
Office action from Chinese Application No. 201911250197.3 dated Aug. 4, 2021.
Office action from U.S. Appl. No. 13/632,895 dated Aug. 24, 2022.
Office action from U.S. Appl. No. 14/279,566 dated Jul. 13, 2022.
Office action from U.S. Appl. No. 14/465,908 dated Aug. 4, 2022.
Office action from U.S. Appl. No. 14/715,849 dated Sep. 15, 2022.
Board Opinion from Chinese Application No. 201680036686.7 dated Jun. 28, 2022.
Board Opinion from Chinese Application No. 201680036686.7 dated Aug. 12, 2022.
Rejection Decision from Chinese Application No. 201911250197.3 dated Aug. 3, 2022.
Office action from U.S. Appl. No. 13/839,350 dated Oct. 6, 2022.
Office action from Canadian application No. 2,986,000 dated Sep. 29, 2022.
Office action from U.S. Appl. No. 14/279,566 dated Jan. 12, 2023.
Communication from European Application No. 21151479.9 dated Jan. 3, 2023.
Office action from Korean Application No. 10-2017-7036457 dated Dec. 23, 2022.
Office action from U.S. Appl. No. 13/839,350 dated Mar. 15, 2023.
Office action from U.S. Appl. No. 14/465,908 dated Feb. 8, 2023.
Office action from U.S. Appl. No. 14/715,849 dated Feb. 8, 2023.
Office action from Japanese Application No. 2022-040079 dated Feb. 20, 2023.
Office action from U.S. Appl. No. 14/279,566 dated Jul. 6, 2023.
Office action from U.S. Appl. No. 14/465,908 dated Jul. 19, 2023.
Office action from U.S. Appl. No. 14/715,849 dated Aug. 2, 2023.
Office action from U.S. Appl. No. 13/839,350 dated Sep. 21, 2023.

* cited by examiner

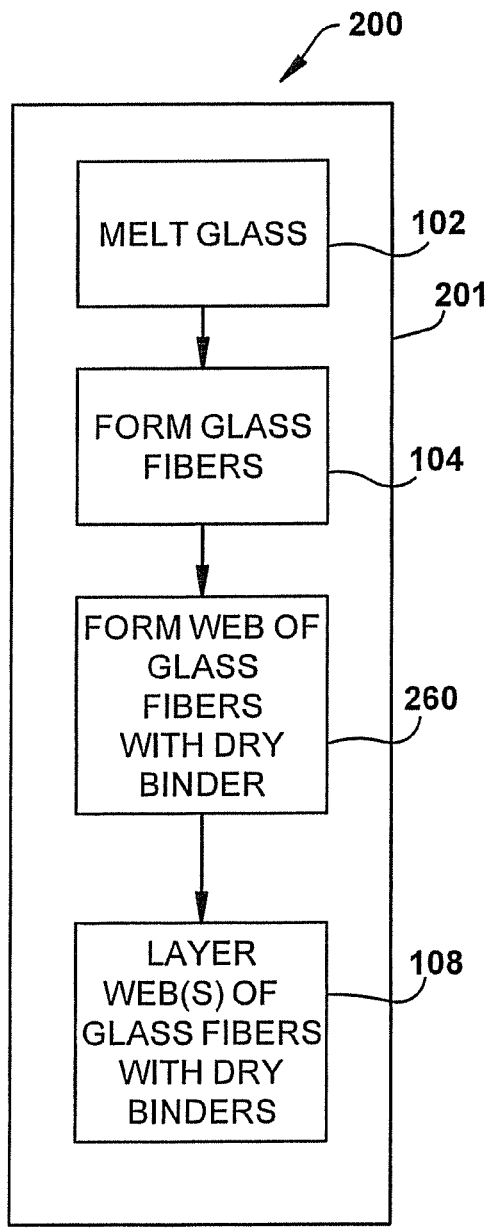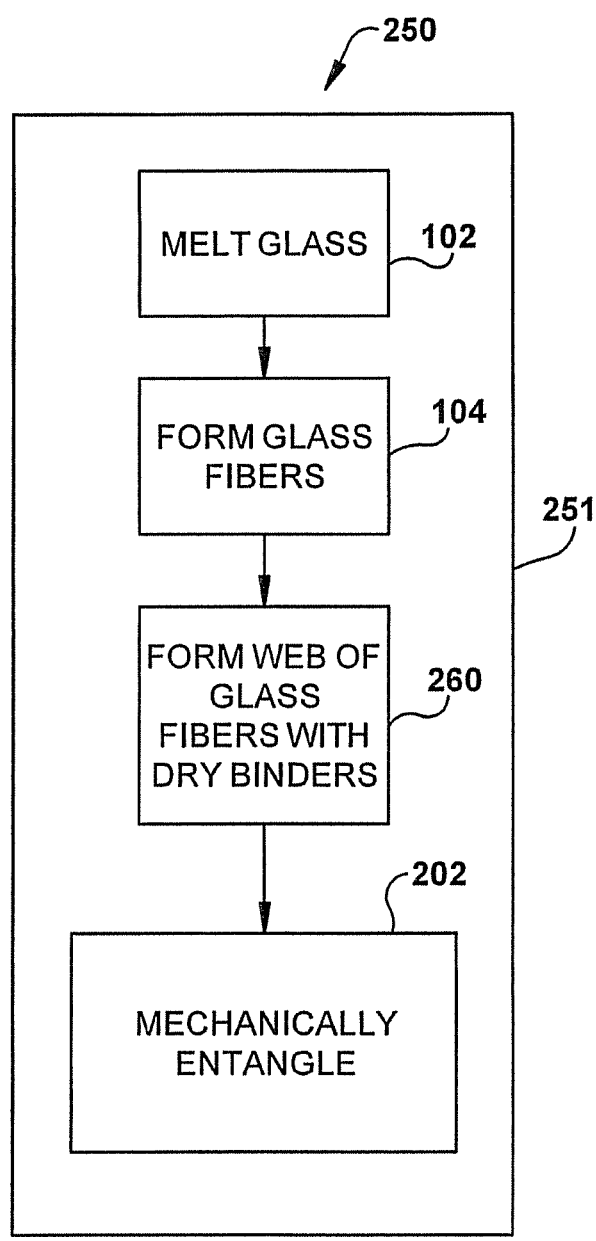
FIG. 2A
FIG. 2B

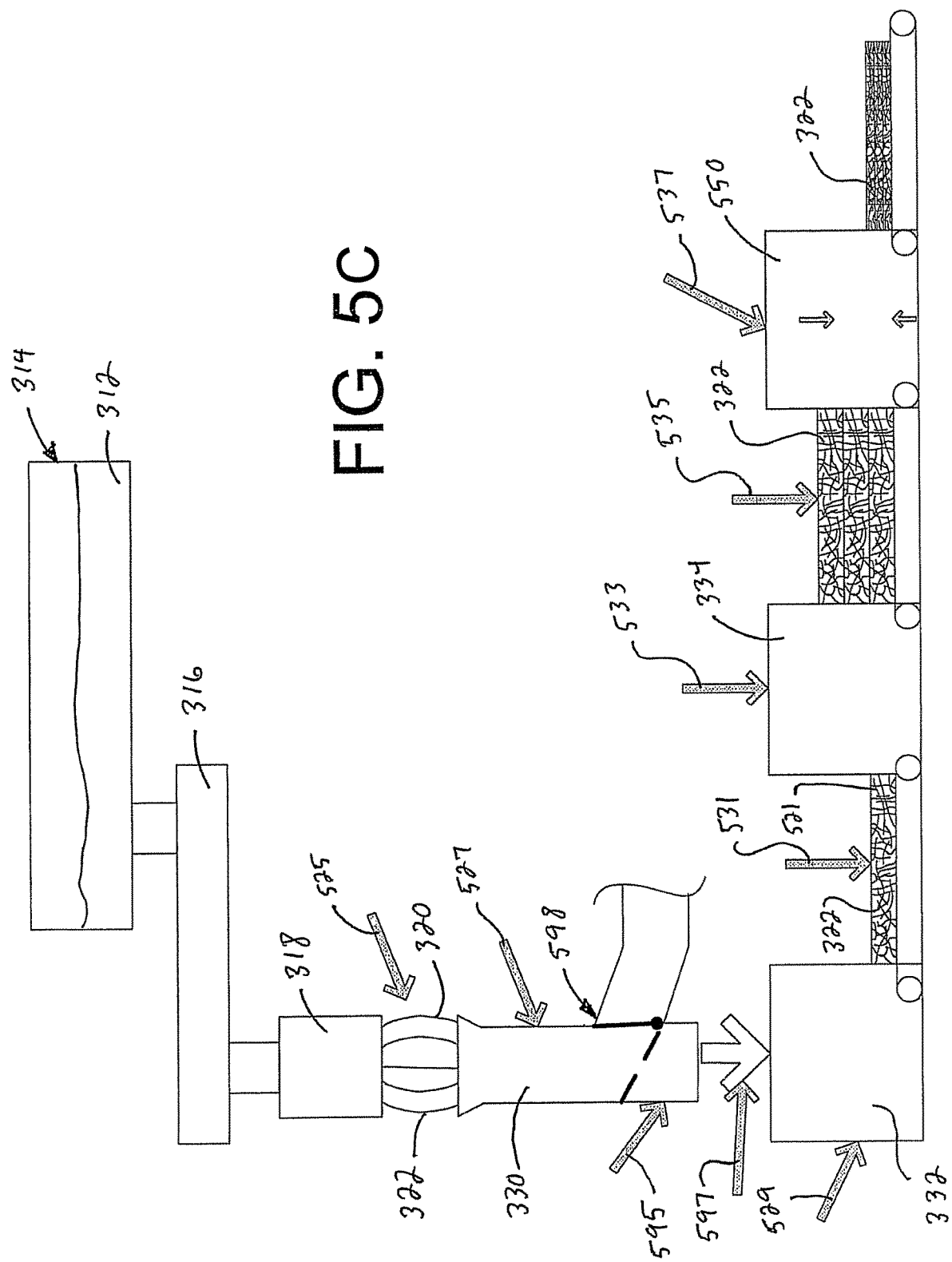

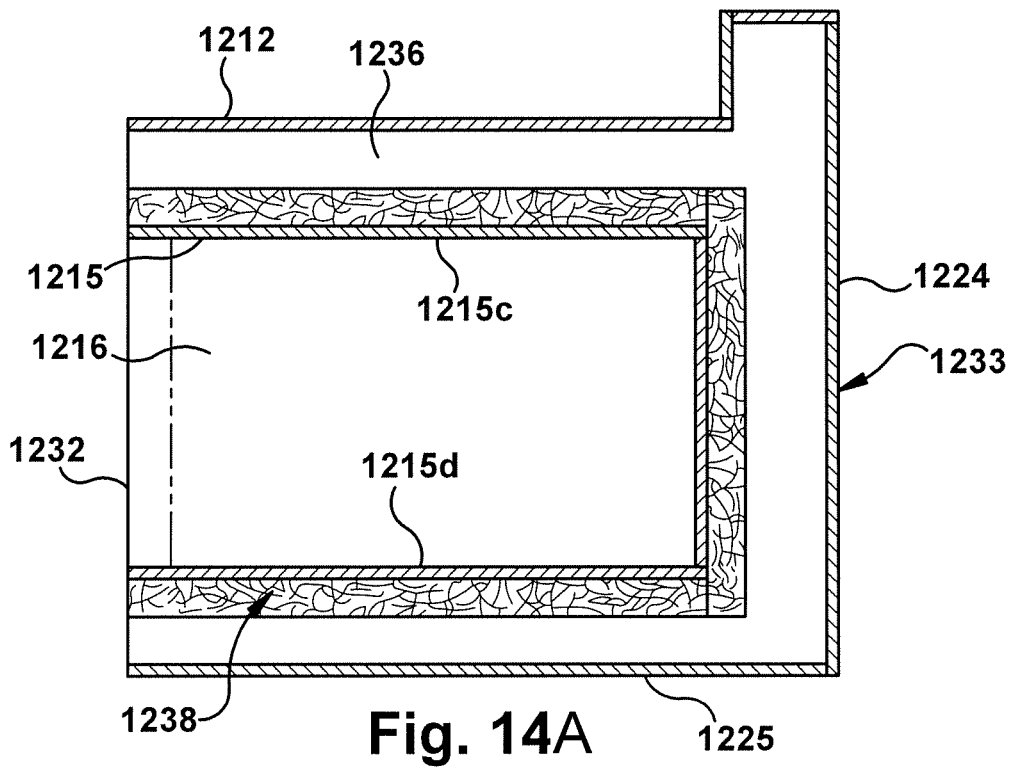
Fig. 14A
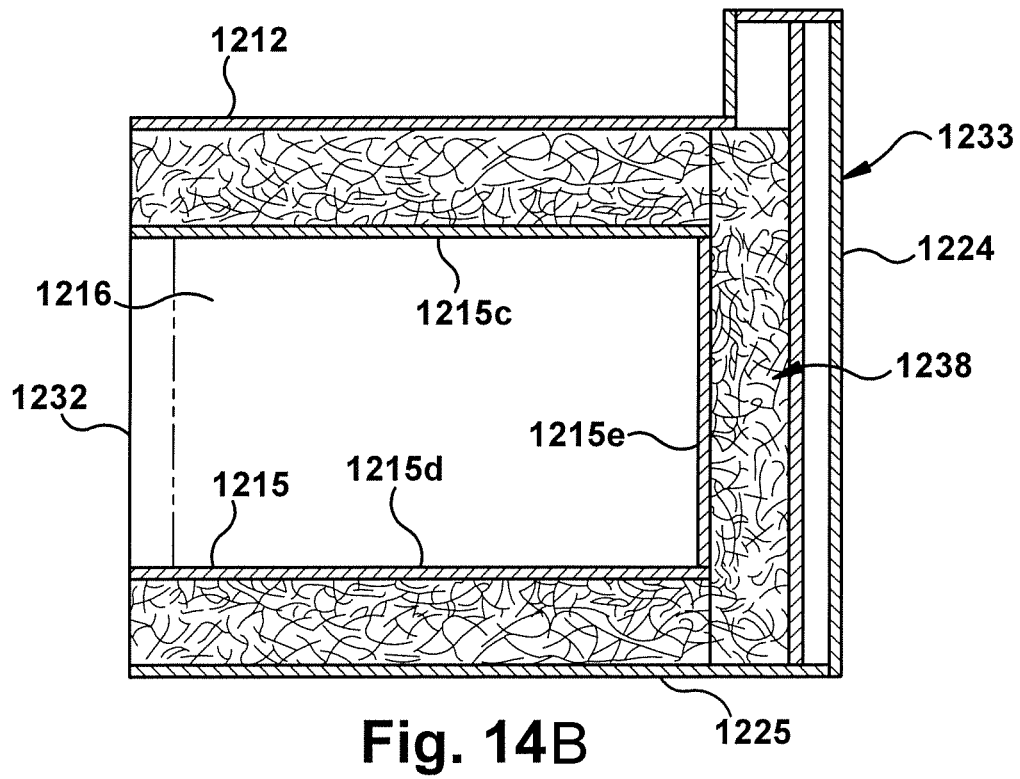
Fig. 14B

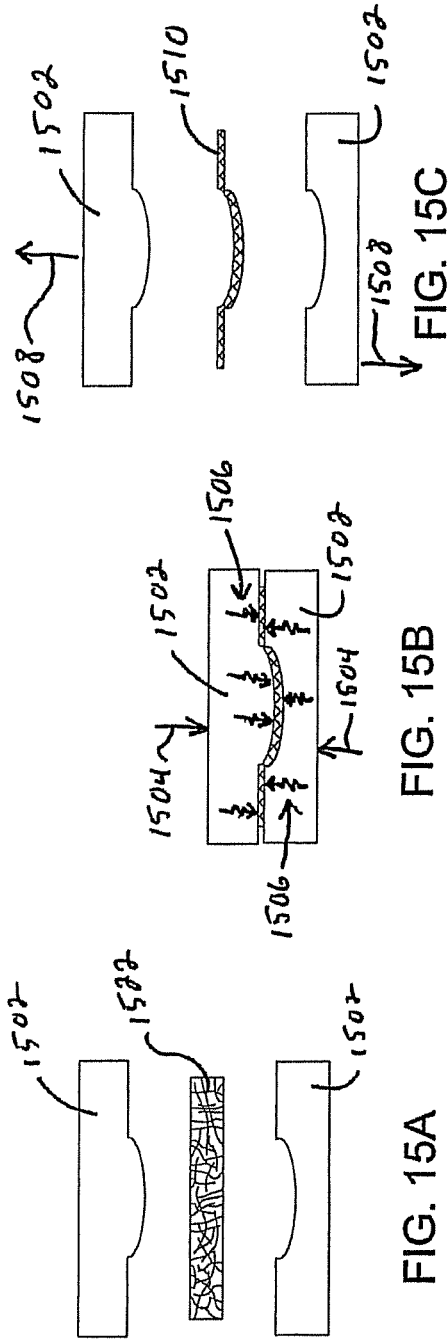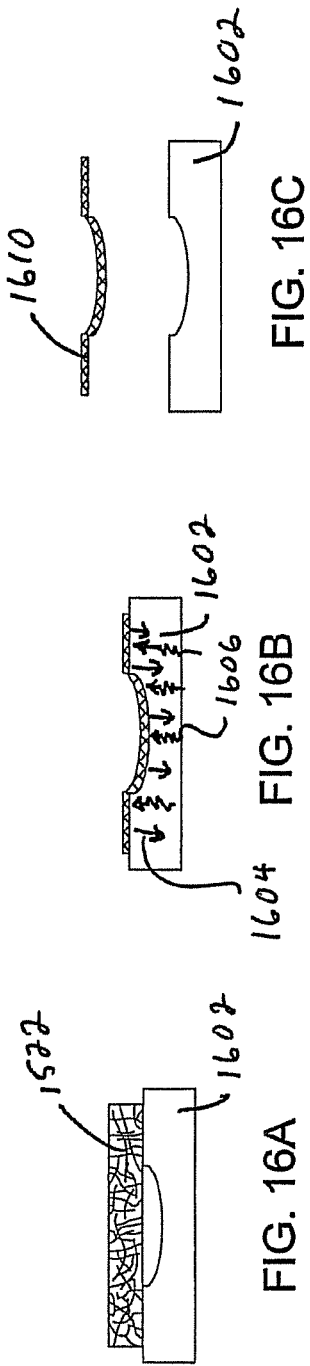

METHOD OF FORMING A WEB FROM FIBROUS MATERIAL

RELATED APPLICATIONS

This application is a divisional application of U.S. Ser. No. 13/839,350, filed Mar. 15, 2013, titled "Method of Forming a Web from Fibrous Material", which is a continuation-in-part of non-provisional application Ser. No. 13/632,895 filed on Oct. 1, 2012, titled "Method of Forming a Pack from Fibrous Materials," which claims priority from provisional application No. 61/541,162 filed on Sep. 30, 2011, titled "Method of Forming a Pack from Fibrous Materials." Non-provisional application Ser. No. 13/632,895 and provisional application No. 61/541,162 are incorporated herein by reference in their entirety.

BACKGROUND

Fibrous material can be formed into various products including webs, packs, batts and blankets. Packs of fibrous material can be used in many applications, including the non-limiting examples of insulation and sound-proofing for buildings and building components, appliances and aircraft. Packs of fibrous material are typically formed by processes that include fiberizers, forming hoods, ovens, trimming and packaging machines. Typical processes also include the use of wet binders, binder reclaim water and washwater systems.

SUMMARY

The present application discloses multiple exemplary embodiments of fibrous material webs and methods of making the fibrous material webs. Binderless webs or webs with dry binder can be formed in a continuous process where fiber material, such as glass is melted and formed into fibers. The fibers are formed into a web of binderless glass fibers or a web with a dry binder. The binderless web or the web with dry binder can be layered and/or the fibers that make up the web can be mechanically entangled, for example, by needling.

Other advantages of the webs, batts, and methods of producing the webs and batts will become apparent to those skilled in the art from the following detailed description, when read in view of the accompanying drawings.

BRIEF DESCRIPTION OF THE DRAWINGS

FIG. 2A is a flowchart of an exemplary embodiment of method for forming a layered web or pack of glass fibers with dry binder;

FIG. 2B is a flowchart of an exemplary embodiment of a method for forming a binderless entangled web of glass fibers with dry binder;

FIG. 5C is a schematic illustration of an exemplary apparatus for forming a web or pack of glass fibers with a dry binder;

FIG. 14A is a side sectional view illustrating an exemplary embodiment of fiberglass insulation in a range;

FIG. 14B is a side sectional view illustrating an exemplary embodiment of fiberglass insulation in a range;

FIGS. 15A-15C illustrate an exemplary embodiment of a method of making a compression molded fiberglass product from a binderless or dry binder fiberglass batt; and FIGS. 16A-16C illustrate an exemplary embodiment of a method of making a vacuum molded fiberglass product from a binderless or dry binder fiberglass batt.

DETAILED DESCRIPTION OF THE INVENTION

The present invention will now be described with occasional reference to the specific exemplary embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose an improved method of forming a pack from fibrous materials. Generally, the improved continuous methods replace the traditional methods of applying a wet binder to fiberized materials with new methods of making a batt or pack of fibers without any binder (i.e. material that binds fibers together) and/or new methods of making a batt or pack of fibers with dry binders.

The term "fibrous materials", as used herein, is defined to mean any materials formed from drawing or attenuating molten materials. The term "pack", as used herein, is defined to mean any product formed by fibrous materials that are joined together by an adhesive and/or by mechanical entanglement.

Figure 1A:
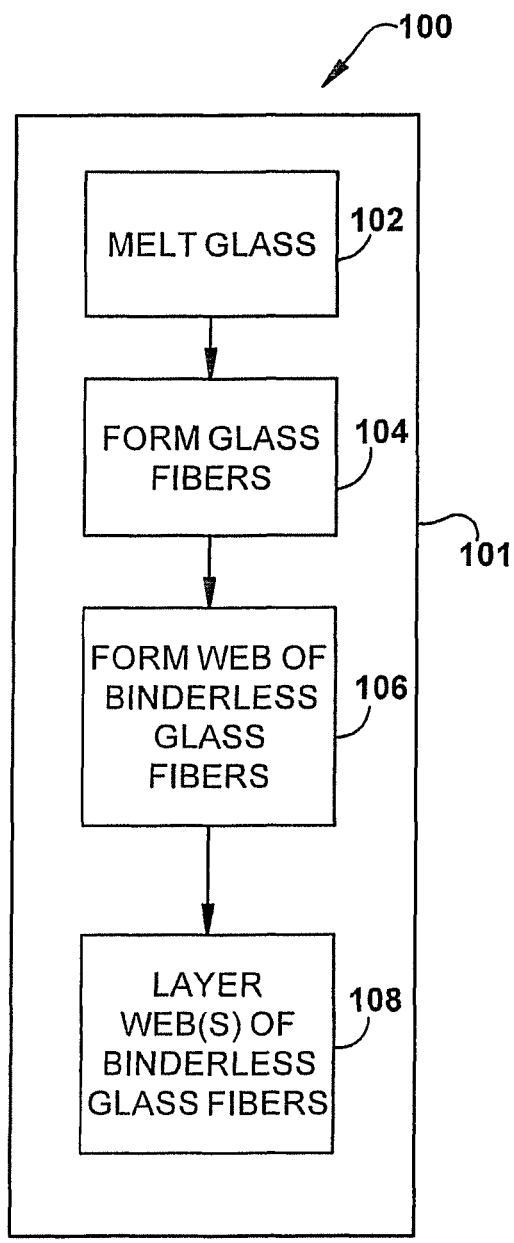
FIG. 1A is a flowchart of an exemplary embodiment of method for forming a binderless layered web or pack of glass fibers.
Figure 3A:
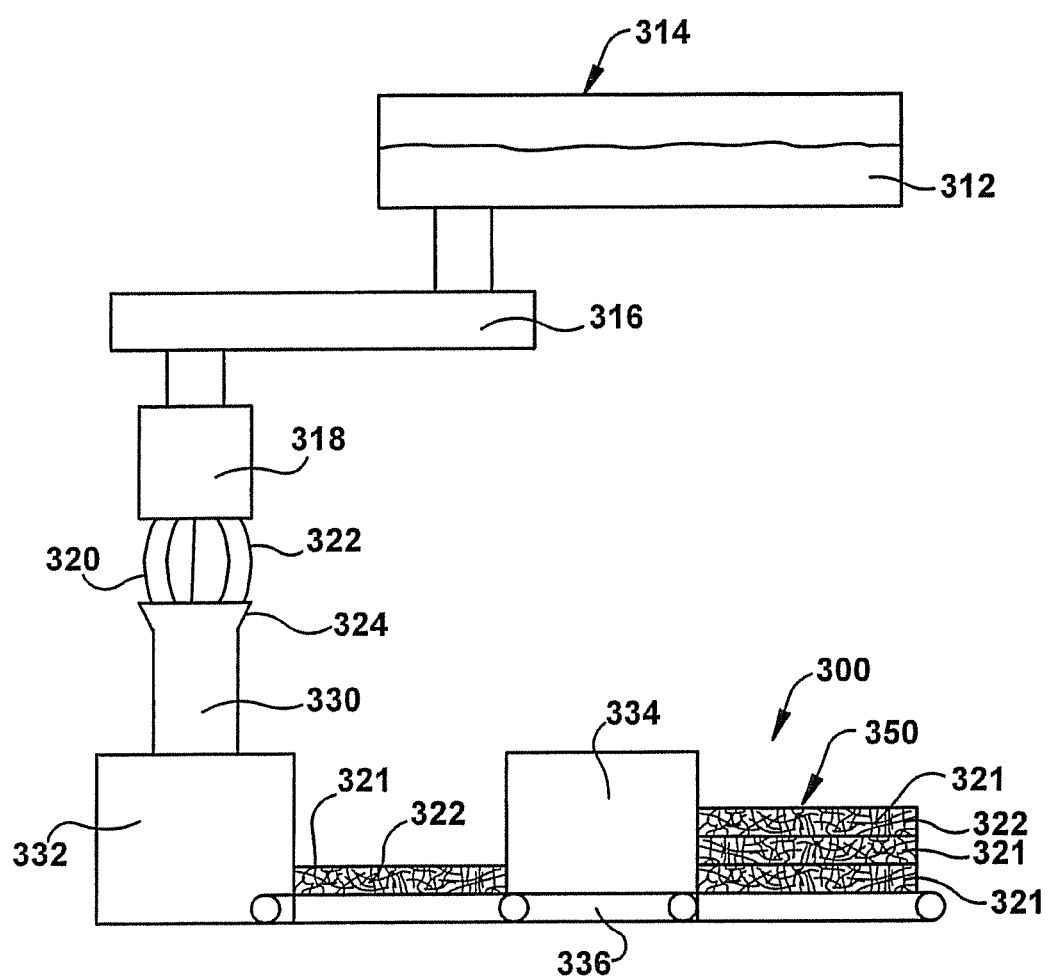
FIG. 3A is a schematic illustration of an exemplary apparatus for forming a binderless layered web or pack of glass fibers.

FIGS. 1A and 3A illustrate a first exemplary embodiment of a continuous process or method 100 of forming a pack 300 (see FIG. 3A) from fibrous materials. The dashed line 101 around the steps of the method 100 indicates that the method is a continuous method, as will be described in more detail below. The methods and packs will be described in terms of glass fibers, but the methods and packs are applicable as well to the manufacture of fibrous products formed from other mineral materials, such as the non-limiting examples of rock, slag and basalt.

Referring to FIG. 1A, glass is melted 102. For example, FIG. 3A schematically illustrates a melter 314. The melter 314 may supply molten glass 312 to a forehearth 316. Melters and forehearths are known in the art and will not be described herein. The molten glass 312 can be formed from various raw materials combined in such proportions as to give the desired chemical composition.

Referring back to FIG. 1A, the molten glass 312 is processed to form 104 glass fibers 322. The molten glass 312 can be processed in a variety of different ways to form the fibers 322. For example, in the example illustrated by FIG. 3A, the molten glass 312 flows from the forehearth 316 to one or more rotary fiberizers 318. The rotary fiberizers 18 receive the molten glass 312 and subsequently form veils 320 of glass fibers 322. As will be discussed in more detail below, the glass fibers 322 formed by the rotary fiberizers 318 are long and thin. Accordingly, any desired fiberizer, rotary or otherwise, sufficient to form long and thin glass fibers 322 can be used. While the embodiment illustrated in FIG. 3A shows one rotary fiberizer 318, it should be appreciated that any desired number of rotary fiberizers 318 can be used. In another exemplary embodiment, the fibers 322 are formed by flame attenuation.

The long and thin fibers may take a wide variety of different forms. In an exemplary embodiment, the long and thin fibers have a length in a range of from about 0.25 inches to about 10.0 inches and a diameter dimension in a range of from about 9 HT to about 35 HT. HT stands for hundred-thousandths of an inch. In an exemplary embodiment, the fibers 322 have a length in a range of from about 1.0 inch to about 5.0 inches and a diameter dimension in a range of from about 14 HT to about 25 HT. In an exemplary embodiment, the fibers 322 have a length of about 3 inches and an average diameter of about 16-17 HT. While not being bound by the theory, it is believed the use of the relatively long and thin fibers advantageously provides a pack having better thermal and acoustic insulative performance, as well as better strength properties, such as higher tensile strength and/or higher bond strength, than a similar sized pack having shorter and thicker fibers.

In exemplary embodiments where the fibers are glass fibers, the term binderless means that the fibrous material, web, and/or pack comprises 99% or 100% glass only or 99% or 100% glass plus inert content. Inert content is any material that does not bind the glass fibers together. For example, in exemplary binderless embodiments described herein, the glass fibers 322 can optionally be coated or partially coated with a lubricant after the glass fibers are formed. For example, the glass fibers 322 can be coated with any lubricating material that does not bind the glass fibers together. In an exemplary embodiment, the lubricant can be a silicone compound, such as siloxane, dimethyl siloxane and/or silane. The lubricant can also be other materials or combinations of materials, such as, oil or an oil emulsion. The oil or oil emulsion may be a mineral oil or mineral oil emulsion and/or a vegetable oil or vegetable oil emulsion.

The glass fibers can be coated or partially coated with a lubricant in a wide variety of different ways. For example, the lubricant can be sprayed onto the glass fibers 322. In an exemplary embodiment, the lubricant is configured to prevent damage to the glass fibers 322 as the glass fibers 322 move through the manufacturing process and come into contact with various apparatus as well as other glass fibers. The lubricant can also be useful to reduce dust in the manufacturing process. The application of the optional lubricant can be precisely controlled by any desired structure, mechanism or device.

Referring to FIG. 1A, a web 321 of fibers without a binder or other material that binds the fibers together is formed 106. The web 321 can be formed in a wide variety of different ways. In the example illustrated by FIG. 3A, the glass fibers 322 are gathered by an optional gathering member 324. The gathering member 324 is shaped and sized to receive the glass fibers 322. The gathering member 324 is configured to divert the glass fibers 322 to a duct 330 for transfer to downstream processing stations, such as for example forming apparatus 332, which forms the web 321. In other embodiments, the glass fibers 322 can be gathered on a conveying mechanism (not shown) to form the web.

The forming apparatus 332 can be configured to form a continuous dry web 321 of fibrous material having a desired thickness. In one exemplary embodiment, the dry webs 321 disclosed in this application can have a thickness in the range of about 0.25 inches to about 4 inches thick and a density in the range of about 0.2 lb/ft$^3$ to about 0.6 lb/ft$^3$. In one exemplary embodiment, the dry webs 321 disclosed in this application can have a thickness in the range of about 1 inch to about 3 inches thick and a density in the range of about 0.3 lb/ft$^3$ to about 0.5 lb/ft$^3$. In one exemplary embodiment, the dry webs 321 disclosed in this application can have a thickness of about 1.5 inches and a density of about 0.4 lb/ft$^3$. The forming apparatus 332 can take a wide variety of different forms. Any arrangement for forming a dry web 321 of glass fibers can be used.

Figure 4:
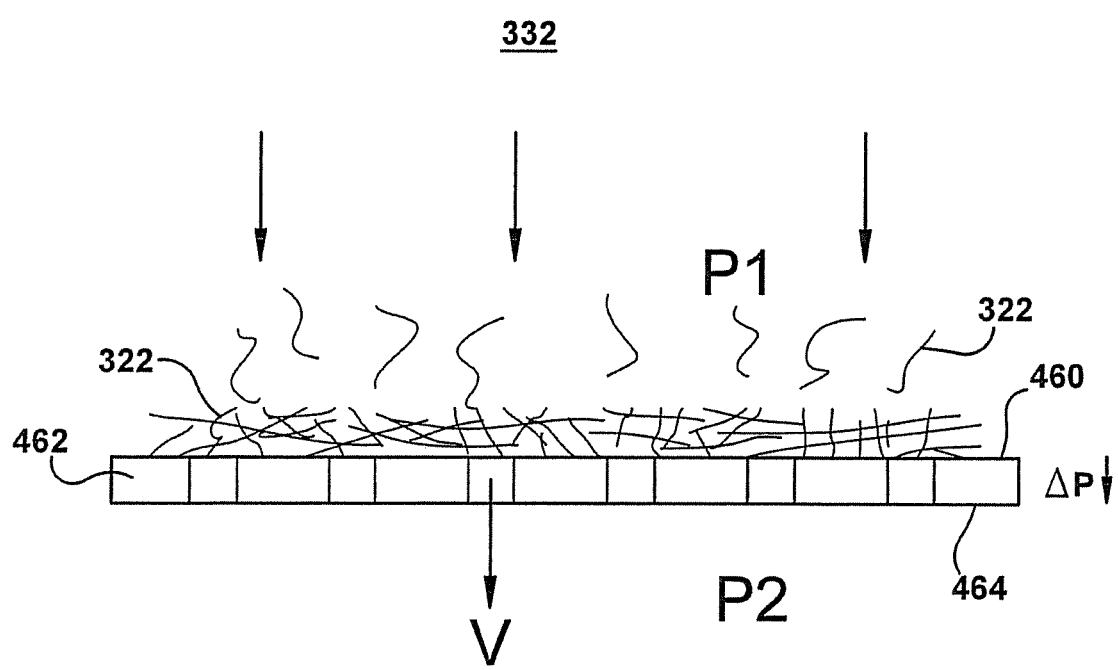
FIG. 4 is a schematic illustration of a forming apparatus for forming a web of glass fibers.

In one exemplary embodiment, the forming apparatus 332 includes a rotating drum with forming surfaces and areas of higher or lower pressure. Referring to FIG. 4, the pressure P1 on a side 460 of the forming surface 462 where the fibers 322 are collected is higher than the pressure P2 on the opposite side 464. This pressure drop $\Delta P$ causes the fibers 322 to collect on the forming surface 462 to form the dry web 321. In one exemplary embodiment, the pressure drop $\Delta P$ across the forming surface 462 is controlled to be a low pressure and produce a low area weight web. For example, the pressure drop $\Delta P$ can be from about 0.5 inches of water and 30 inches of water. A velocity V of the air traveling through the web being formed that results in this low pressure drop $\Delta P$ may be up to 1,000 feet per minute.

A low area weight web 321 having an area weight of about 5 to about 50 grams per square foot. The low area weight web may have the density and thickness ranges mentioned above. The low area weight web may have a thickness in the range of about 0.25 inches to about 4 inches thick, about 1 inch to about 3 inches thick, or about 1.5 inches. The low area weight web may have a density in the range of about 0.2 lb/ft$^3$ to about 0.6 lb/ft$^3$, about 0.3 lb/ft$^3$ to about 0.5 lb/ft$^3$ or about 0.4 lb/ft$^3$. Referring to FIG. 3A, the dry web 321 leaves the forming apparatus 332. In one exemplary embodiment, the low area weight web 321 has a measured area weight distribution Coefficient of Variation=Sigma (One Standard Deviation)/Mean (Average)×100%=of between 0 and 40%. In exemplary embodiments, the weight distribution Coefficient of Variation is less than 30%. Less than 20% or less than 10%. In one exemplary embodiment, the weight distribution Coefficient of Variation is between 25% and 30%, such as about 28%. In one exemplary embodiment, the weight distribution Coefficient of Variation is about 28%. The weight distribution Coefficient of Variation is obtained by measuring multiple small sample area sizes, for example, 2"×2", of a large sample, for example a 6 ft by 10 ft sample with a light table.

In the example illustrated by FIG. 1A, the web 321 or multiple webs are layered 108. For example, a single web 321 may be lapped in the machine direction or cross-lapped at ninety degrees to the machine direction to form a layered web 350. In another embodiment, the web may be cut into portions and the portions are stacked on top of one another to form the layered web. In yet another exemplary embodiment, one or more duplicate fiberizers 318 and forming apparatus 332 can be implemented such that two or more webs are continuously produced in parallel. The parallel webs are then stacked on top of each other to form the layered web.

In one exemplary embodiment, the layering mechanism 332 is a lapping mechanism or a cross-lapping mechanism that functions in association with a conveyor 336. The conveyor 336 is configured to move in a machine direction as indicated by the arrow D1. The lapping or cross-lapping mechanism is configured to receive the continuous web 321 and deposit alternating layers of the continuous web on the first conveyer 336 as the first conveyor moves in machine direction D1. In the deposition process, a lapping mechanism 334 would form the alternating layers in a machine direction as indicated by the arrows D1 or the cross-lapping mechanism 334 would form the alternating layers in a cross-machine direction. Additional webs 321 may be formed and lapped or cross-lapped by additional lapping or cross-lapping mechanisms to increase the number of layers and throughput capacity.

In one exemplary embodiment, a cross-lapping mechanism is configured to precisely control the movement of the continuous web 321 and deposit the continuous web on the conveyor 336 such that the continuous web is not damaged. The cross-lapping mechanism can include any desired structure and can be configured to operate in any desired manner. In one exemplary embodiment, the cross-lapping mechanism includes a head (not shown) configured to move back and forth at 90 degrees to the machine direction D1. In this embodiment, the speed of the moving head is coordinated such that the movement of the head in both cross-machine directions is substantially the same, thereby providing uniformity of the resulting layers of the fibrous body. In an exemplary embodiment, the cross-lapping mechanism comprises vertical conveyors (not shown) configured to be centered with a centerline of the conveyor 336. The vertical conveyors are further configured to swing from a pivot mechanism above the conveyor 336 such as to deposit the continuous web on the conveyor 336. While multiple examples of cross lapping mechanisms have been described above, it should be appreciated that the cross-lapping mechanism can be other structures, mechanisms or devices or combinations thereof.

The layered web 350 can have any desired thickness. The thickness of the layered web is a function of several variables. First, the thickness of the layered web 350 is a function of the thickness of the continuous web 321 formed by the forming apparatus 332. Second, the thickness of the layered web 350 is a function of the speed at which the layering mechanism 334 deposits layers of the continuous web 321 on the conveyer 336. Third, the thickness of the layered web 334 is a function of the speed of the conveyor 336. In the illustrated embodiment, the layered web 350 has a thickness in a range of from about 0.1 inches to about 20.0 inches. In an exemplary embodiment, a cross lapping mechanism 334 may form a layered web 350 having from 1 layer to 60 layers. Optionally, a cross-lapping mechanisms can be adjustable, thereby allowing the cross-lapping mechanisms 334 to form a pack having any desired width.

In certain embodiments, the pack can have a general width in a range of from about 98.0 inches to about 236.0 inches.

In one exemplary embodiment, the layered web 350 is produced in a continuous process indicated by dashed box 101 in FIG. 1A. The fibers produced by the fiberizer 318 are sent directly to the forming apparatus 332 (i.e. the fibers are not collected and packed and then unpacked for use at a remote forming apparatus). The web 321 is provided directly to the layering device 352 (i.e. the web is not formed and rolled up and then unrolled for use at a remote layering device 352). In an exemplary embodiment of the continuous process, each of the processes (forming and layering in FIG. 1A) are connected to the fiberizing process, such that fibers from the fiberizer are used by the other processes without being stored for later use. In another exemplary embodiment of the continuous process, the fiberizer or fiberizers 318 may have more throughput than is needed by the forming apparatus 332 and the layering device 352. As such, the fibers need not be continuously supplied by the fiberizer 318 to the forming apparatus 332 for the process to be continuous. For example, the fiberizer 318 can produce batches of fibers that are accumulated and provided to the forming apparatus 332 in the same factory in the continuous process, but the fibers are not compressed, shipped, and reopened in the continuous process. As another example of continuous process, the fibers produced by the fiberizer 318 can alternately be diverted to the forming apparatus 332 and to another forming apparatus or for some other use or product. In another example of continuous process, a portion of the fibers produced by the fiberizer 318 are continuously directed to the forming apparatus 332 and a remainder of the fibers are directed to another forming apparatus or for some other use or product.

Figure 3B:
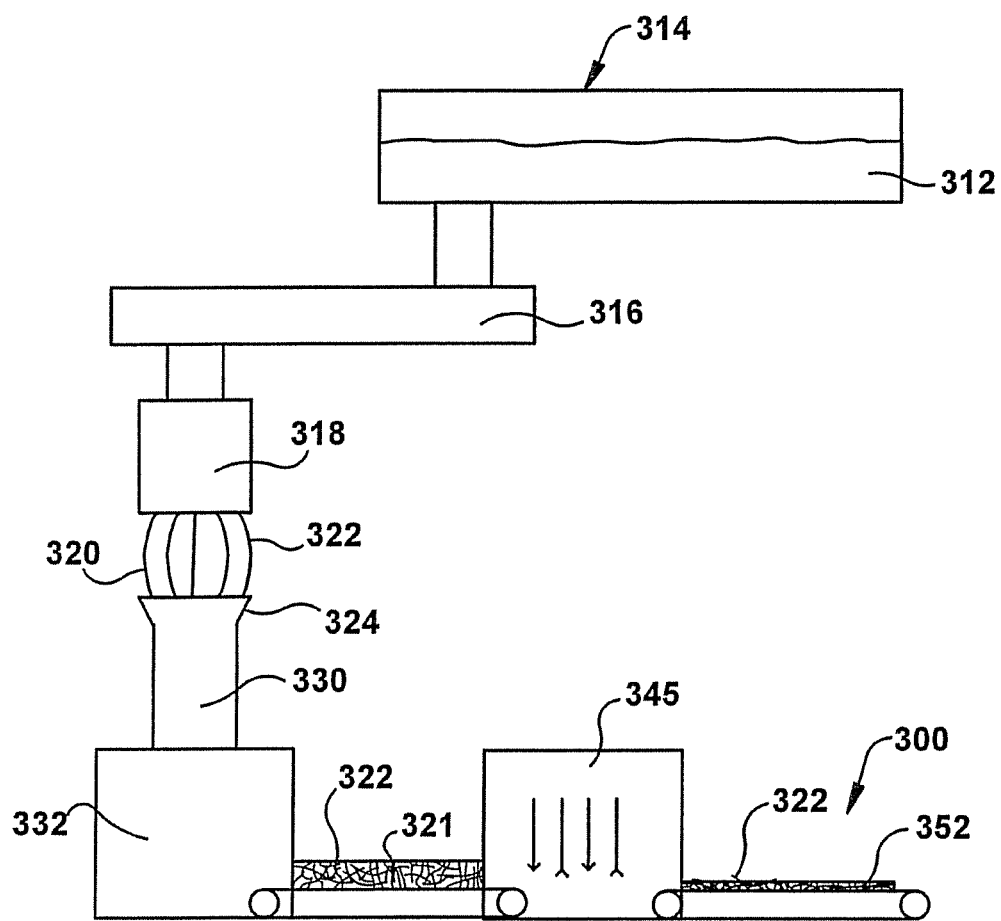
FIG. 3B is a schematic illustration of an exemplary apparatus for forming a binderless entangled web of glass fibers.
Figure 3C:
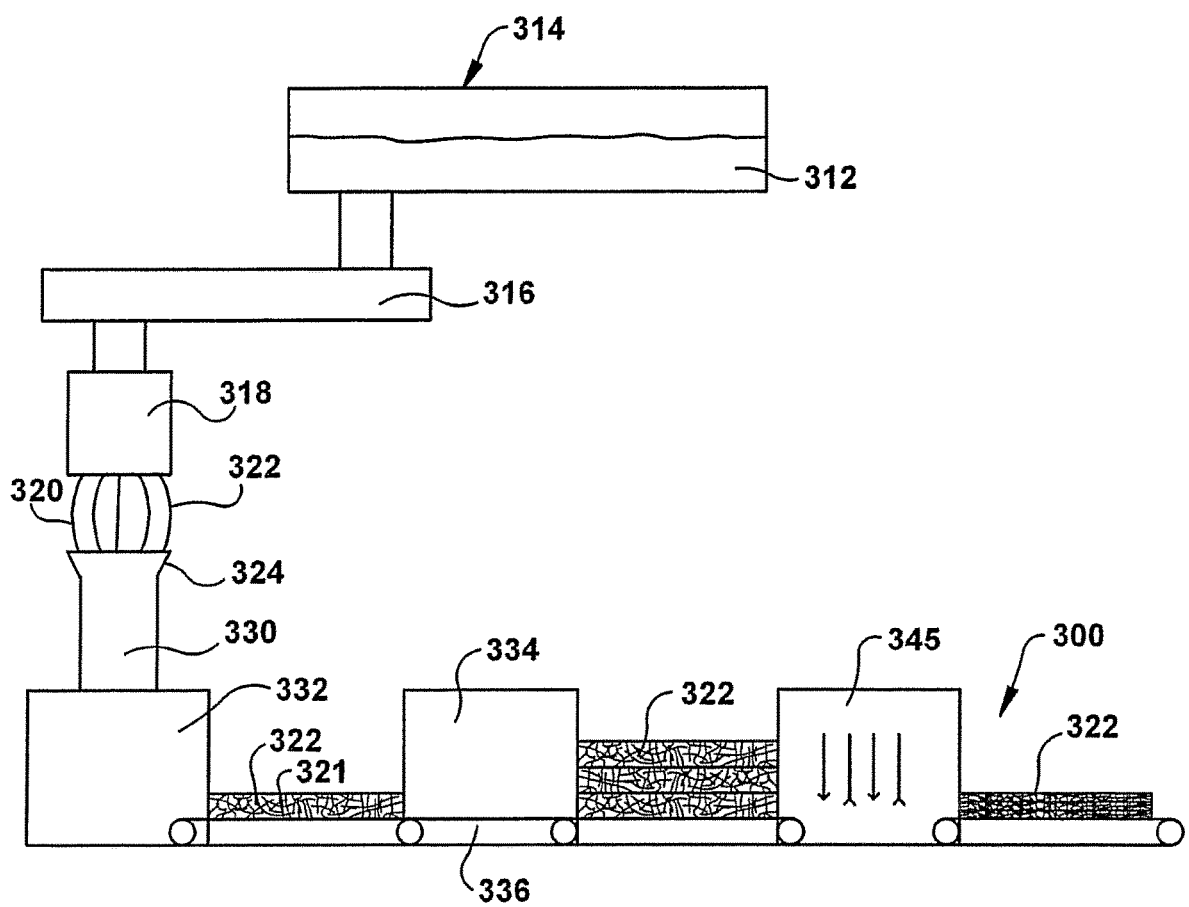
FIG. 3C is a schematic illustration of an exemplary apparatus for forming a binderless layered and entangled web or pack of glass fibers.
Figure 3D:
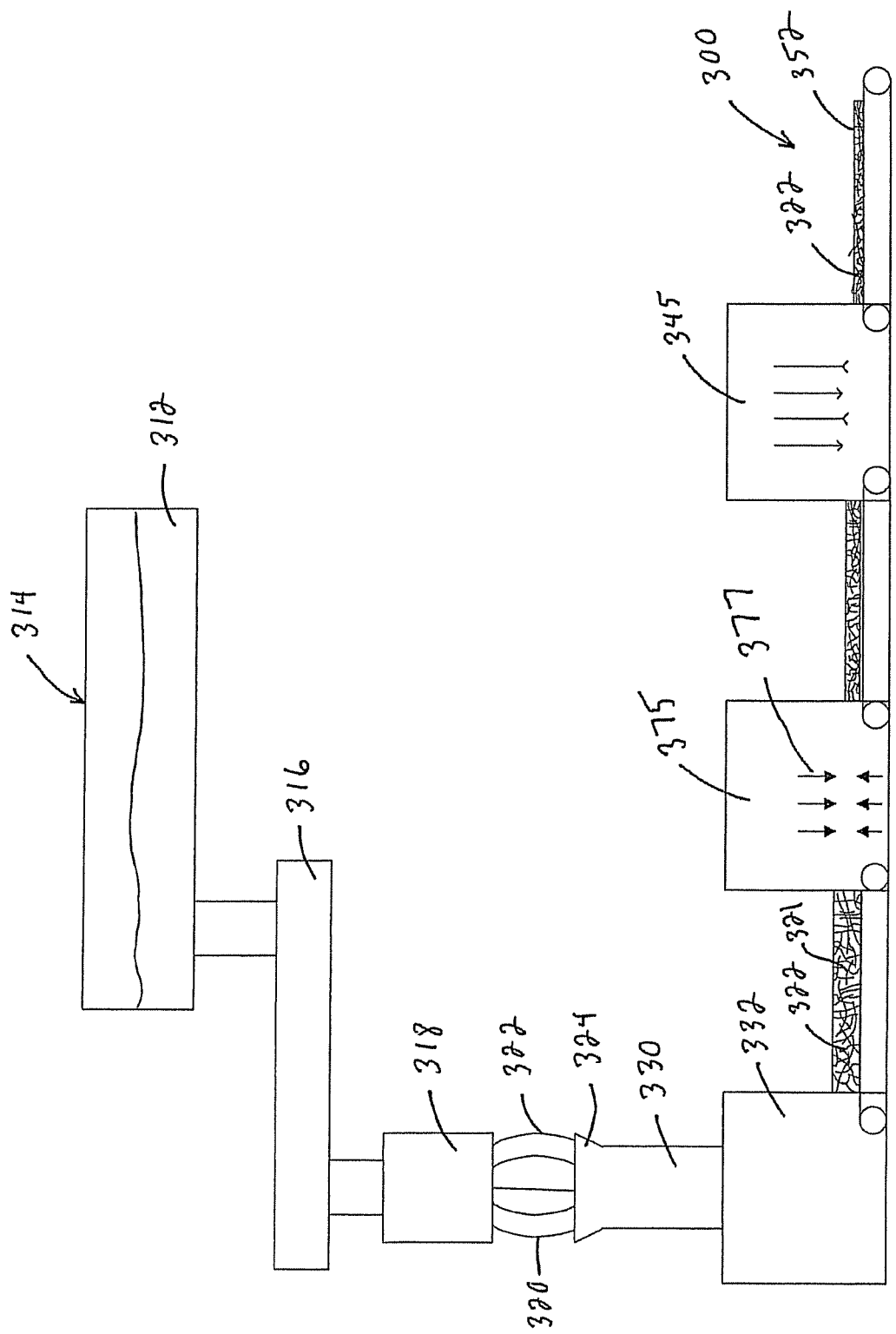
FIG. 3D is a schematic illustration of an exemplary apparatus for forming a binderless layered and entangled web or pack of glass fibers.
Figure 3E:
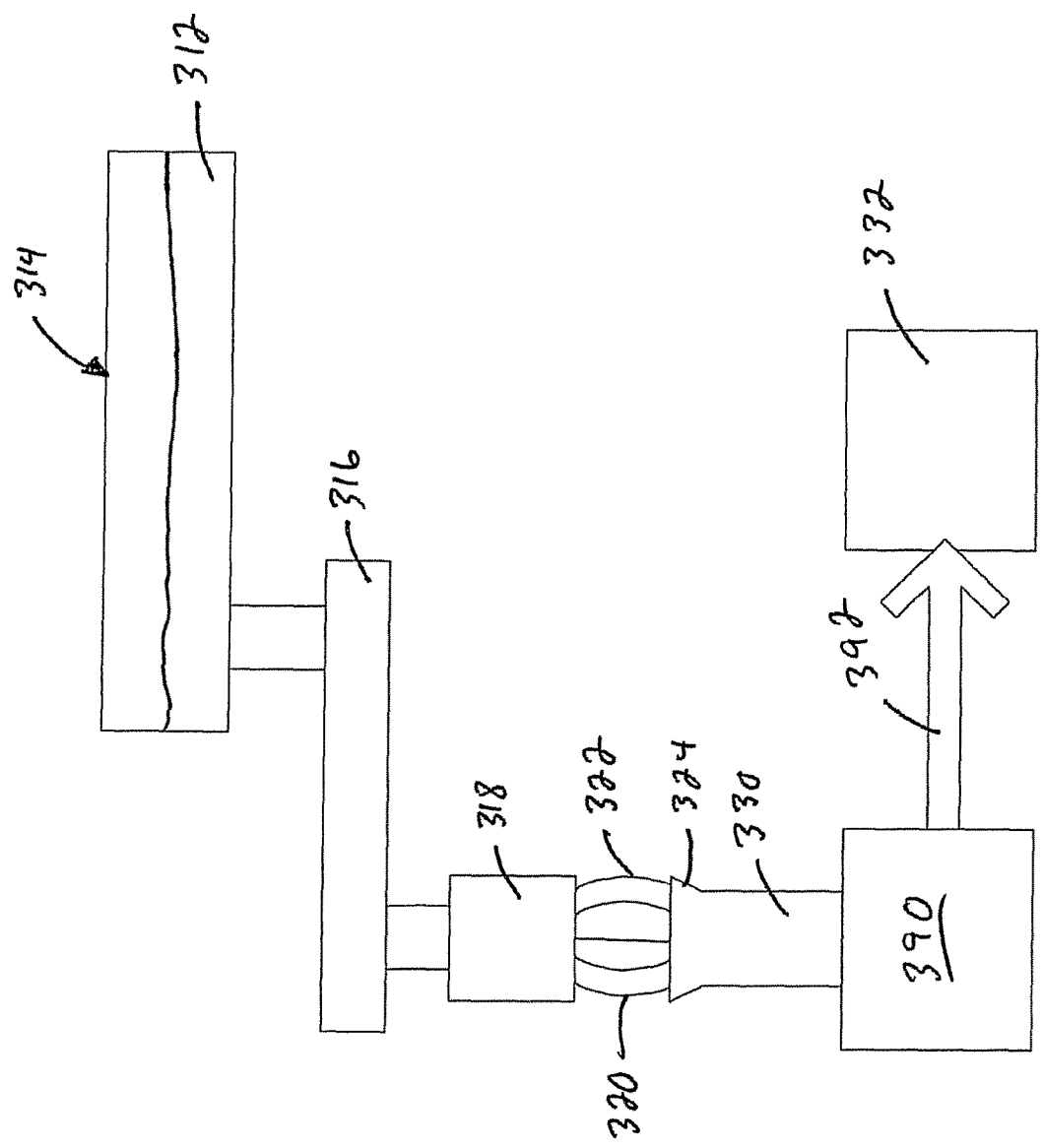
FIG. 3E is a schematic illustration of an exemplary accumulating arrangement.

FIG. 3E illustrates that the fibers 322 can be collected by an accumulator 390 in any of the examples illustrated by FIGS. 3A-3D. Arrow 392 indicates that the fibers 322 are provided by the accumulator 390 in a controlled manner to the forming apparatus 332. The fibers 322 may dwell in the accumulator 390 for a predetermined period of time before being provided to the forming apparatus 332 to allow the fibers to cool. In one exemplary embodiment, the fibers 322 are provided by the accumulator 390 to the forming apparatus 332 at the same rate the fibers 322 are provided to the accumulator 390. As such, in this exemplary embodiment, the time that the fibers dwell and cool in the accumulator is determined by the amount of fibers 322 in the accumulator. In this example, the dwell time is the amount of fibers in the accumulator divided by the rate at which the fibers are provided by the accumulator to the forming apparatus 332. In another exemplary embodiment, the accumulator 390 can selectively start and stop dispensing the fibers and/or adjust the rate at which the fibers are dispensed.

Figure 3F:
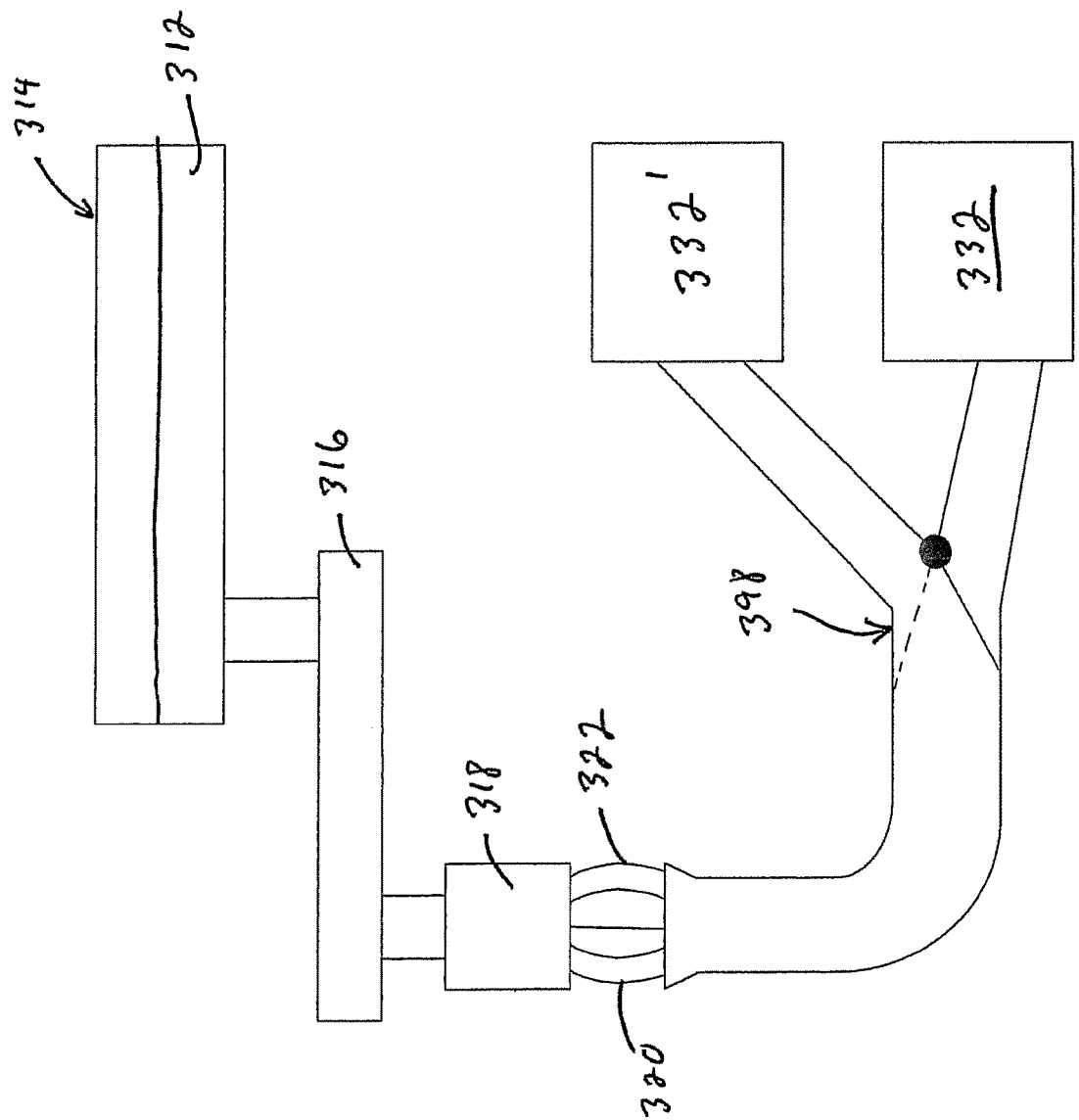
FIG. 3F is a schematic illustration of an exemplary diverting arrangement.

FIG. 3F illustrates that fibers 322 can be selectively diverted between the forming station 332 and a second forming station 332' by a diverting mechanism 398 in any of the examples illustrated by FIGS. 3A-3D. In one exemplary embodiment, the embodiments illustrated by FIGS. 3A-3D may have both the accumulator 390 and the diverting mechanism 398.

In one exemplary embodiment, the web 321 is relatively thick and has a low area weight, yet the continuous process has a high throughput and all of the fibers produced by the fiberizer are used to make the web. For example, a single layer of the web 321 may have an area weight of about 5 to about 50 grams per square foot. The low area weight web may have the density and thickness ranges mentioned above. The high output continuous process may produce between about 750 lbs/hr and 1500 lbs/hr, such as at least 900 lbs/hr or at least 1250 lbs/hr. The layered web 350 can be used in a wide variety of different applications.

Figure 1B:
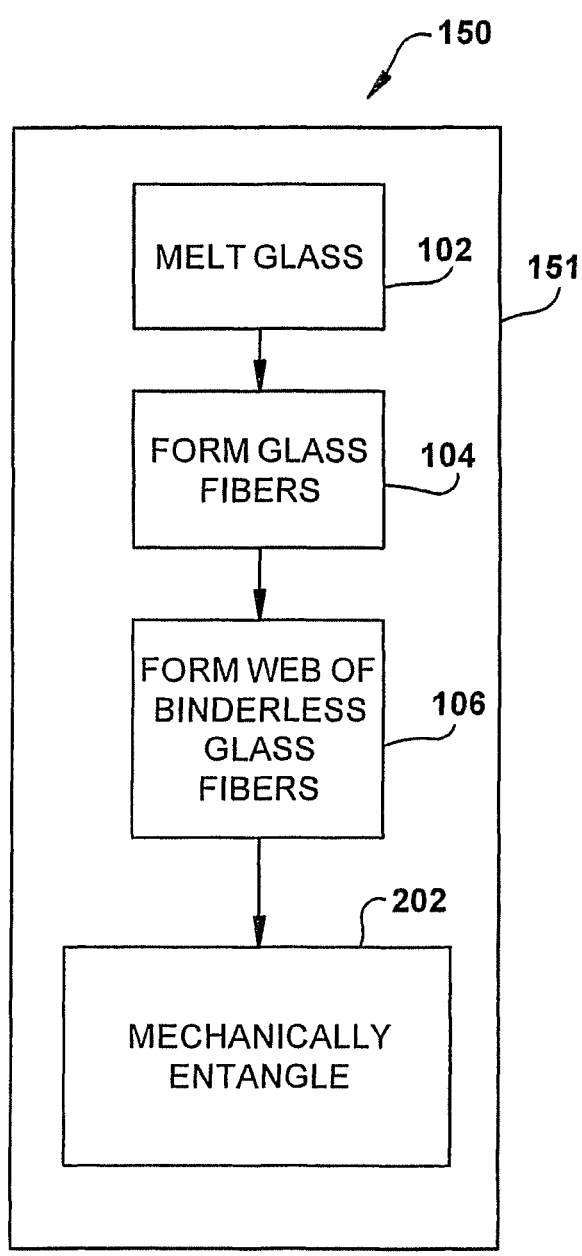
FIG. 1B is a flowchart of an exemplary embodiment of a method for forming a binderless entangled web of glass fibers.

FIGS. 1B and 3B illustrate a second exemplary embodiment of a method 150 of forming a pack 300 (see FIG. 3B) from fibrous materials without the use of a binder. The dashed line 151 around the steps of the method 150 indicates that the method is a continuous method Referring to FIG. 1B, glass is melted 102. The glass may be melted as described above with respect to FIG. 3A. The molten glass 312 is processed to form 104 glass fibers 322. The molten glass 312 can be processed as described above with respect to FIG. 3A to form the fibers 322. A web 321 of fibers without a binder or other material that binds the fibers together is formed 106. The web 321 can be formed as described above with respect to FIG. 3A.

Referring to FIG. 1B, the fibers 322 of the web 321 are mechanically entangled 202 to form an entangled web 352 (see FIG. 3B). Referring to FIG. 3B, the fibers of the web 321 can be mechanically entangled by an entangling mechanism 345, such as a needling device. The entanglement mechanism 345 is configured to entangle the individual fibers 322 of the web 321. Entangling the glass fibers 322 ties the fibers of the web together. The entanglement causes mechanical properties of the web, such as for example, tensile strength and shear strength, to be improved. In the illustrated embodiment, the entanglement mechanism 345 is a needling mechanism. In other embodiments, the entanglement mechanism 345 can include other structures, mechanisms or devices or combinations thereof, including the non-limiting example of stitching mechanisms.

The entangled web 352 can have any desired thickness. The thickness of the entangled web is a function of the thickness of the continuous web 321 formed by the forming apparatus 332 and the amount of compression of the continuous web 321 by the entanglement mechanism 345. In an exemplary embodiment, the entangled web 352 has a thickness in a range of from about 0.1 inches to about 2.0 inches. In an exemplary embodiment, the entangled web 352 has a thickness in a range of from about 0.5 inches to about 1.75 inches. For example, in one exemplary embodiment, the thickness of the entangled web is about ½".

In one exemplary embodiment, the entangled web 352 is produced in a continuous process 151. The fibers produced by the fiberizer 318 are sent directly to the forming apparatus 332 (i.e. the fibers are not collected and packed and then unpacked for use at a remote forming apparatus). The web 321 is provided directly to the entangling device 345 (i.e. the web is not formed and rolled up and then unrolled for use at a remote entangling device 345). The entangled web 352 can be used in a wide variety of different applications. In an exemplary embodiment of the continuous process, each of the processes (forming and entangling in FIG. 1B) are connected to the fiberizing process, such that fibers from the fiberizer are used by the other processes without being stored for later use. In another exemplary embodiment of the continuous process, the fiberizer or fiberizers 318 may have more throughput than is needed by the forming apparatus 332 and/or the entangling device 345. As such, the fibers need not be continuously supplied by the fiberizer 318 to the forming apparatus 332 for the process to be continuous. For example, the fiberizer 318 can produce batches of fibers that are accumulated and provided to the forming apparatus 332 in the same factory in the continuous process, but the fibers are not compressed, shipped, and reopened in the continuous process. As another example of continuous process, the fibers produced by the fiberizer 318 can alternately be diverted to the forming apparatus 332 and to another forming apparatus or for some other use or product. In another example of continuous process, a portion of the fibers produced by the fiberizer 318 are continuously directed to the forming apparatus 332 and a remainder of the fibers are directed to another forming apparatus or for some other use or product.

FIG. 3D illustrates an exemplary embodiment of an apparatus that is similar to the embodiment illustrated by FIG. 3B for forming a single layer high density pack 300. For example, the embodiment illustrated by FIG. 3D can produce packs 300 that are more dense than the densest pack produced by the embodiment illustrated by FIG. 3B. The apparatus of FIG. 3D corresponds to the embodiment of FIG. 3B, except a compressing mechanism 375 is provided between the forming station 332 and the entangling mechanism 345 and/or the entangling mechanism 345 includes a compressing mechanism. The compressing mechanism 375 compresses the web 321 as indicated by arrows 377 before the web is provided to the entangling mechanism 345 and/or the web 321 is compressed at the inlet of the compressing mechanism. The entangled web 352 that is formed has a high density. The compressing mechanism can take a wide variety of different forms. Examples of compressing mechanisms 345 include, but are not limited to, rollers, belts, rotary tackers, additional needling mechanisms, perforated belt(s) with negative pressure applied to the side of the belt that is opposite the entangled web 352 (see the similar example illustrated by FIG. 4), any mechanism that includes any combination of the listed compression mechanisms, any mechanism that includes any combination of any of the features of the listed compression mechanisms, and the like. Any arrangement for compressing the web can be used. When the entangling mechanism 345 includes a compressing mechanism, the compressing mechanism 375 can be omitted in the single layer high density pack 300 embodiment illustrated by FIG. 3D. The compressing performed by the compressing mechanism 375 and/or the entangling mechanism 345 can be any combination of compressing and/or needling, which compresses the pack in addition to entangling the fibers. Examples of compressing and needling sequences for producing a high density pack include, but are not limited to, compressing with rollers and then needling, needling twice, compressing with rollers and then needling twice, needling three times, pre-needling—needling from the top—needling from the bottom, pre-needling—needling from the bottom—needling from the top, compressing with rollers—needling from the top—needling from the bottom, and compressing with rollers—needling from the bottom—needling from the top.

The high density entangled web 352 of FIG. 3D can have any desired thickness. The thickness of the entangled web is a function of the thickness of the continuous web 321 formed by the forming apparatus 332 and the amount of compression of the continuous web 321 by the compressing mechanism 375 and the entanglement mechanism 345. In an exemplary embodiment, the high density entangled web 352 of FIG. 3D has a thickness in a range of from about 0.1 inches to about 5 inches. In an exemplary embodiment, the high density entangled web 352 has a thickness in a range of from about 0.250 inches to about 3.0 inches. In an exemplary embodiment, the high density entangled web has a density in a range from 0.4 lb/ft$^3$ to about 12 lb/ft$^3$. In one exemplary embodiment, the high density entangled web 352 of FIG. 3D is produced in a continuous process in a similar manner to that described with respect to FIG. 3B.

Figure 1C:
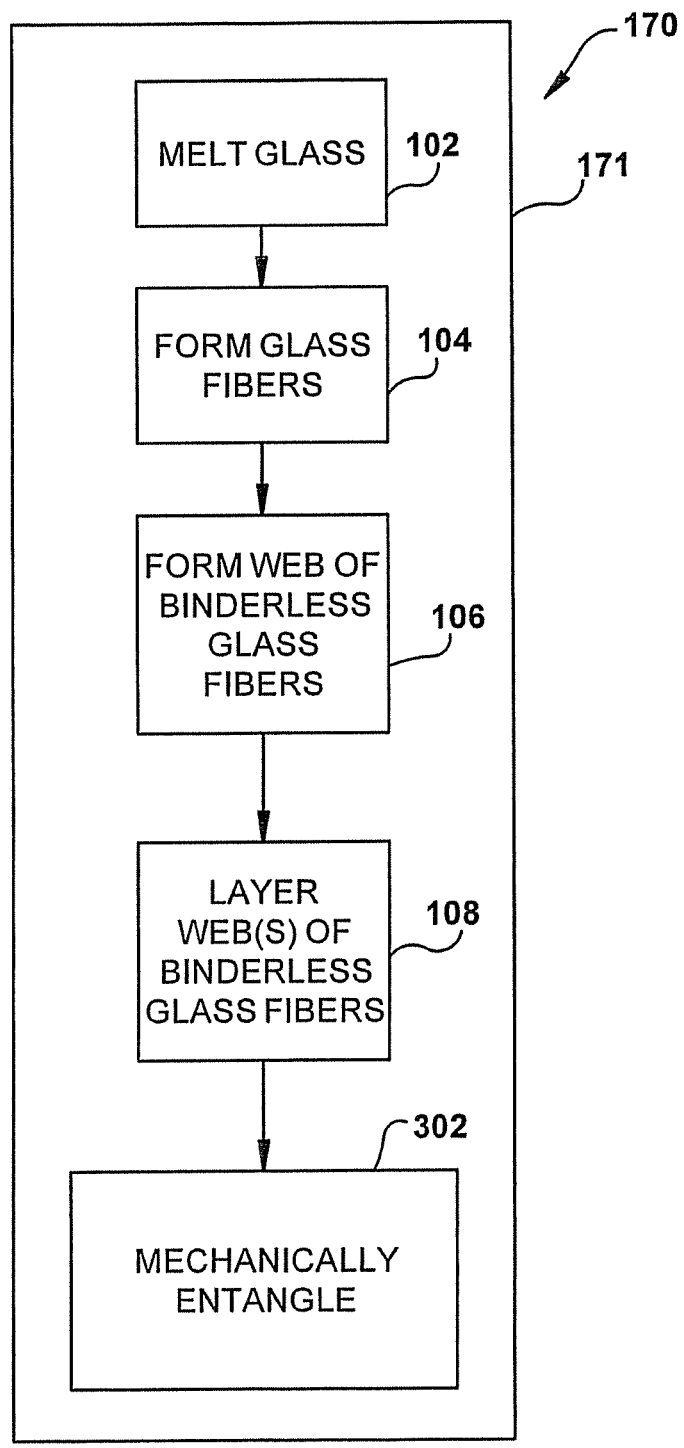
FIG. 1C is a flowchart of an exemplary embodiment of a method for forming a binderless layered and entangled web or pack of glass fibers.

FIGS. 1C and 3C illustrate another exemplary embodiment of a method 170 of forming a pack 370 (see FIG. 3C) from fibrous materials without the use of a binder. Referring to FIG. 1C, glass is melted 102. The dashed line 171 around the steps of the method 170 indicates that the method is a continuous method The glass may be melted as described above with respect to FIG. 3A. Referring back to FIG. 1C, the molten glass 312 is processed to form 104 glass fibers 322. The molten glass 312 can be processed as described above with respect to FIG. 3A to form the fibers 322. Referring to FIG. 1C, a web 321 of fibers without a binder or other material that binds the fibers together is formed 106. The web 321 can be formed as described above with respect to FIG. 3A. Referring to FIG. 1C, the web 321 or multiple webs are layered 108. The web 321 or multiple webs can be layered as described above with respect to FIG. 3A. Referring to FIG. 1C, the fibers 322 of the layered webs 350 are mechanically entangled 302 to form an entangled pack 370 of layered webs.

Referring to FIG. 3C, the fibers of the layered webs 350 can be mechanically entangled by an entangling mechanism 345, such as a needling device. The entanglement mechanism 345 is configured to entangle the individual fibers 322 forming the layers of the layered web. Entangling the glass fibers 322 ties the fibers of the layered webs 350 together to form the pack. The mechanical entanglement causes mechanical properties, such as for example, tensile strength and shear strength, to be improved. In the illustrated embodiment, the entanglement mechanism 345 is a needling mechanism. In other embodiments, the entanglement mechanism 345 can include other structures, mechanisms or devices or combinations thereof, including the non-limiting example of stitching mechanisms.

The entangled pack 370 of layered webs 350 can have any desired thickness. The thickness of the entangled pack is a function of several variables. First, the thickness of the entangled pack is a function of the thickness of the continuous web 321 formed by the forming apparatus 332. Second, the thickness of the entangled pack 370 is a function of the speed at which the lapping or cross-lapping mechanism 334 deposits layers of the continuous web 321 on the conveyer 336. Third, the thickness of the entangled pack 370 is a function of the speed of the conveyor 336. Fourth, the thickness of the entangled pack 370 is a function of the amount of compression of the layered webs 350 by the entanglement mechanism 345. The entangled pack 370 can have a thickness in a range of from about 0.1 inches to about 20.0 inches. In an exemplary embodiment, the entangled pack 370 may having from 1 layer to 60 layers. Each entangled web layer 352 may be from 0.1 to 2 inches thick. For example, each entangled web layer may be about 0.5 inches thick.

In one exemplary embodiment, the entangled pack 370 is produced in a continuous process. The fibers produced by the fiberizer 318 are sent directly to the forming apparatus 332 (i.e. the fibers are not collected and packed and then unpacked for use at a remote forming apparatus). The web 321 is provided directly to the layering device 352 (i.e. the web is not formed and rolled up and then unrolled for use at a remote layering device 352). The layered web 350 is provided directly to the entangling device 345 (i.e. the layered web is not formed and rolled up and then unrolled for use at a remote entangling device 345). In an exemplary embodiment of the continuous process, each of the processes (forming, layering, and entangling in FIG. 1C) are connected to the fiberizing process, such that fibers from the fiberizer are used by the other processes without being stored for later use. In another exemplary embodiment of the continuous process, the fiberizer or fiberizers 318 may have more throughput than is needed by the forming apparatus 332, the layering device 352, and/or the entangling device. As such, the fibers need not be continuously supplied by the fiberizer 318 to the forming apparatus 332 for the process to be continuous. For example, the fiberizer 318 can produce batches of fibers that are accumulated and provided to the forming apparatus 332 in the same factory in the continuous process, but the fibers are not compressed, shipped, and reopened in the continuous process. As another example of continuous process, the fibers produced by the fiberizer 318 can alternately be diverted to the forming apparatus 332 and to another forming apparatus or for some other use or product. In another example of continuous process, a portion of the fibers produced by the fiberizer 318 are continuously directed to the forming apparatus 332 and a remainder of the fibers are directed to another forming apparatus or for some other use or product.

In one exemplary embodiment, the entangled pack 370 of layered webs is made from a web 321 or webs that is relatively thick and has a low area weight, yet the continuous process has a high throughput and all of the fibers produced by the fiberizer are used to make the entangled pack. For example, a single layer of the web 321 may have the area weights, thicknesses, and densities mentioned above. The high output continuous process may produce between about 750 lbs/hr and 1500 lbs/hr, such as at least 900 lbs/hr or at least 1250 lbs/hr. In an exemplary embodiment, the combination of high web throughput and mechanical entanglement, such as needling, of a continuous process is facilitated by layering of the web 321, such as lapping or cross-lapping of the web. By layering the web 321, the linear speed of the material moving through the layering device is slower than the speed at which the web is formed. For example, in a continuous process, a two layer web will travel through the entangling apparatus 345 at ½ the speed at which the web is formed (3 layers –⅓ the speed, etc.). This reduction in speed allows for a continuous process where a high throughput, low area weight web 321 is formed and converted into a multiple layer, mechanically entangled pack 370. The entangled pack 370 of layered webs can be used in a wide variety of different applications.

In an exemplary embodiment, the layering and entangling of the long, thin fibers results in a strong web 370. For example, the entanglement of the long, thin glass fibers described in this application results in a layered, entangled web with a high tensile strength and a high bond strength. Tensile strength is the strength of the web 370 when the web is pulled in the direction of the length or width of the web. Bond strength is the strength of the web when the web 370 is pulled apart in the direction of the thickness of the web.

Tensile strength and bond strength may be tested in a wide variety of different ways. In one exemplary embodiment, a machine, such as an Instron machine, pulls the web 370 apart at a fixed speed (12 inches per second in the examples described below) and measures the amount of force required to pull the web apart. Forces required to pull the web apart, including the peak force applied to the web before the web rips or fails, are recorded.

In one method of testing tensile strength, the tensile strength in the length direction is measured by clamping the ends of the web along the width of the web, pulling the web 370 along the length of the web with the machine at the fixed speed (12 inches per second in the examples provided below), and recording the peak force applied in the direction of the length of the web. The tensile strength in the width direction is measured by clamping the sides of the web along the width of the web, pulling the web 370 along the width of the web at the fixed speed (12 inches per second in the examples provided below), and recording the peak force applied. The tensile strength in the length direction and the tensile strength in the width direction are averaged to determine the tensile strength of the sample.

In one method of testing bond strength, a sample of a predetermined size (6" by 6" in the examples described below) is provided. Each side of the sample is bonded to a substrate, for example by gluing. The substrates on the opposite side of the sample are pulled apart with the machine at the fixed speed (12 inches per second in the examples provided below), and recording the peak force applied. The peak force applied is divided by the area of the sample (6" by 6" in the examples described below) to provide the bond strength in terms of force over area.

The following examples are provided to illustrate the increased strength of the layered, entangled web 370. In these examples, no binder is included. That is, no aqueous or dry binder is included. These examples do not limit the scope of the present invention, unless expressly recited in the claims. Examples of layered, entangled webs having 4, 6, and 8 layers are provided. However, the layered entangled web 370 may be provided with any number of layers. The layered, entangled web 370 sample length, width, thickness, number of laps, and weight may vary depending on the application for the web 370. In the dense, single layer embodiment illustrated by FIG. 3D, the single layer high density pack 300 may have a weight per square foot that is higher, such as two or more times higher, than in the examples in the following six paragraphs for the same thicknesses listed.

In one exemplary embodiment, a web 370 sample that is 6 inches by 12 inches, has multiple layers, such as two laps (i.e. four layers), is between 0.5 inches thick and 2.0 inches thick, has a weight per square foot between 0.1 and 0.3 lbs/sq ft, has a tensile strength that is greater than 3 lbf, and has a tensile strength to weight ratio that is greater than 40 lbf/lbm, such as from about 40 to about 120 lbf/lbm. In an exemplary embodiment, a bond strength of this sample is greater than 0.1 lbs/sq ft. In an exemplary embodiment, the tensile strength of the sample described in this paragraph is greater than 5 lbf. In an exemplary embodiment, the tensile strength of the sample described in this paragraph is greater than 7.5 lbf. In an exemplary embodiment, the tensile strength of the sample described in this paragraph is greater than 10 lbf. In an exemplary embodiment, the tensile strength of the sample described in this paragraph is greater than 12.5 lbf. In an exemplary embodiment, the tensile strength of the sample described in this paragraph is greater than 13.75 lbf. In an exemplary embodiment, the tensile strength of the sample described in this paragraph is between 3 and 15 lbf. In an exemplary embodiment, the bond strength of the sample described in this paragraph is greater than 2 lbs/sq ft. In an exemplary embodiment, the bond strength of the sample described in this paragraph is greater than 5 lbs/sq ft. In an exemplary embodiment, the bond strength of the sample described in this paragraph is greater than 10 lbs/sq ft. In an exemplary embodiment, the bond strength of the sample described in this paragraph is greater than 15 lbs/sq ft. In an exemplary embodiment, the bond strength of the sample described in this paragraph is greater than 20 lbs/sq ft. In an exemplary embodiment, the tensile strength of the sample described in this paragraph is greater than 5 lbf and the bond strength is greater than 2 lbs/sq ft. In an exemplary embodiment, the tensile strength of the sample described in this paragraph is greater than 7.5 lbf and the bond strength is greater than 7.5 lbs/sq ft. In an exemplary embodiment, the tensile strength of the sample described in this paragraph is greater than 10 lbf and the bond strength is greater than 10 lbs/sq ft. In an exemplary embodiment, the tensile strength of the sample described in this paragraph is greater than 12.5 lbf and the bond strength is greater than 15 lbs/sq ft. In an exemplary embodiment, the tensile strength of the sample described in this paragraph is greater than 13.75 lbf and the bond strength is greater than 20 lbs/sq ft. In an exemplary embodiment, the tensile strength of the sample described in this paragraph is between 3 and 15 lbf and the bond strength is between 0.3 and 30 lbs/sq ft.

In one exemplary embodiment, a web 370 sample that is 6 inches by 12 inches, has multiple layers, such as two laps (i.e. four layers), is between 0.5 inches thick and 1.75 inches thick, has a weight per square foot between 0.12 and 0.27 lbs/sq ft, has a tensile strength that is greater than 3 lbf, and has a tensile strength to weight ratio that is greater than 40 lbf/lbm, such as from about 40 to about 120 lbf/lbm, and a bond strength that is greater than 1 lb/sq ft. In an exemplary embodiment, the tensile strength of the sample described in this paragraph is greater than 5 lbf. In an exemplary embodiment, the tensile strength of the sample described in this paragraph is greater than 7.5 lbf. In an exemplary embodiment, the tensile strength of the sample described in this paragraph is greater than 10 lbf. In an exemplary embodiment, the tensile strength of the sample described in this paragraph is greater than 12.5 lbf. In an exemplary embodiment, the tensile strength of the sample described in this paragraph is greater than 13.75 lbf. In one exemplary embodiment, the tensile strength of the sample described in this paragraph is between 3 and 15 lbf. In an exemplary embodiment, the bond strength of the sample described in this paragraph is greater than 2 lbs/sq ft. In an exemplary embodiment, the bond strength of the sample described in this paragraph is greater than 5 lbs/sq ft. In an exemplary embodiment, the bond strength of the sample described in this paragraph is greater than 10 lbs/sq ft. In an exemplary embodiment, the bond strength of the sample described in this paragraph is greater than 15 lbs/sq ft. In an exemplary embodiment, the bond strength of the sample described in this paragraph is greater than 20 lbs/sq ft. In an exemplary embodiment, the tensile strength of the sample described in this paragraph is greater than 5 lbf and the bond strength is greater than 2 lbs/sq ft. In an exemplary embodiment, the tensile strength of the sample described in this paragraph is greater than 7.5 lbf and the bond strength is greater than 7.5 lbs/sq ft. In an exemplary embodiment, the tensile strength of the sample described in this paragraph is greater than 10 lbf and the bond strength is greater than 10 lbs/sq ft. In an exemplary embodiment, the tensile strength of the sample described in this paragraph is greater than 12.5 lbf and the bond strength is greater than 15 lbs/sq ft. In an exemplary embodiment, the tensile strength of the sample described in this paragraph is greater than 13.75 lbf and the bond strength is greater than 20 lbs/sq ft. In an exemplary embodiment, the tensile strength of the sample described in this paragraph is between 3 and 15 lbf and the bond strength is between 0.3 and 30 lbs/sq ft.

In one exemplary embodiment, a web 370 sample that is 6 inches by 12 inches, has multiple layers, such as two laps (i.e. four layers), is between 0.5 inches thick and 1.25 inches thick, has a weight per square foot between 0.2 and 0.3 lbs/sq ft, has a tensile strength that is greater than 10 lbf, and has a tensile strength to weight ratio that is greater than 75 lbf/lbm, such as from about 75 about 120 lbf/lbm. In an exemplary embodiment, the tensile strength of the sample described in this paragraph is greater than 12.5 lbf. In an exemplary embodiment, the tensile strength of the sample described in this paragraph is greater than 13.75 lbf. In one exemplary embodiment, the tensile strength of the sample described in this paragraph is between 3 and 15 lbf. In one exemplary embodiment, the bond strength of the sample described in this paragraph is greater than 3 lb/sq ft. In an exemplary embodiment, the bond strength of the sample described in this paragraph is greater than 10 lb/sq ft. In an exemplary embodiment, the bond strength of the sample described in this paragraph is greater than 15 lb/sq ft. In one exemplary embodiment, the tensile strength of the sample described in this paragraph is greater than 10 lbf and the bond strength is greater than 3 lb/sq ft. In an exemplary embodiment, the tensile strength of the sample described in this paragraph is greater than 12.5 lbf and the bond strength is greater than 10 lb/sq ft. In an exemplary embodiment, the tensile strength of the sample described in this paragraph is greater than 13.75 lbf and the bond strength is greater than 15 lb/sq ft.

In one exemplary embodiment, a web 370 sample that is 6 inches by 12 inches, has multiple layers, such as three laps (i.e. six layers), is between 1.0 inches thick and 2.25 inches thick, has a weight per square foot between 0.15 and 0.4 lbs/sq ft, has a tensile strength that is greater than 5 lbf, and has a tensile strength to weight ratio that is greater than 40 lbf/lbm, such as from about 40 to about 140 lbf/lbm. In an exemplary embodiment, the bond strength of this sample is greater than 0.1 lbs/sq ft. In an exemplary embodiment, the tensile strength of the sample described in this paragraph is greater than 7.5 lbf. In an exemplary embodiment, the tensile strength of the sample described in this paragraph is greater than 10 lbf. In an exemplary embodiment, the tensile strength of the sample described in this paragraph is greater than 12.5 lbf. In an exemplary embodiment, the tensile strength of the sample described in this paragraph is greater than 13.75 lbf. In an exemplary embodiment, the tensile strength of the sample described in this paragraph is between 5 and 20 lbf. In an exemplary embodiment, the bond strength of the sample described in this paragraph is greater than 0.5 lbs/sq ft. In an exemplary embodiment, the bond strength of the sample described in this paragraph is greater than 1.0 lbs/sq ft. In an exemplary embodiment, the bond strength of the sample described in this paragraph is greater than 1.5 lbs/sq ft. In an exemplary embodiment, the bond strength of the sample described in this paragraph is greater than 2.0 lbs/sq ft. In an exemplary embodiment, the bond strength of the sample described in this paragraph is greater than 2.5 lbs/sq ft. In an exemplary embodiment, the bond strength of the sample described in this paragraph is greater than 3.0 lbs/sq ft. In an exemplary embodiment, the tensile strength of the sample described in this paragraph is greater than 7.5 lbf and the bond strength is greater than 0.40 lbs/sq ft. In an exemplary embodiment, the tensile strength of the sample described in this paragraph is greater than 10 lbf and the bond strength is greater than 0.6 lbs/sq ft. In an exemplary embodiment, the tensile strength of the sample described in this paragraph is greater than 12.5 lbf and the bond strength is greater than 0.9 lbs/sq ft. In an exemplary embodiment, the tensile strength of the sample described in this paragraph is between 5 and 20 lbf and the bond strength is between 0.1 and 4 lbs/sq ft.

In one exemplary embodiment, a web 370 sample that is 6 inches by 12 inches, has multiple layers, such as three laps (i.e. six layers), is between 1.0 inches thick and 1.50 inches thick, and has a weight per square foot between 0.25 and 0.4 lbs/sq ft, has a tensile strength that is greater than 9 lbf, and has a tensile strength to weight ratio that is greater than 50 lbf/lbm, such as from about 50 to about 140 lbf/lbm. In an exemplary embodiment, the tensile strength of the sample described in this paragraph is greater than 12.5 lbf. In an exemplary embodiment, the tensile strength of the sample described in this paragraph is greater than 13.75 lbf. In one exemplary embodiment, the tensile strength of the sample described in this paragraph is between 9 and 15 lbf. In an exemplary embodiment, the bond strength of the sample described in this paragraph is greater than 0.5 lbs/sq ft. In an exemplary embodiment, the bond strength of the sample described in this paragraph is greater than 1.0 lbs/sq ft. In an exemplary embodiment, the bond strength of the sample described in this paragraph is greater than 1.5 lbs/sq ft. In an exemplary embodiment, the bond strength of the sample described in this paragraph is greater than 2.0 lbs/sq ft. In an exemplary embodiment, the bond strength of the sample described in this paragraph is greater than 2.5 lbs/sq ft. In an exemplary embodiment, the bond strength of the sample described in this paragraph is greater than 3.0 lbs/sq ft. In an exemplary embodiment, the tensile strength of the sample described in this paragraph is greater than 9 lbf and a bond strength that is greater than 0.5 lbs/sq ft. In an exemplary embodiment, the tensile strength of the sample described in this paragraph is greater than 12.5 lbf and a bond strength that is greater than 1.0 lbs/sq ft. In an exemplary embodiment, the tensile strength of the sample described in this paragraph is greater than 13.75 lbf and a bond strength that is greater than 2 lbs/sq ft.

In one exemplary embodiment, a web 370 sample that is 6 inches by 12 inches, has multiple layers, such as four laps (i.e. eight layers), is between 0.875 inches thick and 2.0 inches thick, and has a weight per square foot between 0.15 and 0.4 lbs/sq ft, has a tensile strength that is greater than 3 lbf, and has a tensile strength to weight ratio that is greater than 40 lbf/lbm, such as from about 40 to about 130 lbf/lbm. In one exemplary embodiment, the web has a bond strength that is greater than 0.3 lbs/sq ft. In an exemplary embodiment, the bond strength of this sample is greater than 0.1 lbs/sq ft. In an exemplary embodiment, the tensile strength of the sample described in this paragraph is greater than 7.5 lbf. In an exemplary embodiment, the tensile strength of the sample described in this paragraph is greater than 10 lbf. In one exemplary embodiment, the tensile strength of the sample described in this paragraph is between 3 and 15 lbf. In an exemplary embodiment, the bond strength of the sample described in this paragraph is greater than 0.5 lbs/sq ft. In an exemplary embodiment, the bond strength of the sample described in this paragraph is greater than 1.0 lbs/sq ft. In an exemplary embodiment, the bond strength of the sample described in this paragraph is greater than 2 lbs/sq ft. In an exemplary embodiment, the bond strength of the sample described in this paragraph is greater than 3 lbs/sq ft. In an exemplary embodiment, the bond strength of the sample described in this paragraph is greater than 4 lbs/sq ft. In an exemplary embodiment, the bond strength of the sample described in this paragraph is greater than 5 lbs/sq ft. In an exemplary embodiment, the bond strength of the sample described in this paragraph is greater than 10 lbs/sq ft. In an exemplary embodiment, the tensile strength of the sample described in this paragraph is greater than 7.5 lbf and the bond strength is greater than 0.5 lbs/sq ft. In an exemplary embodiment, the tensile strength of the sample described in this paragraph is greater than 10 lbf and the bond strength is greater than 1.0 lbs/sq ft. In one exemplary embodiment, the tensile strength of the sample described in this paragraph is between 3 and 15 lbf and the bond strength is between 0.3 and 15 lbs/sq ft.

In one exemplary embodiment, a web 370 sample that is 6 inches by 12 inches, has multiple layers, such as four laps (i.e. eight layers), is between 1.0 inches thick and 2.0 inches thick, and has a weight per square foot between 0.1 and 0.3 lbs/sq ft, has a tensile strength that is greater than 9 lbf, and has a tensile strength to weight ratio that is greater than 70 lbf/lbm. In an exemplary embodiment, the tensile strength of the sample described in this paragraph is greater than 10 lbf. In an exemplary embodiment, the bond strength of the sample described in this paragraph is greater than 0.5 lbs/sq ft. In an exemplary embodiment, the bond strength of the sample described in this paragraph is greater than 1.0 lbs/sq ft. In an exemplary embodiment, the bond strength of the sample described in this paragraph is greater than 2 lbs/sq ft. In an exemplary embodiment, the bond strength of the sample described in this paragraph is greater than 3 lbs/sq ft. In an exemplary embodiment, the bond strength of the sample described in this paragraph is greater than 4 lbs/sq ft. In an exemplary embodiment, the bond strength of the sample described in this paragraph is greater than 5 lbs/sq ft. In an exemplary embodiment, the bond strength of the sample described in this paragraph is greater than 10 lbs/sq ft. In an exemplary embodiment, the tensile strength of the sample described in this paragraph is greater than 10 lbf and the bond strength is greater than 5 lbs/sq ft.

In one exemplary embodiment, an entangled web made in accordance FIGS. 1A-1C and FIGS. 3A-3C have combined physical properties in the ranges set forth in following Table 1.

TABLE 1

| Property | Min | Max |
|---|---|---|
| Fiber Composition | Conventional glass compositions, for example the glass compositions disclosed by US Published Application Pub. No. 2010/0151223; and/or U.S. Pat. Nos. 6,527,014; 5,932,499; 5,523,264; and/or 5,055,428. | |
| Diameter | 15 HT (Hundred Thousanth of an inch) | 19 HT |
| LOI | LOI (loss on ignition) due to binder loss will not be present, since the entangled web is binderless. Measured LOI is related to small amounts of processing aids. | |
| Laps (1 Lap = 2 Layers) | 1 | 4 |
| Square Foot Weight (total pack) | 0.11 lb/ft$^2$ | 0.38 lb/ft$^2$ |
| Square Foot Weight (single lap) | 0.10 lb/ft$^2$ | 0.15 lb/ft$^2$ |
| Thickness (total pack) | 0.375 in | 1.5 in |
| Thickness (single lap) | 0.375 in | 0.85 in. |
| Density | 0.9 lb/ft$^3$ | 4.2 lb/ft$^3$ |
| k-value @ 75 F. | 0.333 btu-in/ [hr · ft$^2$ · ° F.] | 0.203 btu-in/ [hr · ft$^2$ · ° F.] |
| k-value @ 500 F. | 0.634 btu-in/ [hr · ft$^2$ · ° F.] | 0.387 btu-in/ [hr · ft$^2$ · ° F.] |
| Tensile (total pack) | 3.0 lb-f | 20.0 lb-f |
| Tensile (single lap) | 3.0 lb-f | 15.0 lb-f |
| Bond (total pack) | 0.1 lb/ft$^2$ | 45 lb/ft$^2$ |
| Bond (single lap) | 0.1 lb/ft$^2$ | 15 lb/ft$^2$ |

US Published Application Pub. No. 2010/0151223; and/or U.S. Pat. Nos. 6,527,014; 5,932,499; 5,523,264; and 5,055,428 are incorporated by reference in their entirety. In one exemplary embodiment, the fiber diameters and fiber lengths identified in this application refer to a majority of the fibers of a group of fibers that are provided by a fiberizer or other fiber forming apparatus, but are not otherwise processed after formation of the fibers. In another exemplary embodiment, the fiber diameters and fiber lengths identified in this application refer a group of fibers that are provided by a fiberizer or other fiber forming apparatus, but are not otherwise processed after formation of the fibers, where a minority or any number of the fibers have the fiber diameter and/or fiber length.

Figure 2C:
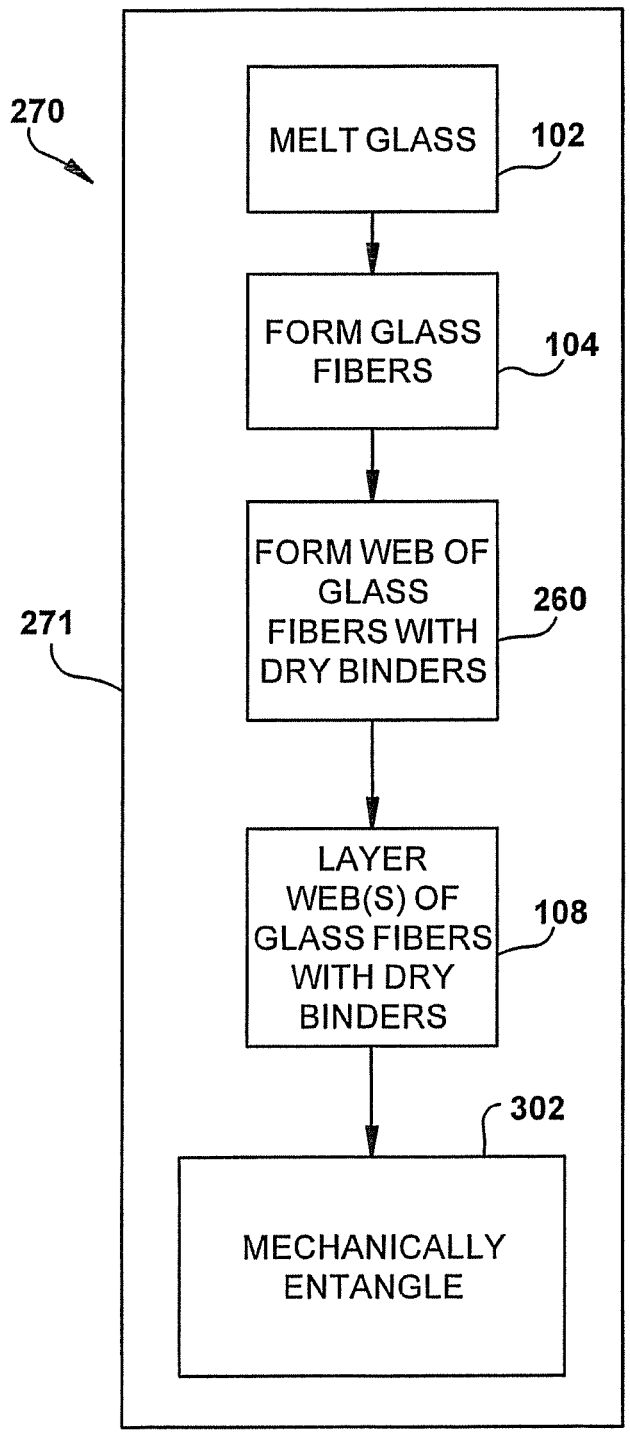
FIG. 2C is a flowchart of an exemplary embodiment of a method for forming a binderless layered and entangled web or pack of glass fibers with dry binder.

FIGS. 2A-2C illustrate exemplary embodiments of methods that are similar to the embodiments of FIGS. 1A-1C, except the web 521 (see FIG. 5) is formed 260 with a dry or non-aqueous binder. The method 200 of FIG. 2A generally corresponds to the method 100 of FIG. 1A. The method 250 of FIG. 2B generally corresponds to the method 150 of FIG. 1B. The method 270 of FIG. 2C generally corresponds to the method 170 of FIG. 1C.

Figure 2D:
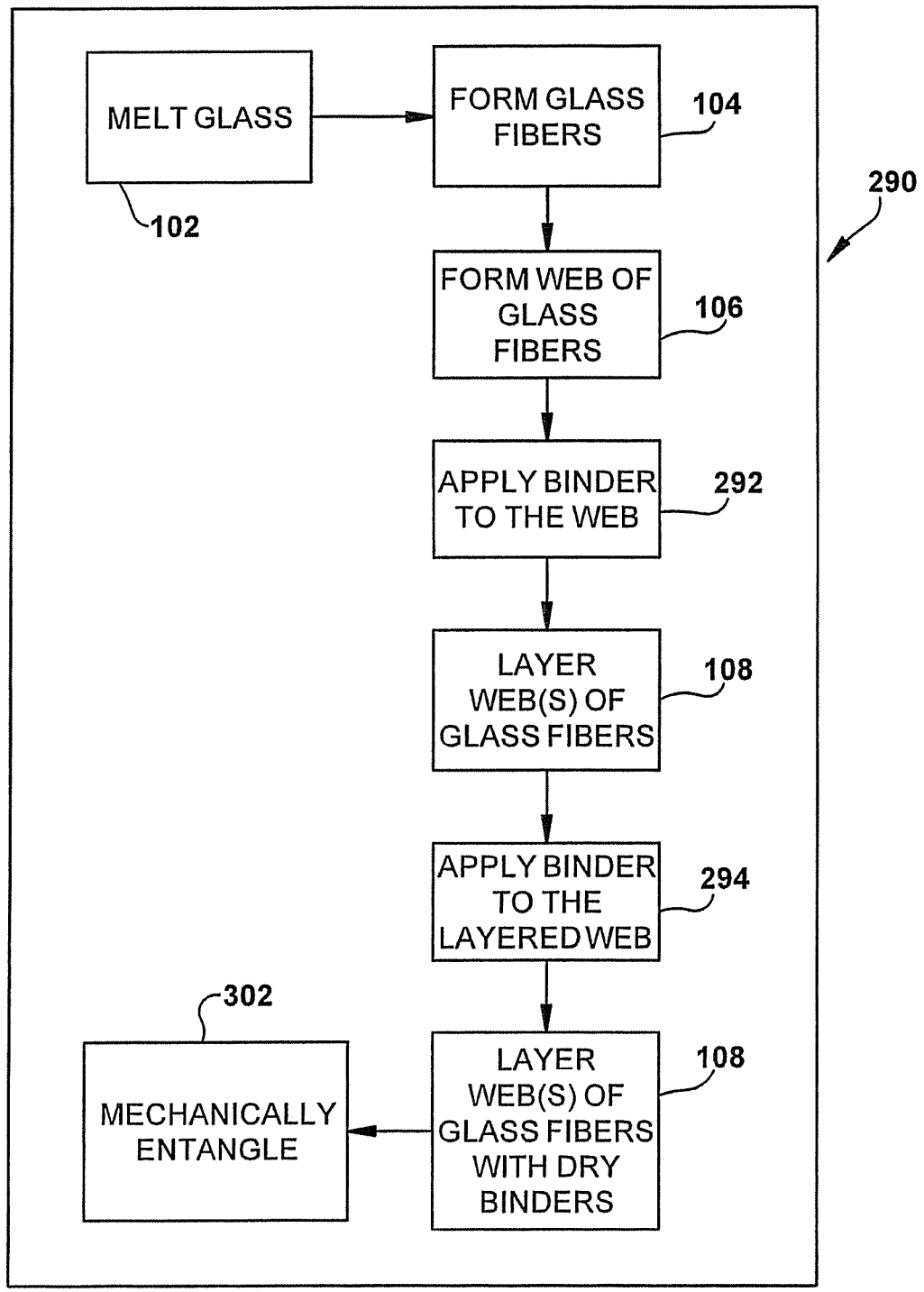
FIG. 2D is a flowchart of an exemplary embodiment of a method for forming a binderless layered and entangled web or pack of glass fibers with dry binder.

FIG. 2D illustrates a method 290 that is similar to the method 270 of FIG. 2C. In FIG. 2D, the steps in boxes with dashed lines are optional. In the exemplary embodiment illustrated by FIG. 2D, the dry binder can optionally be added to the web step 292 and/or the layered web at step 294, instead of (or in addition to) before the web is formed. For example, if step 292 is included, the web may be formed without a dry binder, and then the dry binder is added to the web before layering and/or during layering. If step 294 is included, the web may be formed and layered without a dry binder, and then the dry binder is added to the layered web.

Figure 5A:
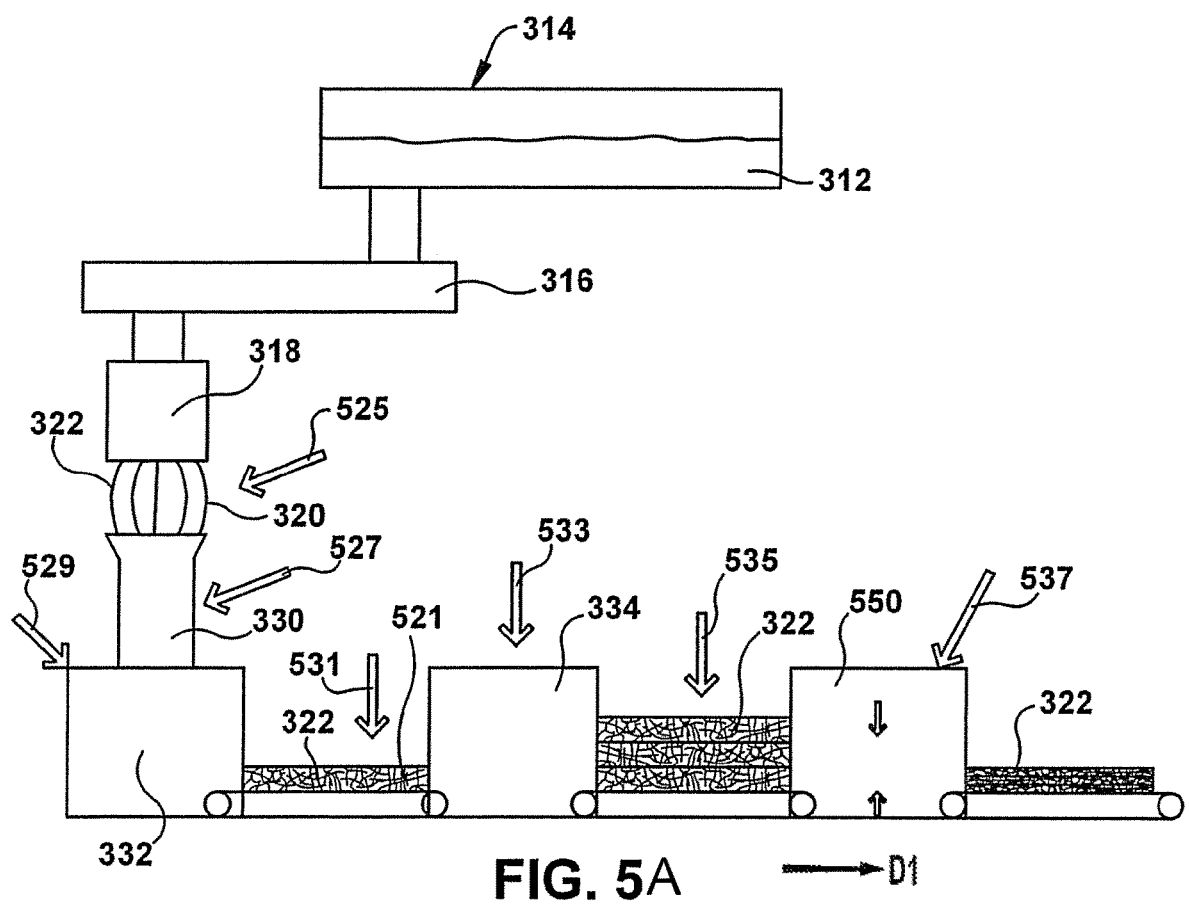
FIG. 5A is a schematic illustration of an exemplary apparatus for forming a web or pack of glass fibers with a dry binder.
Figure 8:
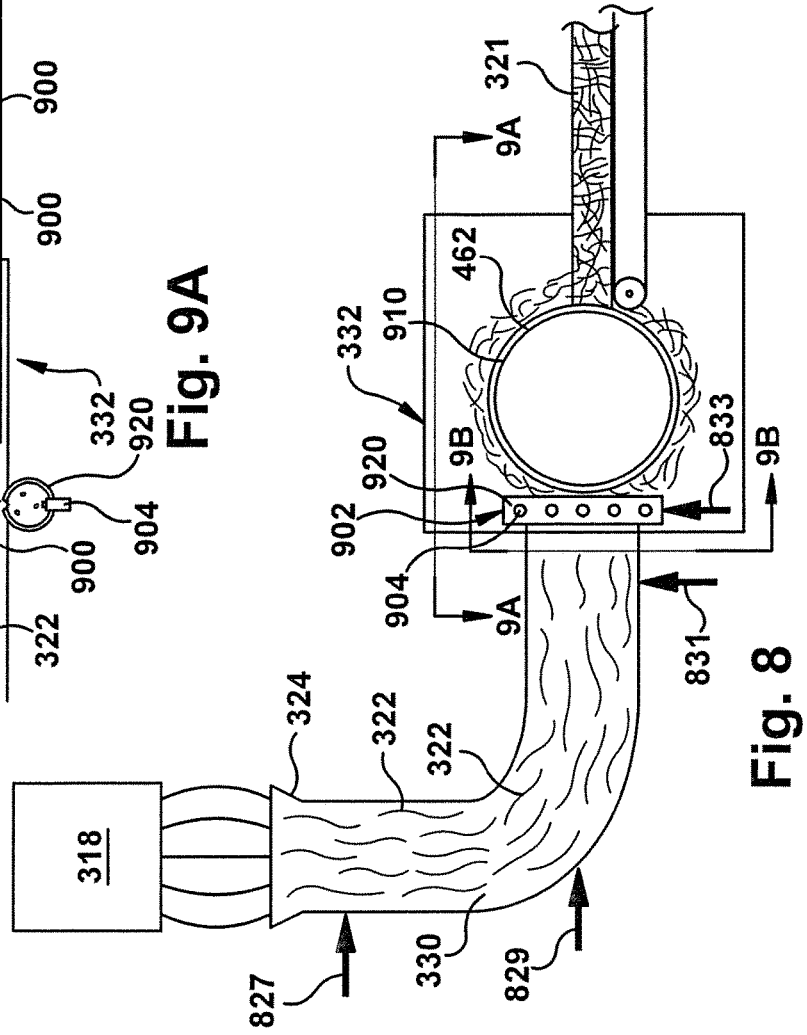
FIG. 8 is a schematic illustration of an exemplary apparatus for forming a web or pack of glass fibers with a dry binder.

Referring to FIG. 5A, the dry binder (indicated by the large arrows) can be added to the fibers 322 and/or the web 521 at a variety of different points in the process. Arrow 525 indicates that the dry binder can be added to the fibers 322 at or above the collecting member. Arrow 527 indicates that the dry binder can be added to the fibers 322 in the duct 330. Arrow 529 indicates that the dry binder can be added to the fibers 322 in the forming apparatus 332. Arrow 531 indicates that the dry binder can be added to the web 321 after the web leaves the forming apparatus 332. Arrow 533 indicates that the dry binder can be added to the web 321 as the web is layered by the layering apparatus 334. Arrow 535 indicates that the dry binder can be added to the web 321 after the web is layered. Arrow 537 indicates that the dry binder can be added to the web 321 or layered web in the oven 550. Referring to FIG. 8, arrow 827 indicates that the dry binder can be added to the fibers 322 in the duct 330 at a position near the fiberizer. Arrow 829 indicates that the dry binder can be added to the fibers 322 in the duct 330 at an elbow of the duct. Arrow 831 indicates that the dry binder can be added to the fibers in the duct 330 at an exit end of the duct. Arrow 833 indicates that the dry binder can be added to the fibers 322 in a forming apparatus 332 having a drum shaped forming surface. The dry binder can be added to the fibers 322 or the web 321 to form a web 521 with dry binder in any manner.

Figure 5B:
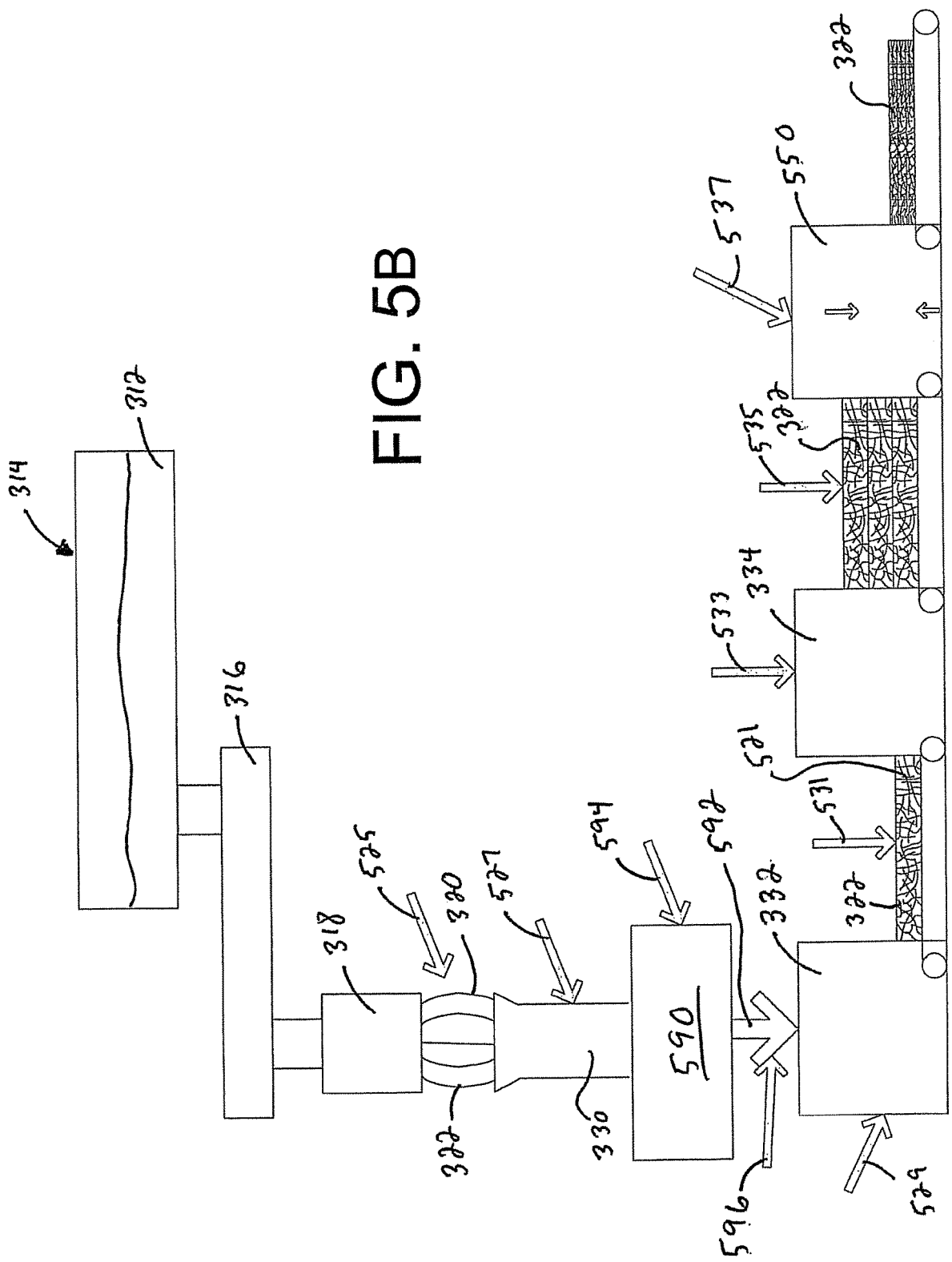
FIG. 5B is a schematic illustration of an exemplary apparatus for forming a web or pack of glass fibers with a dry binder.

FIG. 5B is an embodiment similar to the embodiment of FIG. 5A, except the fibers 322 are collected by an accumulator 590. Arrow 592 indicates that the fibers 322 are provided by the accumulator 590 in a controlled manner to the forming apparatus 332. The fibers 322 may dwell in the accumulator 590 for a predetermined period of time before being provided to the forming apparatus 332 to allow the fibers to cool. In one exemplary embodiment, the fibers 322 are provided by the accumulator 590 to the forming apparatus 332 at the same rate the fibers 322 are provided to the accumulator 590. As such, in this exemplary embodiment, the time that the fibers dwell and cool in the accumulator is determined by the amount of fibers 322 in the accumulator. In this example, the dwell time is the amount of fibers in the accumulator divided by the rate at which the fibers are provided by the accumulator to the forming apparatus 332. In another exemplary embodiment, the accumulator 390 can selectively start and stop dispensing the fibers and/or adjust the rate at which the fibers are dispensed. The dry binder can be applied to the fibers 322 at any of the locations indicated by FIG. 5A. In addition, the dry binder can be applied to the fibers 322 in the accumulator as indicated by arrow 594 and/or as the fibers are transferred from the accumulator 590 to the forming apparatus 332 as indicated by arrow 596.

FIG. 5C is an embodiment similar to the embodiment of FIG. 5A, except the fibers 322 can be selectively diverted between the forming apparatus 332 and a second forming apparatus and/or for some other use by a diverting mechanism 598. In one exemplary embodiment, the embodiment illustrated by FIG. 5A may have both the accumulator 590 and the diverting mechanism 598. The dry binder can be applied to the fibers 322 at any of the locations indicated by FIG. 5A. In addition, the dry binder can be applied to the fibers 322 in the diverting mechanism as indicated by arrow 595 and/or as the fibers are transferred from the diverting mechanism 598 to the forming apparatus 332 as indicated by arrow 597.

In one exemplary embodiment, the dry binder is applied to the fibers 322 at a location that is significant distance downstream from the fiberizer 318. For example, the dry binder may be applied to the fibers at a location where the temperature of the fibers and/or a temperature of the air surrounding the fibers is significantly lower than the temperature of the fibers and the surrounding air at the fiberizer. In one exemplary embodiment, the dry binder is applied at a location where a temperature of the fibers and/or a temperature of air that surrounds the fibers is below a temperature at which the dry binder melts or a temperature at which the dry binder fully cures or reacts. For example, a thermoplastic binder may be applied at a point in the production line where a temperature of the fibers 322 and/or a temperature of air that surrounds the fibers are below the melting point of the thermoplastic binder. A thermoset binder may be applied at a point in the production line where a temperature of the fibers 322 and/or a temperature of air that surrounds the fibers are below a curing temperature of the thermoset binder. That is, the thermoset binder may be applied at a point where a temperature of the fibers 322 and/or a temperature of air that surrounds the fibers is below a point where the thermoset binder fully reacts or full cross-linking of the thermoset binder occurs. In one exemplary embodiment, the dry binder is applied at a location in the production line where the temperature of the fibers 322 and/or a temperature of air that surrounds the fibers are below 300 degrees F. In one exemplary embodiment, the dry binder is applied at a location in the production line where the temperature of the fibers 322 and/or a temperature of air that surrounds the fibers are below 250 degrees F. In one exemplary embodiment, the temperature of the fibers and/or a temperature of air that surrounds the fibers at the locations indicated by arrows 527, 529, 531, 533, and 535 in FIG. 5 is below a temperature at which the dry binder melts or fully cures.

In one exemplary embodiment, the binder applicator is a sprayer configured for dry powders. The sprayer may be configured such that the force of the spray is adjustable, thereby allowing more or less penetration of the dry powder into the continuous web of fibrous material. Alternatively, the binder applicator can be other structures, mechanisms or devices or combinations thereof, such as for example a vacuum device, sufficient to draw the dry binder into the continuous web 321 of glass fibers. For example, the dry binder may comprise binder fibers that are provided in bale form. The binder applicator comprises a bale opener and blower that opens the bale, separates the binder fibers from one another, and blows the binder fibers into the duct where the binder is mixed with the fiberglass fibers. The dry binder may comprise a powder. The binder applicator may comprise a screw delivery device that delivers the binder powder to an air nozzle that delivers the binder powder into the duct, where the binder powder is mixed with the fibers. The dry binder may comprise a non-aqueous liquid. The binder applicator may comprise a nozzle that delivers the liquid binder into the duct, where the binder is mixed with the fibers.

Figure 9A:
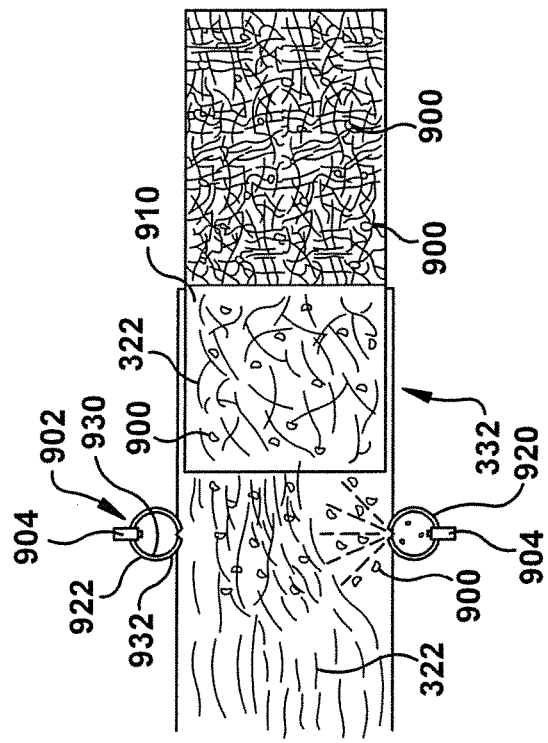
FIG. 9A is a sectional illustration taken along lines 9A-9A in FIG. 8.
Figure 9B:
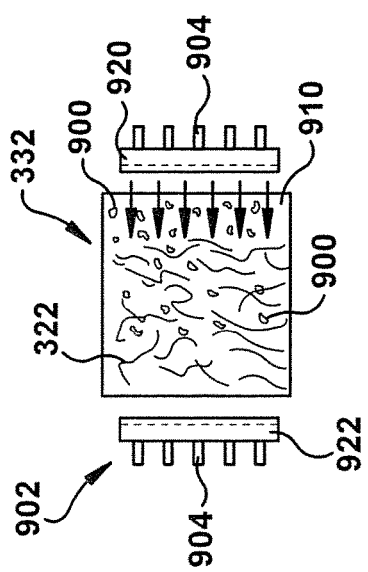
FIG. 9B is a sectional illustration taken along lines 9A-9A in FIG. 8.

FIGS. 9, 9A, and 9B, illustrate an exemplary embodiment where binder 900, such as binder in fiber or powder form, fiber form, or non-aqueous liquid form, is applied with a modified air lapper 902. Air lappers are well known in the art. Examples of air lappers are disclosed in U.S. Pat. Nos. 4,266,960; 5,603,743; and 4,263,033 and PCT International Publication Number WO 95/30036, which are incorporated herein by reference in their entirety. Any of the features of the air lappers disclosed by U.S. Pat. Nos. 4,266,960; 5,603,743; and 4,263,033 and PCT International Publication Number WO 95/30036 can be used in the air lapper 902 that is schematically illustrated in this patent application. One existing type of air lapper 902 is an Air Full Veil Lapper (AFVL). The air lapper 902 illustrated by FIGS. 9, 9A, and 9B differs from conventional air lappers in that the air lapper is configured to apply the binder 900.

FIG. 8 illustrates the a rotary fiberizer 318, optional gathering member 324, duct 330, and forming apparatus 332. The apparatus illustrated by FIG. 8 will typically also include the melter 314, and forehearth 316 illustrated by FIG. 5. The melter 314, forearth, and other components illustrated in FIG. 5 are omitted in FIG. 8 to simplify the drawing.

Referring to FIG. 8, the forming apparatus 332 can be configured to form a continuous web 321 of fibrous material having a desired thickness. The forming apparatus 332 can take a wide variety of different forms. Any arrangement for forming a web 321 of glass fibers can be used. In the exemplary embodiment illustrated by FIG. 8, the forming apparatus 332 includes a rotating drum 910 with forming surfaces 462 and areas of higher or lower pressure. The collection of the fibers using a pressure drop $\Delta P$ across the surface 462 is as described with respect to FIG. 4.

Referring to FIGS. 9A and 9B, the air lapper 902 includes a first blower 920 and a second blower 922. The air lapper operates by blowing, such as alternately blowing with the first and second blowers 920, 922. The blower 920 provides airflow against fibers traveling in the duct toward the forming surface 462, while the blower 922 does not provide airflow (See FIGS. 9A and 9B). After a controlled amount of time, the blower 922 provides airflow against fibers traveling in the duct toward the forming surface 462, while the blower 920 does not provide airflow. This alternate operation by the first and second blowers 920, 922 provides an even distribution of fibers 322 collected on the forming surface 462.

The air lapper 902 illustrated by FIGS. 9, 9A, and 9B differ from conventional air lappers in that each of the blowers 920, 922 include one or more binder introduction devices 904. The binder introduction devices 904 can take a wide variety of different forms. For example, the binder introduction devices 904 can provide binder 900 into an interior 930 of a housing 932 of the blowers 920, 922 as illustrated, or the binder introduction device may be positioned to introduce binder 900 into the airflow of the blowers 920, 922. For example, a nozzle of a binder introduction device may dispense binder into an airflow stream of the blowers 920, 922. Examples of binder introduction devices include, but are not limited to, nozzles, and blowers that provide less airflow than the blowers 920, 922. In one exemplary embodiment, the binder introduction device 904 injects the binder 900 into the interior 930 of the housing 932 when the blower 920 or 922 is not blowing. Then, when the blower 920 or 922 is turned on, the interior 930 is pressurized and the binder 900 is carried from the interior 930 into the fiber air stream. In the airstream, the air from the air lapper will move the fibers to provide a forming effect on the distribution of fibers on the forming surface 462 and the air will also inject the binder to mix with the fibers in the airstream.

Referring to FIGS. 9A and 9B, the air lapper 902 mixes binder 900 into the fibers 322 that collect on the forming surface 462 to form the web 321. In one exemplary embodiment, when the blower 920 provides airflow 921 against fibers traveling in the duct toward the forming surface 462, the binder introduction device 904 introduces binder 900 to the blower 920 and the airflow 921 provided by the blower 920 mixes the binder with the fibers 322 (Shown in FIGS. 9A and 9B). Similarly, in this embodiment when the blower 922 provides airflow 921 against fibers traveling in the duct toward the forming surface 462, the binder introduction device 904 introduces binder 900 to the blower 922 and the airflow 921 provided by the blower 922 mixes the binder with the fibers 322 (Airflow provided by blower 922 is not shown, but is the same as airflow provided by blower 920). As a result, the binder 900 is uniformly mixed with the fibers 322

The dry binder can take a wide variety of different forms. Any non-aqueous medium that holds the fibers 322 together to form a web 521 can be used. In one exemplary embodiment, the dry binder, while being initially applied to the fibers, is comprised of substantially 100% solids. The term "substantially 100% solids", as used herein, means any binder material having diluents, such as water, in an amount less than or equal to approximately two percent, and preferably less than or equal to one percent by weight of the binder (while the binder is being applied, rather than after the binder has dried or cured). However, it should be appreciated that certain embodiments, the binder can include diluents, such as water, in any amount as desired depending on the specific application and design requirements. In one exemplary embodiment, the dry binder is a thermoplastic resin-based material that is not applied in liquid form and further is not water based. In other embodiments, the dry binder can be other materials or other combinations of materials, including the non-limiting example of polymeric thermoset resins. The dry binder can have any form or combinations of forms including the non-limiting examples of powders, particles, fibers and/or hot melt. Examples of hot melt polymers include, but are not limited to, ethylene-vinyl acetate copolymer, ethylene-acrylate copolymer, low density polyethylene, high density polyethylene, atactic polypropylene, polybutene-1, styrene block copolymer, polyamide, thermoplastic polyurethane, styrene block copolymer, polyester and the like. In one exemplary embodiment, the dry binder is a no added formaldehyde dry binder, which means that the dry binder contains no formaldehyde. However, formaldehyde may be formed if the formaldehyde free dry binder is burned. In one exemplary embodiment, sufficient dry binder is applied such that a cured fibrous pack can be compressed for packaging, storage and shipping, yet regains its thickness—a process known as "loft recovery"—when installed.

In the examples illustrated by FIGS. 2A-2D and 5, the glass fibers 322 can optionally be coated or partially coated with a lubricant before or after the dry binder is applied to the glass fibers. In an exemplary embodiment, the lubricant is applied after the dry binder to enhance the adhesion of the dry binder to the glass fibers 322. The lubricant can be any of the lubricants described above.

Referring to FIG. 5, the continuous web with unreacted dry binder 521 is transferred from the forming apparatus 332 to the optional layering mechanism 334. The layering mechanism may take a wide variety of different forms. For example, the layering mechanism may be a lapping mechanism that layers the web 321 in the machine direction D1 or a cross-lapping mechanism that laps the web in a direction that is substantially orthogonal to the machine direction. The cross-lapping device described above for layering the binderless web 321 can be used to layer the web 521 with unreacted dry binder.

In an exemplary embodiment, the dry binder of the continuous web 521 is configured to be thermally set in a curing oven 550. In an exemplary embodiment, the curing oven 550 replaces the entanglement mechanism 345, since the dry binder holds the fibers 322 together. In another exemplary embodiment, both a curing oven 550 and an entanglement mechanism 345 are included.

Figure 6:
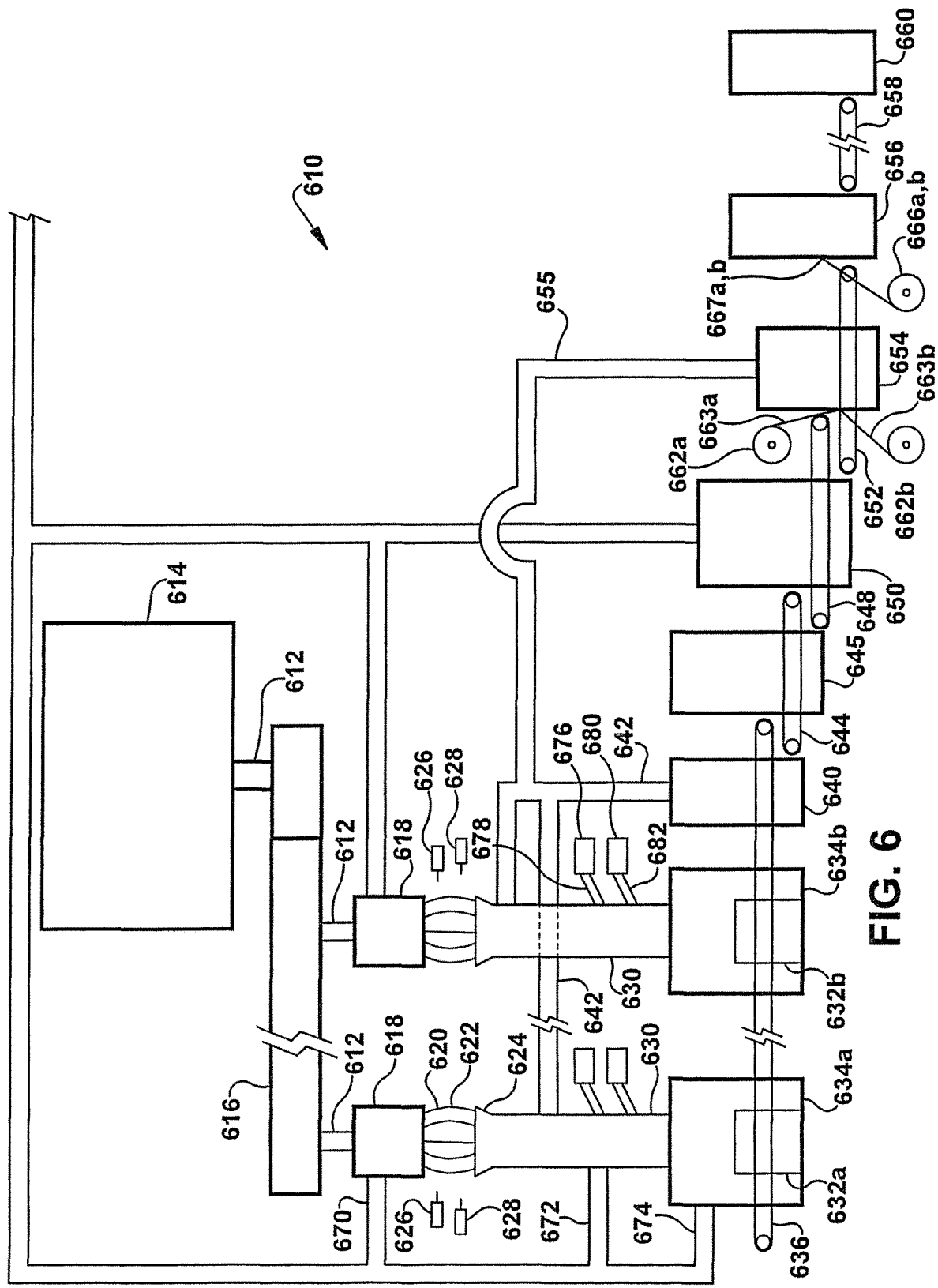
FIG. 6 is a schematic representation, in elevation of a process for forming a pack of fibrous materials.
Figure 7:
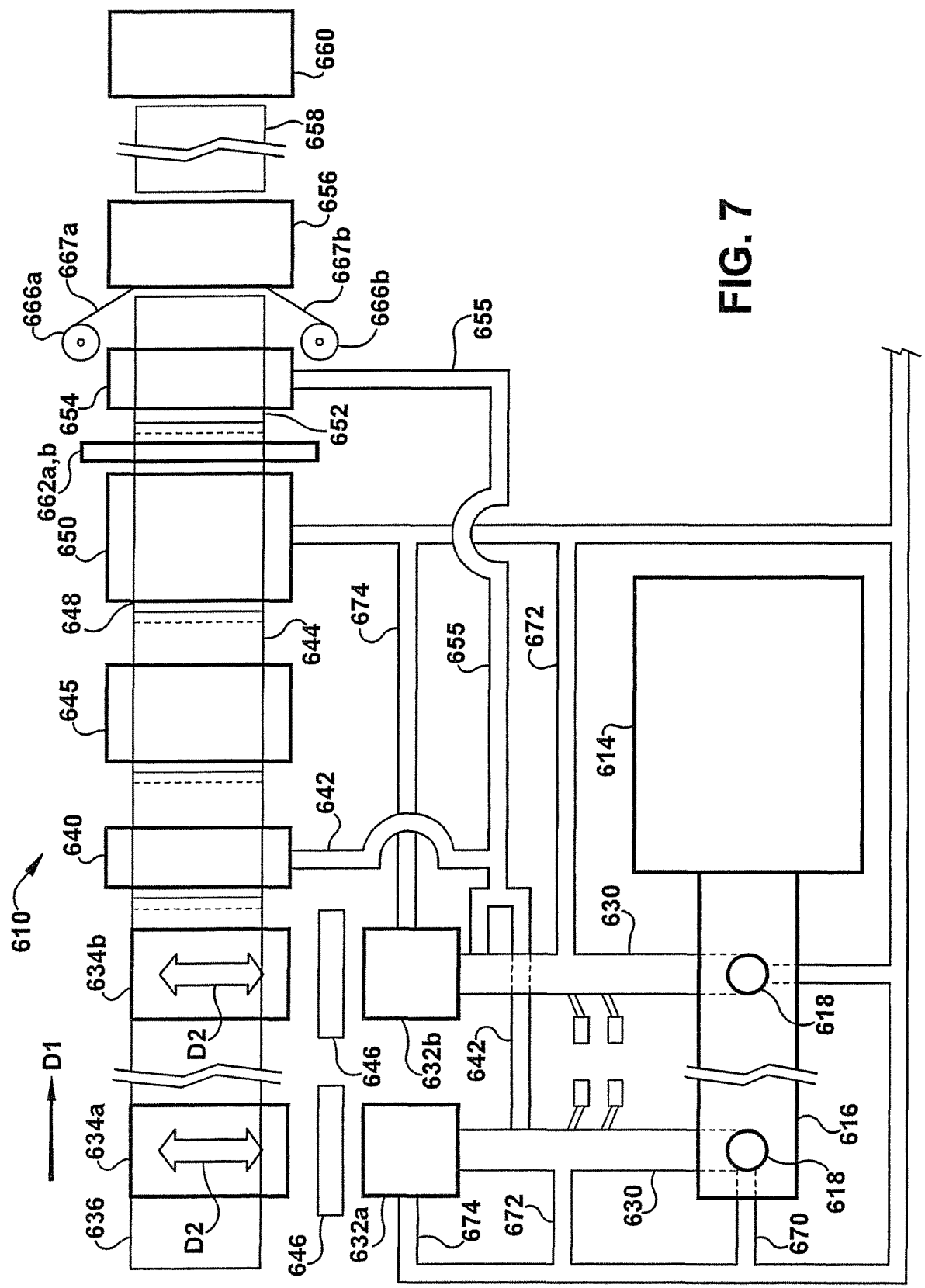
FIG. 7 is a schematic representation, in plan view, of a process for forming a pack from fibrous materials

FIGS. 6 and 7 schematically illustrate another exemplary embodiment of a method for forming a pack from fibrous materials is illustrated generally at 610. Referring to FIG. 6, molten glass 612 is supplied from a melter 614 to a forehearth 616. The molten glass 612 can be formed from various raw materials combined in such proportions as to give the desired chemical composition. The molten glass 612 flows from the forehearth 616 to a plurality of rotary fiberizers 618.

Referring to FIG. 6, the rotary fiberizers 618 receive the molten glass 612 and subsequently form veils 620 of glass fibers 622 entrained in a flow of hot gases. As will be discussed in more detail below, the glass fibers 622 formed by the rotary fiberizers 618 are long and thin. Accordingly, any desired fiberizer, rotary or otherwise, sufficient to form long and thin glass fibers 22 can be used. While the embodiment illustrated in FIGS. 6 and 7 show a quantity of two rotary fiberizers 618, it should be appreciated that any desired number of rotary fiberizers 18 can be used.

The flow of hot gases can be created by optional blowing mechanisms, such as the non-limiting examples of annular blowers (not shown) or annular burners (not shown). Generally, the blowing mechanisms are configured to direct the veil 620 of glass fibers 622 in a given direction, usually in a downward manner. It should be understood that the flow of hot gasses can be created by any desired structure, mechanism or device or any combination thereof.

As shown in FIG. 6, optional spraying mechanisms 626 can be positioned beneath the rotary fiberizers 618 and configured to spray fine droplets of water or other fluid onto the hot gases in the veils 620 to help cool the flow of hot gases, protect the fibers 622 from contact damage and/or enhance the bonding capability of the fibers 622. The spraying mechanisms 626 can be any desired structure, mechanism or device sufficient to spray fine droplets of water onto the hot gases in the veils 620 to help cool the flow of hot gases, protect the fibers 622 from contact damage and/or enhance the bonding capability of the fibers 22. While the embodiment shown in FIG. 6 illustrates the use of the spraying mechanisms 626, it should be appreciated that the use of the spraying mechanisms 626 is optional and the method of forming the pack from fibrous materials 610 can be practiced without the use of the spraying mechanisms 626.

Optionally, the glass fibers 622 can be coated with a lubricant after the glass fibers are formed. In the illustrated embodiment, a plurality of nozzles 628 can be positioned around the veils 620 at a position beneath the rotary fiberizers 618. The nozzles 628 can be configured to supply a lubricant (not shown) to the glass fibers 622 from a source of lubricant (not shown).

The application of the lubricant can be precisely controlled by any desired structure, mechanism or device, such as the non-limiting example of a valve (not shown). In certain embodiments, the lubricant can be a silicone compound, such as siloxane, dimethyl siloxane, and/or silane. The lubricant can also be other materials or combinations of materials, such as for example an oil or an oil emulsion. The oil or oil emulsion may be a mineral oil or mineral oil emulsion and/or a vegetable oil or vegetable oil emulsion. In an exemplary embodiment, the lubricant is applied in an amount of about 1.0 percent oil and/or silicone compound by weight of the resulting pack of fibrous materials. However, in other embodiments, the amount of the lubricant can be more or less than about 1.0 percent oil and/or silicone compound by weight.

While the embodiment shown in FIG. 6 illustrates the use of nozzles 628 to supply a lubricant (not shown) to the glass fibers 622, it should be appreciated that the use of nozzles 628 is optional and the method of forming the pack from fibrous materials 610 can be practiced without the use of the nozzles 628.

In the illustrated embodiment, the glass fibers 622, entrained within the flow of hot gases, can be gathered by an optional gathering member 624. The gathering member 624 is shaped and sized to easily receive the glass fibers 622 and the flow of hot gases. The gathering member 624 is configured to divert the glass fibers 622 and the flow of hot gases to a duct 630 for transfer to downstream processing stations, such as for example forming apparatus 632a and 632b. In other embodiments, the glass fibers 622 can be gathered on a conveying mechanism (not shown) such as to form a blanket or batt (not shown). The batt can be transported by the conveying mechanism to further processing stations (not shown). The gathering member 624 and the duct 630 can be any structure having a generally hollow configuration that is suitable for receiving and conveying the glass fibers 622 and the flow of hot gases. While the embodiment shown in FIG. 6 illustrates the use of the gathering member 624, it should be appreciated that the use of gathering member 624 to divert the glass fibers 622 and the flow of hot gases to the duct 630 is optional and the method of forming the pack from fibrous materials 610 can be practiced without the use of the gathering member 624.

In the embodiment shown in FIGS. 6 and 7, a single fiberizer 618 is associated with an individual duct 630, such that the glass fibers 622 and the flow of hot gases from the single fiberizer 618 are the only source of the glass fibers 622 and the flow of hot gasses entering the duct 630. Alternatively, an individual duct 630 can be adapted to receive the glass fibers 622 and the flow of hot gases from multiple fiberizers 618 (not shown).

Referring again to FIG. 6, optionally, a header system (not shown) can be positioned between the forming apparatus 632a and 632b and the fiberizers 618. The header system can be configured as a chamber in which glass fibers 622 and gases flowing from the plurality of fiberizers 618 can be combined while controlling the characteristics of the resulting combined flow. In certain embodiments, the header system can include a control system (not shown) configured to combine the flows of the glass fibers 622 and gases from the fiberizers 618 and further configured to direct the resulting combined flows to the forming apparatus 632a and 632b. Such a header system can allow for maintenance and cleaning of certain fiberizers 618 without the necessity of shutting down the remaining fiberizers 618. Optionally, the header system can incorporate any desired means for controlling and directing the glass fibers 22 and flows of gases.

Referring now to FIG. 7, the momentum of the flow of the gases, having the entrained glass fibers 622, will cause the glass fibers 622 to continue to flow through the duct 630 to the forming apparatus 632a and 632b. The forming apparatus 632a and 632b can be configured for several functions. First, the forming apparatus 632a and 632b can be configured to separate the entrained glass fibers 622 from the flow of the gases. Second, the forming apparatus 632a and 632b can be configured to form a continuous thin and dry web of fibrous material having a desired thickness. Third, the forming apparatus 632a and 632b can be configured to allow the glass fibers 622 to be separated from the flow of gasses in a manner that allows the fibers to be oriented within the web with any desired degree of "randomness". The term "randomness", as used herein, is defined to mean that the fibers 622, or portions of the fibers 622, can be nonpreferentially oriented in any of the X, Y or Z dimensions. In certain instances, it may be desired to have a high degree of randomness. In other instances, it may be desired to control the randomness of the fibers 622 such that the fibers 622 are non-randomly oriented, in other words, the fibers are substantially coplanar or substantially parallel to each other. Fourth, the forming apparatus 632a and 632b can be configured to transfer the continuous web of fibrous material to other downstream operations.

In the embodiment illustrated in FIG. 7, each of the forming apparatus 632a and 632b include a drum (not shown) configured for rotation. The drum can include any desired quantity of foraminous surfaces and areas of higher or lower pressure. Alternatively, each of the forming apparatus 632a and 632b can be formed from other structures, mechanisms and devices, sufficient to separate the entrained glass fibers 622 from the flow of the gases, form a continuous web of fibrous material having a desired thickness and transfer the continuous web of fibrous material to other downstream operations. In the illustrated embodiment shown in FIG. 7, each of the forming apparatus 632a and 632b are the same. However, in other embodiments, each of the forming apparatus 632a and 632b can be different from each other.

Referring again to FIG. 7, the continuous web of fibrous material is transferred from the forming apparatus 632a and 632b to an optional binder applicator 646. The binder applicator 646 is configured to apply a "dry binder" to the continuous web of fibrous material. The term "dry binder", as used herein, is defined to mean that the binder is comprised of substantially 100% solids while the binder is being applied. The term "substantially 100% solids", as used herein, is defined to mean any binder material having diluents, such as water, in an amount less than or equal to approximately two percent, and preferably less than or equal to approximately one percent by weight of the binder (while the binder is being applied, rather than after the binder has dried and/or cured). However, it should be appreciated that certain embodiments, the binder can include diluents, such as water, in any amount as desired depending on the specific application and design requirements. The binder may be configured to thermally set in a curing oven 650. In this application, the terms "cure" and "thermally set" refer to a chemical reaction and/or one or more phase changes that cause the dry binder to bind the fibers of the web together. For example, a thermoset dry binder (or thermoset component of the dry binder) cures or thermally sets as a result of a chemical reaction that occurs as a result of an application of heat. A thermoplastic dry binder (or thermoplastic component of the dry binder) cures or thermally sets as a result of being heated to a softened or melted phase and then cooled to a solid phase.

In an exemplary embodiment, the dry binder is a thermoplastic resin-based material that is not applied in liquid form and further is not water based. In other embodiments, the dry binder can be other materials or other combinations of materials, including the non-limiting example of polymeric thermoset resins. The dry binder can have any form or combinations of forms including the non-limiting examples of powders, particles, fibers and/or hot melt. Examples of hot melt polymers include, but are not limited to, ethylene-vinyl acetate copolymer, ethylene-acrylate copolymer, low density polyethylene, high density polyethylene, atactic polypropylene, polybutene-1, styrene block copolymer, polyamide, thermoplastic polyurethane, styrene block copolymer, polyester and the like. Sufficient dry binder is applied such that a cured fibrous pack can be compressed for packaging, storage and shipping, yet regains its thickness—a process known as "loft recovery"—when installed. Applying the dry binder to the continuous web of fibrous material forms a continuous web, optionally with unreacted binder.

In the embodiment illustrated by FIGS. 6 and 7, the binder applicator 646 is a sprayer configured for dry powders. The sprayer is configured such that the force of the spray is adjustable, thereby allowing more or less penetration of the dry powder into the continuous web of fibrous material. Alternatively, the binder applicator 646 can be other structures, mechanisms or devices or combinations thereof, such as for example a vacuum device, sufficient to draw a "dry binder" into the continuous web of fibrous material.

While the embodiment illustrated in FIG. 7 shows a binder applicator 646 configured to apply a dry binder to the continuous web of fibrous material, it is within the contemplation of this invention that in certain embodiments no binder will be applied to the continuous web of fibrous material.

Referring again to FIG. 7, the continuous web, optionally with unreacted binder is transferred from the binder applicators 646 to the corresponding cross-lapping mechanism 634a and 634b. As shown in FIG. 7, forming apparatus 632a is associated with cross-lapping mechanism 634a and forming apparatus 632b is associated with cross-lapping mechanism 634b. The cross-lapping mechanisms 634a and 634b function in association with a first conveyor 636. The first conveyor 636 is configured to move in a machine direction as indicated by the arrow D1. The cross-lapping mechanism 634a is configured to receive the continuous web, optionally with unreacted binder, from the optional binder applicators 646 and is further configured to deposit alternating layers of the continuous web, optionally with unreacted binder, on the first conveyer 636 as the first conveyor 636 moves in machine direction D1, thereby forming the initial layers of a fibrous body. In the deposition process, the cross-lapping mechanism 634a forms the alternating layers in a cross-machine direction as indicated by the arrows D2. Accordingly, as the deposited continuous web, optionally with unreacted binder, from crosslapping mechanism 634a travels in machine direction D1, additional layers are deposited on the fibrous body by the downstream cross-lapping mechanism 634b. The resulting layers of the fibrous body deposited by cross-lapping mechanisms 634a and 634b form a pack.

In the illustrated embodiment, the cross-lapping mechanisms 634a and 634b are devices configured to precisely control the movement of the continuous web with unreacted binder and deposit the continuous web with unreacted binder on the first conveyor 636 such that the continuous web, optionally with unreacted binder, is not damaged. The cross-lapping mechanisms 634a and 634b can include any desired structure and can be configured to operate in any desired manner. In one example, the cross-lapping mechanisms 634a and 634b can include a head (not shown) configured to move back and forth in the cross-machine direction D2. In this embodiment, the speed of the moving head is coordinated such that the movement of the head in both cross-machine directions is substantially the same, thereby providing uniformity of the resulting layers of the fibrous body. In another example, vertical conveyors (not shown) configured to be centered with a centerline of the first conveyor 636 can be utilized. The vertical conveyors are further configured to swing from a pivot mechanism above the first conveyor 636 such as to deposit the continuous web, optionally with unreacted binder, on the first conveyor 36. While several examples of cross lapping mechanisms have been described above, it should be appreciated that the cross-lapping mechanisms 634a and 634b can be other structures, mechanisms or devices or combinations thereof.

Referring again to FIG. 7, optionally the positioning of the continuous web, optionally with unreacted binder, on the first conveyor 636 can be accomplished by a controller (not shown), such as to provide improved uniformity of the pack. The controller can be any desired structure, mechanism or device or combinations thereof.

The layered web or pack can have any desired thickness. The thickness of the pack is a function of several variables. First, the thickness of the pack is a function of the thickness of the continuous web, optionally with unreacted binder, formed by each of the forming apparatus 632a and 632b. Second, the thickness of the pack is a function of the speed at which the cross-lapping mechanisms 634a and 634b alternately deposit layers of the continuous web, optionally with unreacted binder, on the first conveyer 636. Third, the thickness of the pack is a function of the speed of the first conveyor 636. In the illustrated embodiment, the pack has a thickness in a range of from about 0.1 inches to about 20.0 inches. In other embodiments, the pack can have a thickness less than about 0.1 inches or more than about 20.0 inches.

As discussed above, the cross lapping mechanisms 634a and 634b are configured to deposit alternating layers of the continuous web, optionally with unreacted binder, on the first conveyer 636 as the first conveyor 636 moves in machine direction D1, thereby forming layers of a fibrous body. In the illustrated embodiment, the cross lapping mechanism 634a and 634b and the first conveyor 636 are coordinated such as to form a fibrous body having a quantity of layers in a range of from about 1 layer to about 60 layers. In other embodiments, the cross lapping mechanism 634a and 634b and the first conveyor 636 can be coordinated such as to form a fibrous body having any desired quantity of layers, including a fibrous body having in excess of 60 layers.

Optionally, the cross-lapping mechanisms 634a and 634b can be adjustable, thereby allowing the cross-lapping mechanisms 634a and 634b to form a pack having any desired width. In certain embodiments, the pack can have a general width in a range of from about 98.0 inches to about 236.0 inches. Alternatively, the pack can have a general width less than about 98.0 inches or more than about 236.0 inches.

While the cross-lapping mechanisms 634a and 634b have been described above as being jointly involved in the formation of a fibrous body, it should be appreciated that in other embodiments, the cross-lapping mechanisms 634a and 634b can operate independently of each other such as to form discrete lanes of fibrous bodies.

Referring to FIGS. 6 and 7, the pack, having the layers formed by the cross-lapping mechanisms 634a and 634b, is carried by the first conveyor 636 to an optional trim mechanism 640. The optional trim mechanism 640 is configured to trim the edges of the pack, such as to form a desired width of the pack. In an exemplary embodiment, the pack can have an after-trimmed width in a range of from about 98.0 inches to about 236.0 inches. Alternatively, the pack can have an after trimmed width less than about 98.0 inches or more than about 236.0 inches.

In the illustrated embodiment, the optional trim mechanism 640 includes a saw system having a plurality of rotating saws (not shown) positioned on either side of the pack. Alternatively, the trim mechanism 640 can be other structures, mechanisms or devices or combinations thereof including the non-limiting examples of water jets, compression knives.

In the illustrated embodiment, the trim mechanism 640 is advantageously positioned upstream from the curing oven 650. Positioning the trim mechanism 640 upstream from the curing oven 650 allows the pack to be trimmed before the pack is thermally set in the curing oven 650. Optionally, materials that are trimmed from the pack by the trim mechanism 640 can be returned to the flow of gasses and glass fibers in the ducts 630 and recycled in the forming apparatus 632a and 632b. Recycling of the trim materials advantageously prevents potential environmental issues connected with the disposal of the trim materials. As shown in FIG. 6, ductwork 642 connects the trim mechanism 640 with the ducts 630 and is configured to facilitate the return of trim materials to the forming apparatus 632a and 632b. While the embodiment shown in FIGS. 6 and 7 illustrate the recycling of the trimmed materials, it should be appreciated that the recycling of the trimmed materials is optional and the method of forming the pack from fibrous materials 610 can be practiced without recycling of the trimmed materials. In another exemplary embodiment, the trim mechanism 640 is positioned downstream from the curing oven 650. This positioning is particularly useful if the trimmed materials are not recycled. Trimming the pack forms a trimmed pack.

The trimmed pack is conveyed by the first conveyor 636 to a second conveyor 644. As shown in FIG. 6, the second conveyor 644 may be positioned to be "stepped down" from the first conveyor 636. The term "stepped down", as used herein, is defined to mean the upper surface of the second conveyor 644 is positioned to be vertically below the upper surface of the first conveyor 636. The stepping down of the conveyors will be discussed in more detail below.

Referring again to FIGS. 1 and 2, the trimmed pack is carried by the second conveyor 644 to an optional entanglement mechanism 645. The entanglement mechanism 645 is configured to entangle the individual fibers 622 forming the layers of the trimmed pack. Entangling the glass fibers 622 within the pack ties the pack together. In the embodiments where dry binder is included, entangling the glass fibers 622 advantageously allows mechanical properties, such as for example, tensile strength and shear strength, to be improved. In the illustrated embodiment, the entanglement mechanism 645 is a needling mechanism. In other embodiments, the entanglement mechanism 645 can include other structures, mechanisms or devices or combinations thereof, including the non-limiting example of stitching mechanisms. While the embodiment shown in FIGS. 6 and 7 illustrate the use of the entanglement mechanism 645, it should be appreciated that the use of the entanglement mechanism 645 is optional and the method of forming the pack from fibrous materials 610 can be practiced without the use of the entanglement mechanism 645. Entangling the fibers within the pack forms an entangled pack.

The second conveyor 644 conveys the pack with optional dry binder, that is optionally trimmed, and/or optionally entangled (hereafter both the trimmed pack and the entangled pack are simply referred to as the "pack") to a third conveyor 648. When the pack includes a dry binder, the third conveyor 648 is configured to carry the pack to an optional curing oven 650. The curing oven 650 is configured to blow a fluid, such as for example, heated air through the pack such as to cure the dry binder and rigidly bond the glass fibers 622 together in a generally random, three-dimensional structure. Curing the pack in the curing oven 650 forms a cured pack.

As discussed above, the pack optionally includes a dry binder. The use of the dry binder, rather than a traditional wet binder, advantageously allows the curing oven 650 to use less energy to cure the dry binder within the pack. In the illustrated embodiment, the use of the dry binder in the curing oven 650 results in an energy savings in a range of from about 30.0% to about 80.0% compared to the energy used by conventional curing ovens to cure wet or aqueous binder. In still other embodiments, the energy savings can be in excess of 80.0%. The curing oven 650 can be any desired curing structure, mechanism or device or combinations thereof.

The third conveyor 648 conveys the cured pack to a fourth conveyor 652. The fourth conveyor 652 is configured to carry the cured pack to a cutting mechanism 654. Optionally, the cutting mechanism 654 can be configured for several cutting modes. In a first optional cutting mode, the cutting mechanism is configured to cut the cured pack in vertical directions along the machine direction D1 such as to form lanes. The formed lanes can have any desired widths. In a second optional cutting mode, the cutting mechanism is configured to bisect the cured pack in a horizontal direction such as to form continuous packs having thicknesses. The resulting bisected packs can have any desired thicknesses. Cutting the cured pack forms cut pack.

In the illustrated embodiment, the cutting mechanism 654 includes a system of saws and knives. Alternatively, the cutting mechanism 654 can be other structures, mechanisms or devices or combinations thereof. Referring again to FIGS. 6 and 7, the cutting mechanism 654 is advantageously positioned such as to allow the capture of dust and other waste materials formed during the cutting operation. Optionally, dust and other waste materials stemming from the cutting mechanism can be returned to the flow of gasses and glass fibers in the ducts 630 and recycled in the forming apparatus 632a and 632b. Recycling of the dust and waste materials advantageously prevents potential environmental issues connected with the disposal of the dust and waste materials. As shown in FIGS. 6 and 7, ductwork 655 connects the cutting mechanism 654 with the ducts 630 and is configured to facilitate the return of dust and waste materials to the forming apparatus 632a and 632b. While the embodiment shown in FIGS. 6 and 7 illustrate the recycling of the dust and waste materials, it should be appreciated that the recycling of the dust and waste materials is optional and the method of forming the pack from fibrous materials 10 can be practiced without recycling of the dust and waste materials.

Optionally, prior to the conveyance of the cured pack to the cutting mechanism 654, the major surfaces of the cured pack can be faced with facing material or materials by facing mechanisms 662a, 662b as shown in FIG. 6. In the illustrated embodiment, the upper major surface of the cured pack is faced with facing material 663a provided by facing mechanism 662a and the lower major surface of the cured pack is faced with facing material 663b provided by facing mechanism 662b. The facing materials can be any desired materials including paper, polymeric materials or non-woven webs. The facing mechanisms 662a and 662b can be any desired structures, mechanisms or devices or combinations thereof. In the illustrated embodiment, the facing materials 663a and 663b are applied to the cured pack (if the pack includes a binder) by adhesives. In other embodiments, the facing materials 663a and 663b can be applied to the cured pack by other methods, including the non-limiting example of sonic welding. While the embodiment shown in FIG. 6 illustrates the application of the facing materials 663a and 663b to the major surfaces of the cured pack, it should be appreciated that the application of the facing materials 663a and 663b to the major surfaces of the cured pack is optional and the method of forming the pack from fibrous materials 610 can be practiced without the application of the facing materials 663a and 663b to the major surfaces of the cured pack.

Referring to FIGS. 6 and 7, the fourth conveyor 652 conveys the cut pack to an optional chopping mechanism 656. The chopping mechanism 656 is configured to section the cut pack into desired lengths across the machine direction D1. In the illustrated embodiment, the chopping mechanism 656 is configured to section the cut pack as the cut pack continuously moves in the machine direction D1. Alternatively, the chopping mechanism 656 can be configured for batch chopping operation. Sectioning the cut pack into lengths forms a dimensioned pack. The lengths of the chopped pack can have any desired dimension.

Chopping mechanisms are known in the art and will not be described herein. The chopping mechanism 656 can be any desired structure, mechanism or device or combinations thereof.

Optionally, prior to the conveyance of the cut pack to the chopping mechanism 656, the minor surfaces of the cut pack can be faced with edging material or materials by edging mechanisms 666a, 666b as shown in FIG. 7. The edging materials can be any desired materials including paper, polymeric materials or nonwoven webs. The edging mechanisms 666a and 666b can be any desired structures, mechanisms or devices or combinations thereof. In the illustrated embodiment, the edging materials 667a and 667b are applied to the cut pack by adhesives. In other embodiments, the edging materials 667a and 667b can be applied to the cut pack by other methods, including the non-limiting example of sonic welding. While the embodiment shown in FIG. 7 illustrate the application of the edging materials 667a and 667b to the minor surfaces of the cut pack, it should be appreciated that the application of the edging materials 667a and 667b to the minor surfaces of the cut pack is optional and the method of forming the pack from fibrous materials 610 can be practiced without the application of the edging materials 667a and 667b to the minor surfaces of the cut pack.

Referring again to FIG. 6, the fourth conveyor 652 conveys the dimensioned pack to a fifth conveyor 658. The fifth conveyor 658 is configured to convey the dimensioned pack to a packaging mechanism 660. The packaging mechanism 660 is configured to package the dimensioned pack for future operations. The term "future operations," as used herein, is defined to include any activity following the forming of the dimensioned pack, including the non-limiting examples of storage, shipping, sales and installation.

In the illustrated embodiment, the packaging mechanism 660 is configured to form the dimensioned pack into a package in the form of a roll. In other embodiments, the packaging mechanism 660 can form packages having other desired shapes, such as the non-limiting examples of slabs, batts and irregularly shaped or die cut pieces. The packaging mechanism 660 can be any desired structure, mechanism or device or combinations thereof.

Referring again to FIG. 6, the conveyors 636, 644, 648, 652 and 658 are in a "stepped down" relationship in the machine direction D1. The "stepped down" relationship means that the upper surface of the successive conveyor is positioned to be vertically below the upper surface of the preceding conveyor. The "stepped down" relationship of the conveyors advantageously provides a self-threading feature to the conveyance of the pack. In the illustrated embodiment, the vertical offset between adjacent conveyors is in a range of from about 3.0 inches to about 10.0 inches. In other embodiments, the vertical offset between adjacent conveyors can be less than about 3.0 inches or more than about 10.0 inches.

As illustrated in FIGS. 6 and 7, the method for forming a pack from fibrous materials 610 eliminates the use of a wet binder, thereby eliminating the traditional needs for washwater and washwater related structures, such as forming hoods, return pumps and piping. The elimination of the use of water, with the exception of cooling water, and the application of lubricant, color and other optional chemicals, advantageously allows the overall size of the manufacturing line (or "footprint") to be significantly reduced as well as reducing the costs of implementation, operating costs and maintenance and repair costs.

As further illustrated in FIGS. 6 and 7, the method for forming a pack from fibrous materials 610 advantageously allows the uniform and consistent deposition of long and thin fibers on the forming apparatus 632a and 632b. In the illustrated embodiment, the fibers 622 have a length in a range of from about 0.25 inches to about 10.0 inches and a diameter dimension in a range of from about 9 HT to about 35 HT. In other embodiments, the fibers 22 have a length in a range of from about 1.0 inch to about 5.0 inches and a diameter dimension in a range of from about 14 HT to about 25 HT. In still other embodiments, the fibers 22 can have a length less than about 0.25 inches or more than about 10.0 inches and a diameter dimension less than about 9 HT or more than about 35 HT. While not being bound by the theory, it is believed the use of the relatively long and thin fibers advantageously provides a pack having better thermal and acoustic insulative performance than a similar sized pack having shorter and thicker fibers.

While the embodiment illustrated in FIGS. 6 and 7 have been generally described above to form packs of fibrous materials, it should be understood that the same apparatus can be configured to form "unbonded loosefill insulation".

The term "unbonded loosefill insulation", as used herein, is defined to mean any conditioned insulation material configured for application in an airstream.

While exemplary embodiments of packs and methods for forming a pack from fibrous materials 610 have been described generally above, it should be appreciated that other embodiments and variations of the method 610 are available and will be generally described below.

Referring to FIG. 7 in another embodiment of the method 610, the cross lapping mechanisms 634a and 634b are configured to provide precise deposition of alternating layers of the continuous web on the first conveyer 36, thereby allowing elimination of downstream trim mechanism 40.

Referring again to FIG. 7 in another embodiment of the method 610, the various layers of the pack can be "stratified". The term "stratified", as used herein, is defined to mean that each of the layers and/or portions of a layer can be configured with different characteristics, including the non-limiting examples of fiber diameter, fiber length, fiber orientation, density, thickness and glass composition. It is contemplated that the associated mechanisms forming a layer, that is, the associated fiberizer, forming apparatus and cross lapping mechanism can be configured to provide a layer and/or portions of the layer having specific and desired characteristics. Accordingly, a pack can be formed from layers and/or portions of layers having different characteristics.

Figure 10A:
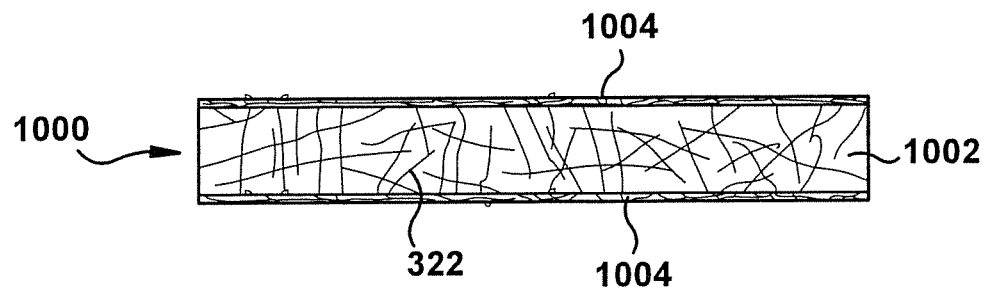
FIG. 10A is a schematic illustration of an exemplary embodiment of an insulation product.
Figure 10B:
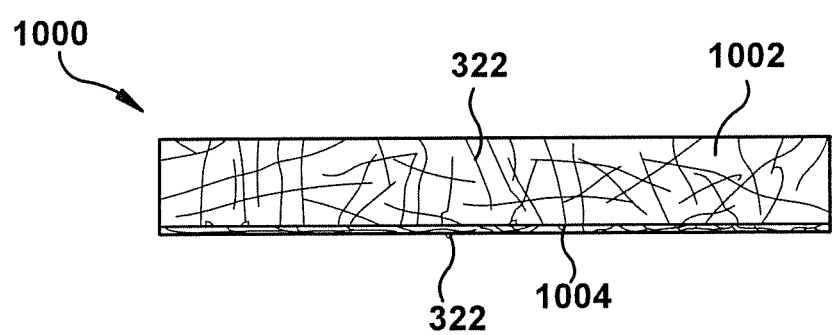
FIG. 10B is a schematic illustration of an exemplary embodiment of an insulation product.
Figure 10C:
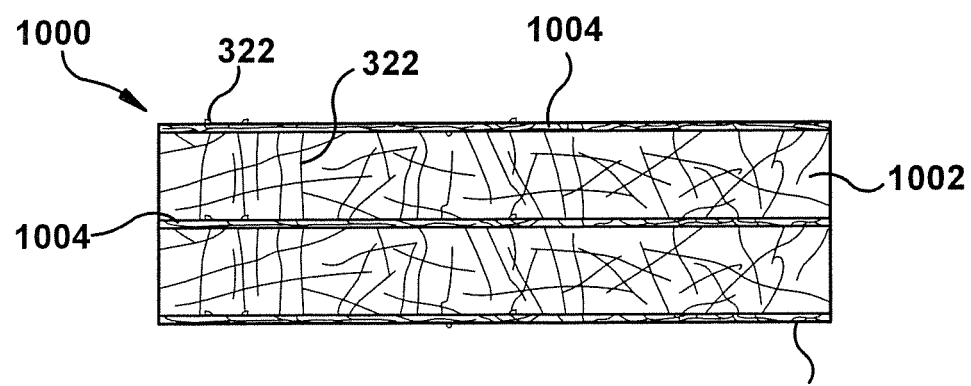
FIG. 10C is a schematic illustration of an exemplary embodiment of an insulation product.

FIGS. 10A-10C illustrate exemplary embodiments of insulation products 1000 that include one or more thick light density cores 1002 and one or more thin high density tensile layer(s) 1004. The thick light density core 1002 can take a wide variety of different forms. For example, the light density core 1002 can be made from any of the low area weight packs described above. In one exemplary embodiment, the light density core 1002 is made from fiberglass fibers that are needled and/or layered. In one exemplary embodiment, the light density core 1002 is binderless. In another exemplary embodiment, fibers 322 of the light density core are bonded together by binder.

The thin high density tensile layer 1004 can take a wide variety of different forms. In one exemplary embodiment, the thin high density tensile layer 1004 is made from fiberglass fibers that are needled together. However, fibers of the high density tensile 1000 can be processed with other processes and/or products to accomplish the appropriate tensile strength. In one exemplary embodiment, the high density tensile layer 1004 is made from the high density pack 300 of the FIG. 3D embodiment.

In an exemplary embodiment, the high density tensile layer(s) 1004 is attached to the light density core 1002. The high density tensile layer(s) 1004 may be attached to the light density core 1002 in a wide variety of different ways. For example, the layers 1002, 1004 may be attached to one another with an adhesive, by an additional needling step, by heat bonding (when one or both of the layers 1002, 1004 include a binder), and the like. Any way of attaching the layers to one another can be employed. In an exemplary embodiment, the layers 1002, 1004 provide distinct properties to the insulation product 1000.

In an exemplary embodiment, the thick, light density layer 1002 provides a high thermal resistance value R, but has a low tensile strength and the thin high density tensile layer 1004 provides a low thermal resistance value R, but a high tensile strength. The combination of the two layers provides an insulation product 1000 with both a high tensile strength and a high R value.

Figure 10D:
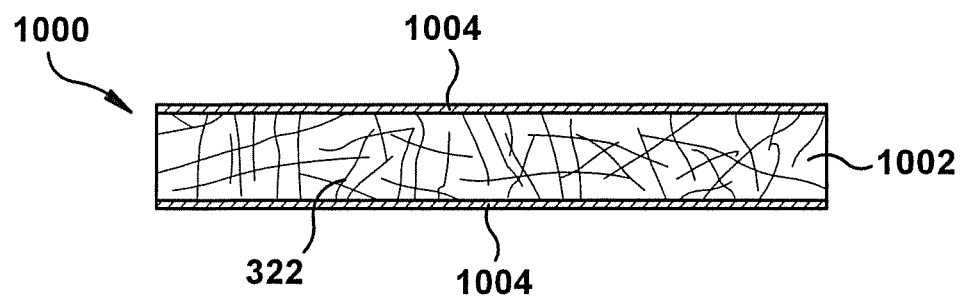
FIG. 10D is a schematic illustration of an exemplary embodiment of an insulation product.
Figure 10E:
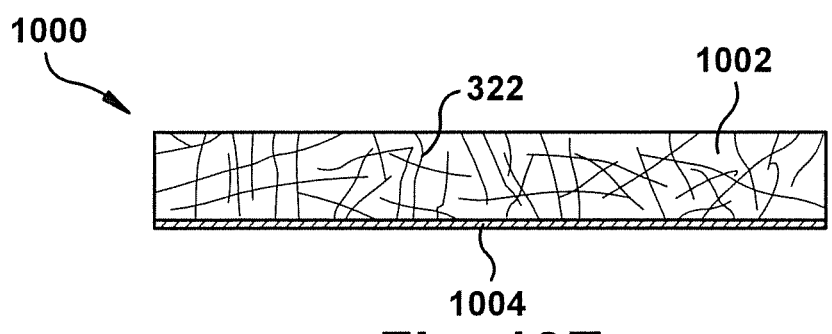
FIG. 10E is a schematic illustration of an exemplary embodiment of an insulation product.
Figure 10F:
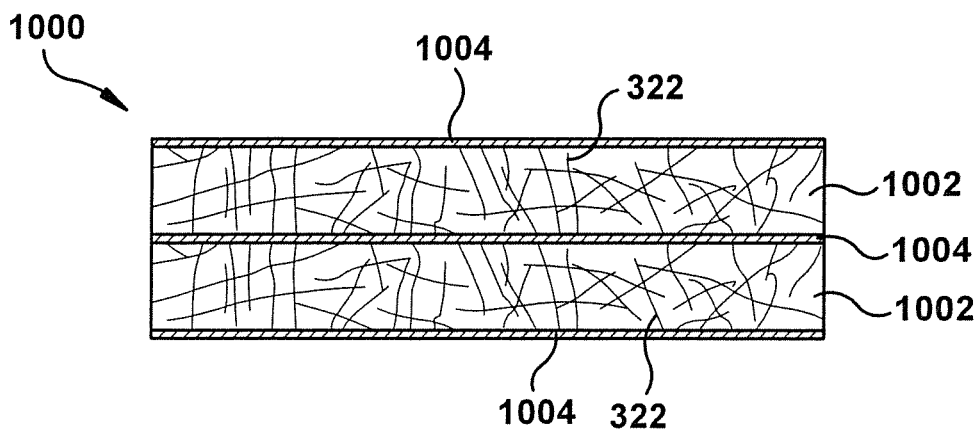
FIG. 10F is a schematic illustration of an exemplary embodiment of an insulation product.

FIGS. 10D-10F illustrate exemplary embodiments of insulation products 1000 that include one or more thick light density cores 1002 and one or more thin facing layer(s) 1004. The thick light density core 1002 can take a wide variety of different forms as described with respect to the embodiment illustrated by FIGS. 10A-10C. The facing layers 1004 can take a wide variety of different forms. The material of the facing layer 1004 can be selected to provide a wide variety of different properties to the insulation product. For example, the facing material may be selected to provide a desired amount of strength, reflectivity, acoustic performance, water impermeability, and/or vapor impermeability to the insulation product. The facing layer can be made from a wide variety of different materials including, but not limited to, plastic, metal foil, scrim, paper, combinations of these materials and the like. Any known facing layer may be used.

In an exemplary embodiment, the facing layer(s) 1004 is attached to the light density core 1002. The facing layer(s) 1004 may be attached to the light density core 1002 in a wide variety of different ways. For example, the layers 1002, 1004 may be attached to one another with an adhesive, by heat bonding, and the like. Any way of attaching the layers to one another can be employed. In an exemplary embodiment, the layers 1002, 1004 provide distinct properties to the insulation product 1000. In an exemplary embodiment, the thick, light density layer 1002 provides a high thermal resistance value R, but has a low tensile strength and the facing layer 1004 provides tensile strength and other properties.

Figure 10G:
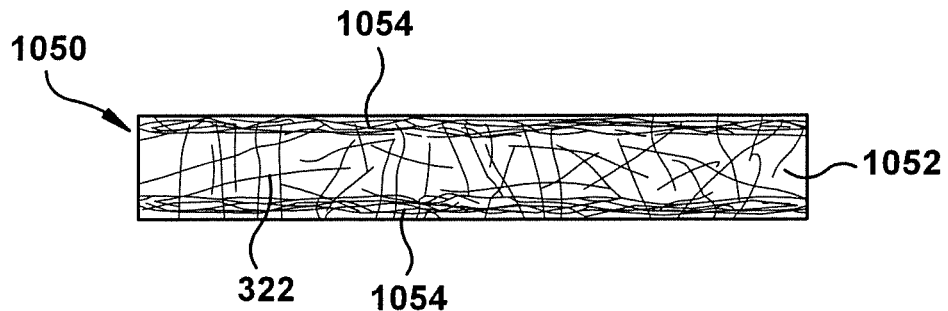
FIG. 10G is a schematic illustration of an exemplary embodiment of an insulation batt or pack.
Figure 10H:
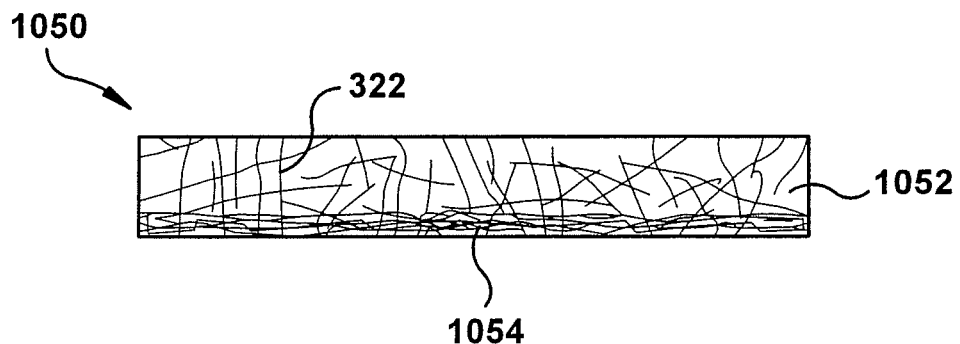
FIG. 10H is a schematic illustration of an exemplary embodiment of an insulation batt or pack.
Figure 10I:
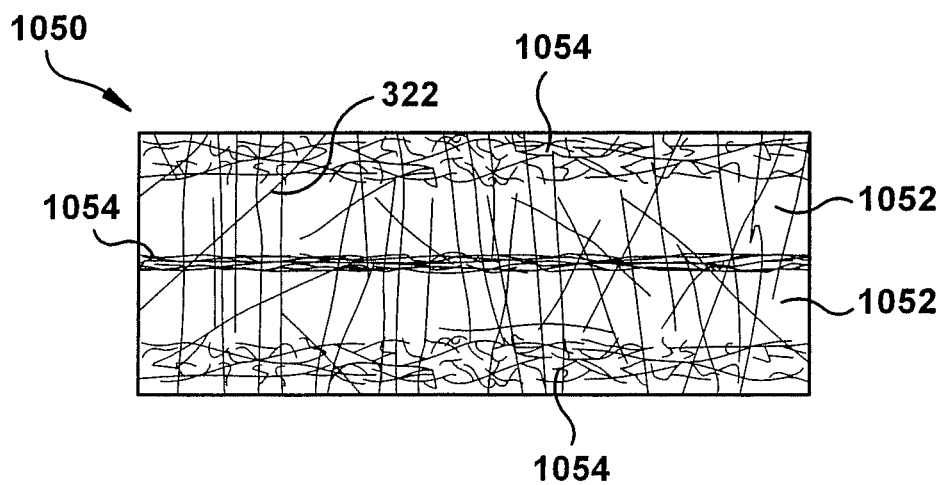
FIG. 10I is a schematic illustration of an exemplary embodiment of an insulation ban or pack.

The examples illustrated by FIGS. 10G-10I is described in terms of strata having different densities. However, the strata may have different properties, which may or may not include different densities. These varying properties may be achieved by varying the density of fibers, the fiber length, the fiber diameter, and/or the fiber type through the thickness of the pack. FIGS. 10G-10I illustrate an exemplary embodiments of stratified batts or packs 1050 that include one or more light density strata 1052 and one or more high density strata 1054. However, the transition between a light density stratum 1052 and a high density stratum 1054 may be gradual. In the examples illustrated by FIGS. 10A-10F, the insulation products 1000 are formed from separate layers. In the exemplary embodiment illustrated by FIGS. 10G-10I, the stratified batts or packs 1050 are formed with varying properties through the thickness of the batt or pack. The light density stratum 1052 can take a wide variety of different forms. For example, the light density stratum 1052 can be made in the same manner that any of the low area weight packs described above are made. In one exemplary embodiment, the light density stratum 1052 is made from fiberglass fibers. In one exemplary embodiment, the light density stratum 1052 is binderless. In another exemplary embodiment, fibers 322 of the light density stratum 1052 are bonded together by binder.

The thin high density stratum 1054 can take a wide variety of different forms. In one exemplary embodiment, the high density stratum 1054 is made from fiberglass fibers that are needled together. However, fibers of the high density stratum 1054 can be processed with other processes and/or products to accomplish the appropriate tensile strength. In one exemplary embodiment, the high stratum 1054 is made in the same manner that the high density pack 300 of the FIG. 3D embodiment is made.

In an exemplary embodiment, the fibers of the high density stratum 1054 are attached to and/or entangled with the fibers of the light stratum 1052. Fibers of the high density stratum 1054 may be attached to fibers of the light density stratum 1052 in a wide variety of different ways. For example, the fibers of the strata 1002, 1004 may be attached to one another with adhesive, such as binder that is applied to the pack and/or by needling that is performed as the pack 1050 is made, and the like. Any way of attaching and/or entangling the fibers of the strata 1052, 1054 can be employed. In an exemplary embodiment, the strata 1052, 1054 provide distinct properties to the insulation product 1000.

The insulation batts, packs and products of the embodiments of FIG. 10A-10I can be combined with one another. For example, any of the layers of the insulation products illustrated by FIGS. 10A-10F can be stratified, the stratified batts or packs of FIGS. 10G-10I can be provided with one or more facing layers or separate dense layers, etc. A wide variety of different insulation configurations can be constructed form the embodiments illustrated by FIGS. 10A-10I.

In an exemplary embodiment, a thick, light density stratum 1052 provides a high thermal resistance value R, but has a low tensile strength and a thin high density tensile stratum 1004 provides a low thermal resistance value R, but a high tensile strength. The combination of the two strata provides a batt or pack 1050 with both a high tensile strength and a high R value. The strata can be configured to provide a variety of different properties to the batt or pack. For example, alternating thin, high density and thick, low density strata results in a batt or pack with excellent acoustic properties.

In one exemplary embodiment, the dry binder can include or be coated with additives to impart desired characteristics to the pack. One non-limiting example of an additive is a fire retardant material, such as for example baking soda. Another non-limiting example of an additive is a material that inhibits the transmission of ultraviolet light through the pack. Still another non-limiting example of an additive is a material that inhibits the transmission of infrared light through the pack.

Referring to FIG. 6 in another embodiment of the method 610 and as discussed above, a flow of hot gases can be created by optional blowing mechanisms, such as the non-limiting examples of annular blowers (not shown) or annular burners (not shown). It is known in the art to refer to the heat created by the annular blowers and the annular burners as the "heat of fiberization". It is contemplated in this embodiment, that the heat of fiberization is captured and recycled for use in other mechanisms or devices. The heat of fiberization can be captured at several locations in the method 610. As shown in FIGS. 6 and 7, duct work 670 is configured to capture the heat emanating from the fiberizers 618 and convey the heat for use in other mechanisms, such as for example the optional curing oven 650. Similarly, duct work 672 is configured to capture the heat emanating from the flow of hot gases within the duct 30 and duct work 674 is configured to capture the heat emanating from the forming apparatus 632a and 632b. The recycled heat can also be used for purposes other than the forming of fibrous packs, such as for example heating an office In certain embodiments, the duct 630 can include heat capturing devices, such as for example, heat extraction fixtures configured to capture the heat without significantly interfering with the momentum of the flow of the hot gasses and entrained glass fibers 622. In other embodiments, any desired structure, device or mechanism sufficient to capture the heat of fiberization can be used.

Referring to FIG. 6 in another embodiment of the method 610, fibers or other materials having other desired characteristics can be mixed with glass fibers 622 entrained in the flow of gasses. In this embodiment, a source 676 of other materials, such as for example, synthetic or ceramic fibers, coloring agents and/or particles can be provided to allow such materials to be introduced into a duct 678.

The duct 678 can be connected to the duct 630 such as to allow mixing with the glass fibers 622 entrained in the flow of gasses. In this manner, the characteristics of the resulting pack can be engineered or tailored for desired properties, such as the nonlimiting examples acoustic, thermal enhancing or UV inhibiting characteristics.

In still other embodiments, it is contemplated that other materials can be positioned between the layers deposited by the cross-lapping mechanisms 634a and 634b on the first conveyor 636. The other materials can include sheet materials, such as for example, facings, vapor barriers or netting, or other non-sheet materials including the non-limiting examples of powders, particles or adhesives. The other materials can be positioned between the layers in any desired manner. In this manner, the characteristics of the resulting pack can be further engineered or tailored as desired.

While the embodiments shown in FIG. 6 illustrates the application of a dry binder by the binder applicator 646, it should be appreciated that in other embodiments, the dry binder can be applied to the glass fibers 622 entrained in the flow of gasses. In this embodiment, a source 680 of dry binder can be introduced into a duct 682. The duct 682 can be connected to the duct 630 such as to allow mixing of the dry binder with the glass fibers 622 entrained in the flow of gasses. The dry binder can be configured to attach to the glass fibers in any desired manner, including by electrostatic processes.

While the embodiment illustrated in FIG. 6 illustrates use of the continuous web by the cross-lapping mechanisms 634a and 634b, it should be appreciated that in other embodiments, the web can be removed from the forming apparatus 632a and 632b and stored for later use.

As discussed above, optionally the trimmed materials can be returned to the flow of gasses and glass fibers in the ducts 630 and recycled in the forming apparatus 632a and 632b. In an exemplary embodiment, when an optional binder is included in the pack, the operating temperature of the forming apparatus 332a and 332b is kept below the softening temperature of the dry binder, thereby preventing the dry binder from curing prior to the downstream operation of the curing oven 550. In this embodiment, the maximum operating temperature of the curing oven 650 is in a range of from about 165° F. to about 180° F. In other embodiments, the maximum operating temperature of the curing oven 650 can be less than about 165° F. or more than about 180° F.

Figure 11:
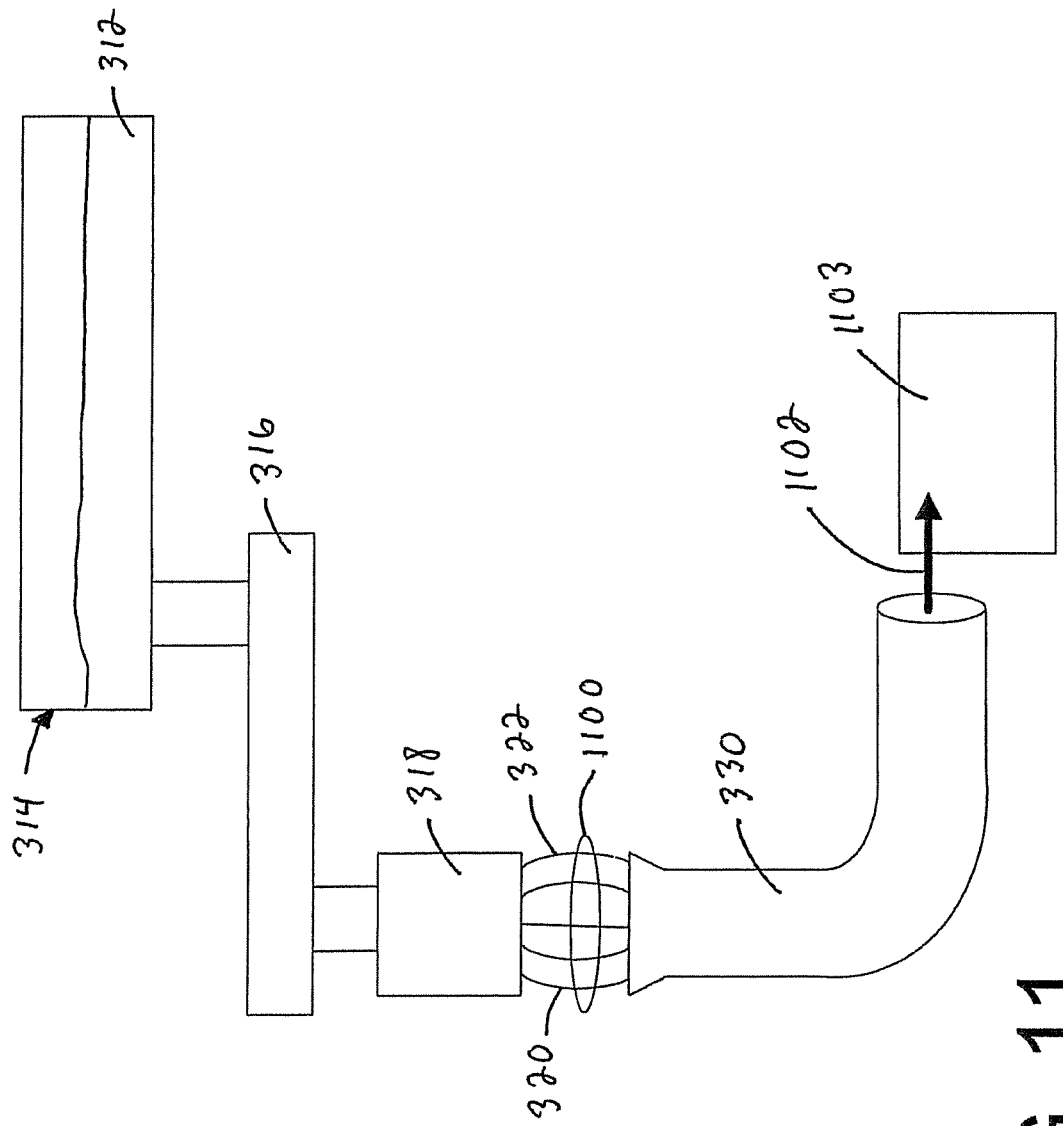
FIG. 11 is a schematic illustration of an arrangement for producing staple fibers.

In one exemplary embodiment, the long, thin fibers 322 described herein are used in other applications than described above. For example, FIG. 11 illustrates that the long, thin glass fibers 322 described above can be provided as staple fibers that are air laid, carded or otherwise processed for use in a wide variety of different applications, rather than being formed into a web and/or a pack. In one application, the unbonded staple fibers are blended with aramid fibers, such as Kevlar and Konex, and/or with thermal bonding fibers, such as Celbond. These blended fibers may be used to form a staple yarns and/or dry laid non-woven materials.

In the FIG. 11 embodiment a melter 314 supplies molten glass 312 to a forehearth 316. The molten glass 312 is processed to form glass fibers 322. The molten glass 312 can be processed in a variety of different ways to form the fibers 322. For example, rotary fiberizers 318 receive the molten glass 312 and subsequently form veils 320 of glass fibers 322. Any desired fiberizer, rotary or otherwise, sufficient to form long and thin glass fibers 322 can be used.

Referring to FIG. 11, an applicator 1100 applies a lubricant, also referred to as a sizing, is applied to the unbonded glass fibers. In the illustrated embodiment, the sizing is applied to the glass fibers beneath the fiberizer. However, in other embodiments, the sizing is applied to the glass fibers at other locations, such as in the duct 330. The sizing strengthens and/or provides lubricity to the fibers that aid in the processing of the fibers, such as needling or carding of the fibers. The unbonded staple fibers 322 are provided at the outlet of the duct 330 as indicated by arrow 1102 where the fibers are collected in a container 1103 for use in a variety of different applications, either by themselves or in combination with other fibers, such as aramid fibers.

The sizing may take a wide variety of different forms. For example, the sizing may comprise silicone and/or silane. However, any sizing may be employed depending on the application. The sizing may be adjusted based on the application the glass fibers are to be used in.

The small fiber diameter and the long fiber length allow the sized fibers to be used in applications where the fibers could not previously be used, due to excessive breakage of the fibers. In one exemplary embodiment, a fiber 322 having an approximately four micron diameter has a better flexural modulus and resulting strength than conventional fibers, because the finer fiber bends more easily without breaking. This improved flexural modulus and strength of the fiber help the fiber to survive processes that are typically destructive to conventional fibers, such as carding and air laid processes. In addition, the fine diameter of the glass fibers improves both thermal and acoustic performance.

The glass webs, packs, and staple fibers can be used in a wide variety of different applications. Examples of applications include, but are not limited to, heated appliances, such as ovens, ranges, and water heaters, heating, ventilation, and air conditioning (HVAC) components, such as HVAC ducts, acoustic insulating panels and materials, such as acoustic insulating panels for buildings and/or vehicles, and molded fiberglass components, such as compression molded or vacuum molded fiberglass components. In one exemplary embodiment, heated appliances, such as ovens, ranges, and water heaters, heating, HVAC components, such as HVAC ducts, acoustic insulating panels and materials, such as acoustic insulating panels for buildings and/or vehicles, and/or molded fiberglass components, such as compression molded or vacuum molded fiberglass components use or are made from a binderless fiberglass pack made in accordance with one or more of the embodiments disclosed by the present patent application. In an exemplary embodiment, since the fiberglass pack is binderless, there is no formaldehyde in the fiberglass pack. In one exemplary embodiment, heated appliances, such as ovens, ranges, and water heaters, heating, HVAC components, such as HVAC ducts, acoustic insulating panels and materials, such as acoustic insulating panels for buildings and/or vehicles, and/or molded fiberglass components, such as compression molded or vacuum molded fiberglass components use or are made from a dry binder fiberglass pack made in accordance with one or more of the embodiments disclosed by the present patent application. In this exemplary embodiment, the dry binder may be a formaldehyde free or no added formaldehyde dry binder. In a no added formaldehyde binder, the binder itself has no formaldehyde, but formaldehyde may be a byproduct if the binder is burned.

Fiberglass insulation packs described by this patent application can be used in a wide variety of different cooking ranges and in a variety of different configurations in any given cooking range. Published US Patent Application Pub. No. 2008/0246379 discloses an example of an insulation system used in a range. Published US Patent Application Pub. No. 2008/0246379 is incorporated herein by reference in its entirety. The fiberglass packs described herein can be used in any of the heating appliance insulation configurations described by Published US Patent Application Pub. No. 2008/0246379, including the configurations labeled prior art. FIGS. 12-14 correspond to FIGS. 1-3 of Published US Patent Application Pub. No. 2008/0246379.

Figure 12A:
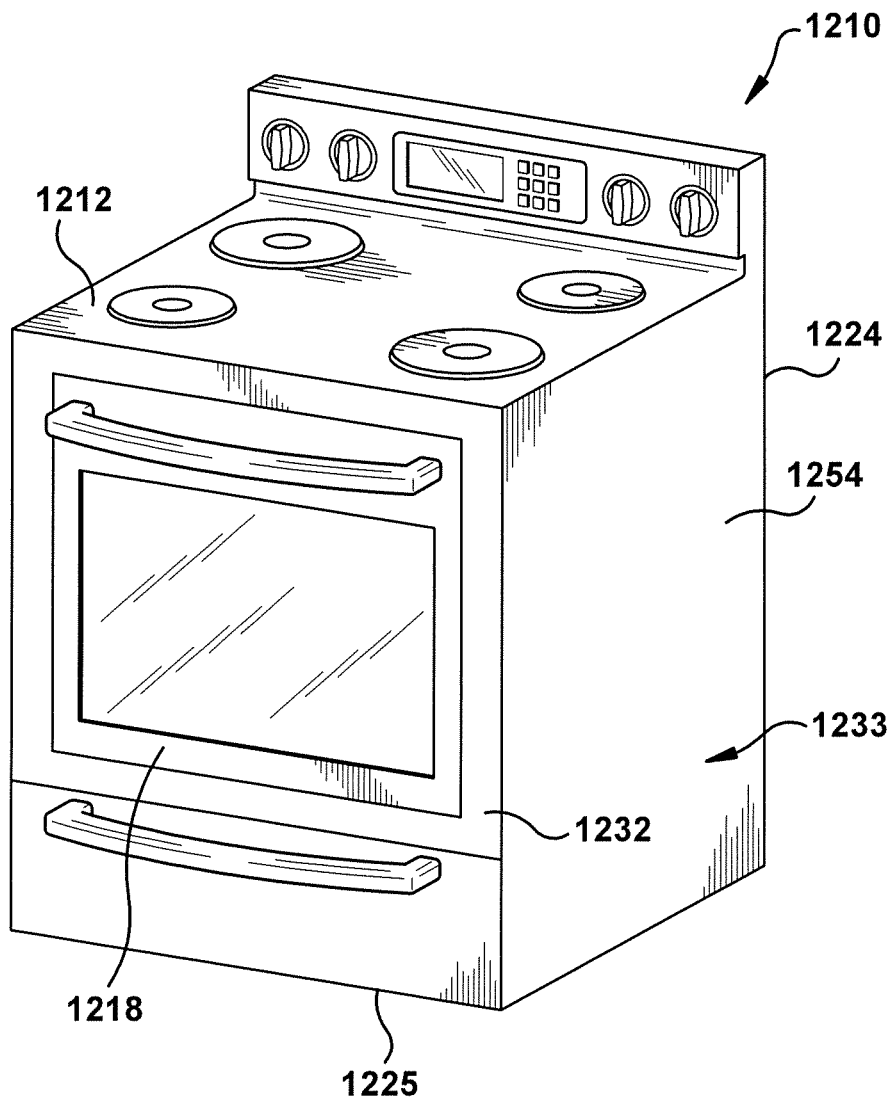
FIG. 12A is a perspective view of a cooking range.
Figure 12B:
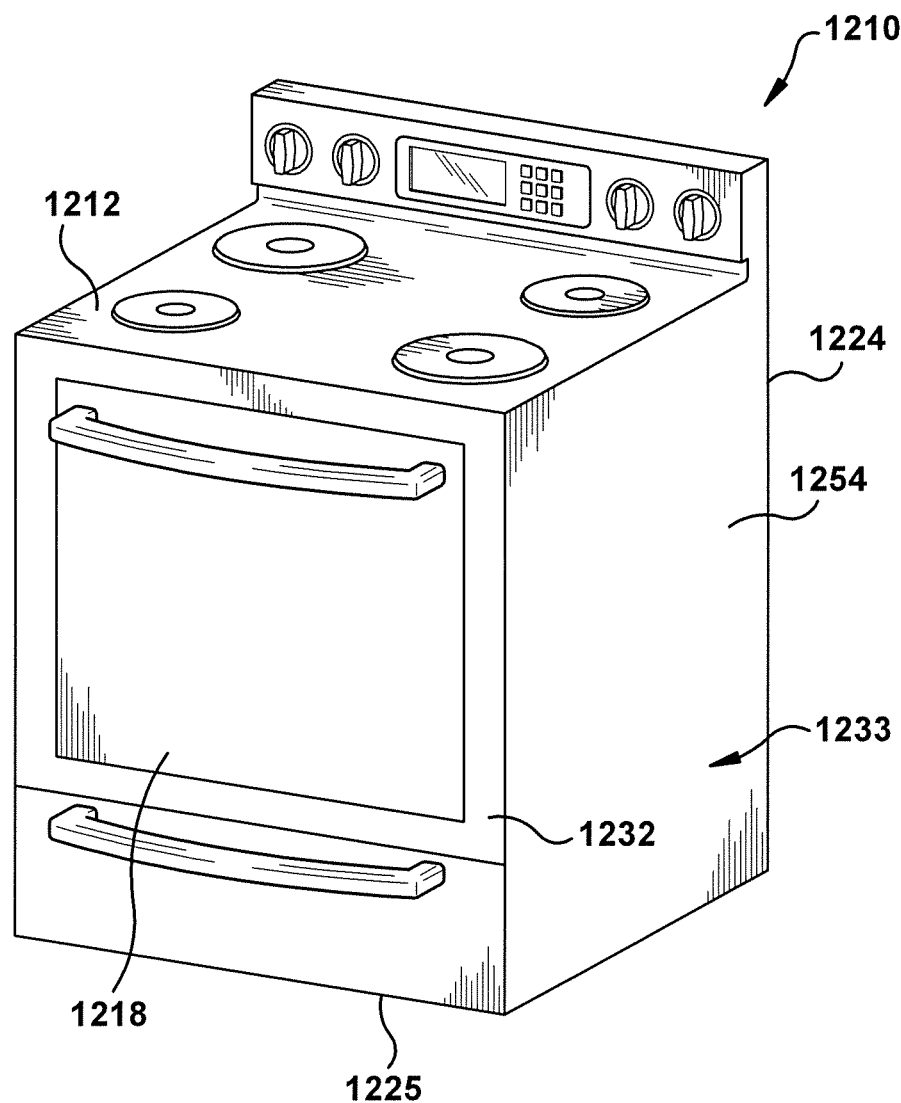
FIG. 12B is a perspective view of a cooking range.

Referring to FIG. 12A a thermal oven 1210 includes a substantially flat, top cooking surface 1212. As shown in FIGS. 12-14, the thermal oven 1210 includes a pair of opposed side panels 1252 and 1254, a back panel 1224, a bottom panel 1225, and a front panel 1232. The opposed side panels 1252 and 1254, back panel 1224, bottom panel 1225, front panel 1232 and cooking surface 1212 are configured to form an outer oven cabinet 1233. The front panel 1232 includes an insulated oven door 1218 pivotally connected to the front panel 1232. The oven door 1218 is hinged at a lower end to the front panel 1232 such that the oven door can be pivoted away from the front panel 1232 and the oven cavity 1216. In the example illustrated by FIG. 12A, the oven door 1218 includes a window. In the example illustrated by FIG. 12B, the oven door 1218 does not include a window and the entire interior of the door is provided with insulation.

As shown in FIGS. 13 and 14, the outer oven cabinet 1233 supports an inner oven liner 1215. The inner oven liner 1215 includes opposing liner sides 1215a and 1215b, a liner top 1215c, a liner bottom 1215d and a liner back 1215e. The opposing liner sides 1215a and 1215b, liner top 1215c, liner bottom 1215d, liner back 1215e and oven door 1218 are configured to define the oven cavity 1216.

As further shown in FIGS. 13 and 14, the exterior of the oven liner 1215 is covered by insulation an insulation material 1238, that can be made in accordance with any of the embodiments disclosed in this application. The oven door 1238 may also be filled with insulation material 1238, that can be made in accordance with any of the embodiments disclosed in this application. The insulation material 1238 is placed in contact with an outside surface of the oven liner 1215. The insulation material 1238 is used for many purposes, including retaining heat within the oven cavity 1216 and limiting the amount of heat that is transferred by conduction, convection and radiation to the outer oven cabinet 1233.

Figure 13A:
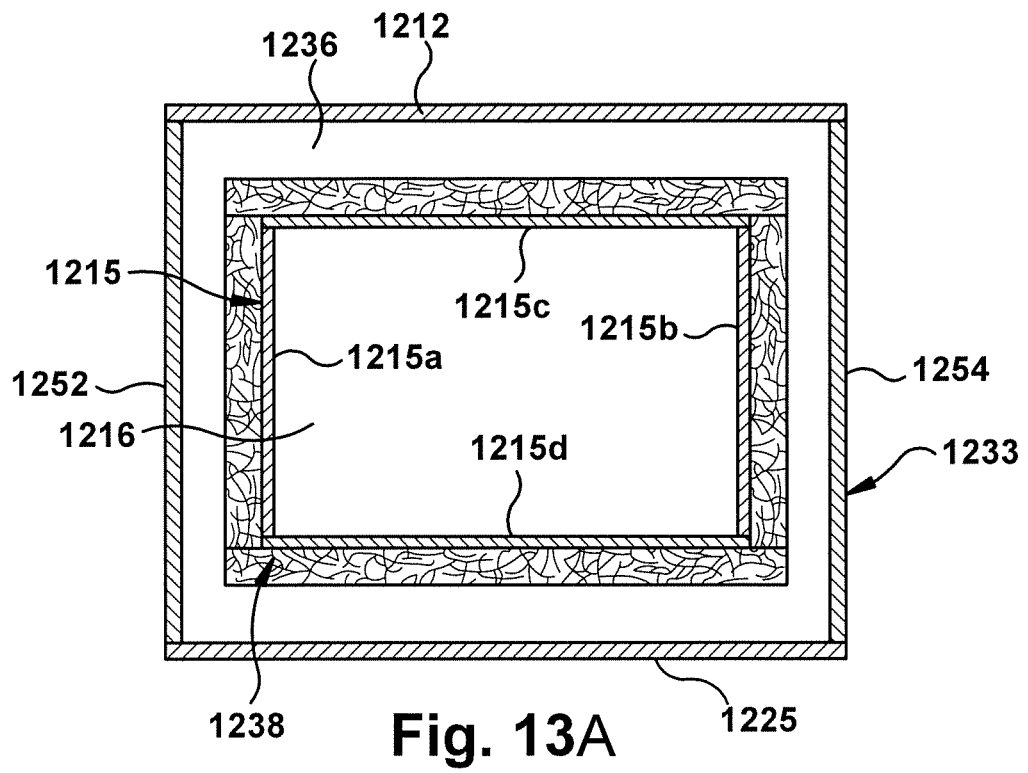
FIG. 13A is a front sectional view illustrating an exemplary embodiment of fiberglass insulation in a range.
Figure 13B:
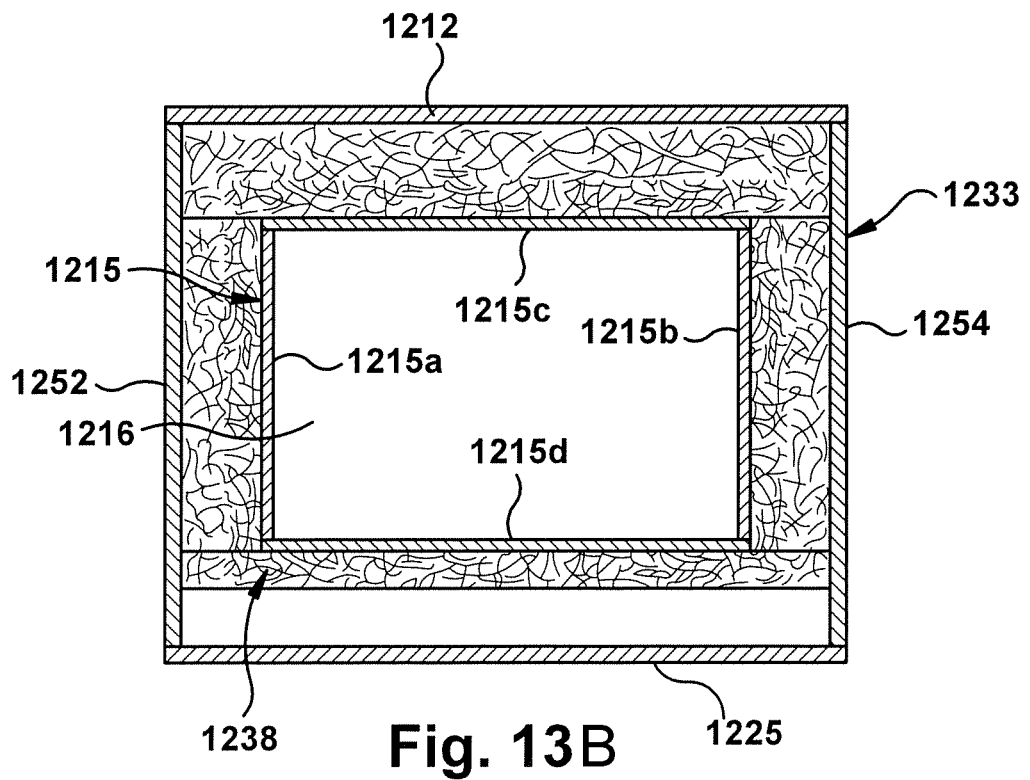
FIG. 13B is a front sectional view illustrating an exemplary embodiment of fiberglass insulation in a range.

As shown in the example illustrated by FIGS. 13A and 14A, an air gap 1236 is formed between the insulation material 1238 and the outer oven cabinet 1233. The air gap 1236 is used as a further insulator to limit the conductive heat transfer between oven liner 1215 and the outer oven cabinet 1233. The use of the air gap 1236 supplements the insulation material 1238 to minimize the surface temperatures on the outer surfaces of the outer oven cabinet 1233. As shown in the example illustrated by FIGS. 13B and 14B, the insulation material 1238 may be sized such that no air gap is formed between the insulation material 1238 and the outer oven cabinet 1233. That is, in the FIGS. 13B and 14B embodiment, the insulation layer 1238 completely fills the space between the oven liner 1215 and the outer oven cabinet 1233. In one exemplary embodiment, the insulation material that is used in the configurations illustrated by FIGS. 13A, 13B, 14A, 14B and any of the other configurations disclosed by US Patent Application Pub. No. 2008/0246379 is made from a binderless fiberglass pack made in accordance with one or more of the embodiments disclosed by the present patent application. In an exemplary embodiment, since the fiberglass pack is binderless, there is no formaldehyde in the insulation layer 1238 of the FIGS. 13A, 13B, 14A, and 14B embodiments.

Fiberglass insulation packs described by this patent application can be used in a wide variety of different heating, ventilation, and air conditioning (HVAC) systems, such as ducts of an HVAC system. Further, the insulation packs described by this patent application can be provided in variety of different configurations in any given HVAC ducts. U.S. Pat. No. 3,092,529, Published Patent Cooperation Treaty (PCT) International Publication Number WO 2010/002958 and Pending U.S. patent application Ser. No. 13/764,920, filed on Feb. 12, 2013, all assigned to the assignee of the present application, discloses an examples of fiberglass insulation systems used in a HVAC ducts. U.S. Pat. No. 3,092,529, PCT International Publication Number WO 2010/002958 and Pending U.S. patent application Ser. No. 13/764,920 are incorporated herein by reference in their entirety. The fiberglass packs described herein can be used in any of the HVAC duct configurations described by U.S. Pat. No. 3,092,529, PCT International Publication Number WO 2010/002958 and Pending U.S. patent application Ser. No. 13/764,920.

In one exemplary embodiment, the insulation material that is used in the HVAC ducts disclosed by U.S. Pat. No. 3,092,529, PCT International Publication Number WO 2010/002958 and Pending U.S. patent application Ser. No. 13/764,920 is constructed from a dry binder fiberglass pack made in accordance with one or more of the embodiments disclosed by the present patent application. In this exemplary embodiment, the dry binder may be a formaldehyde free dry binder or a no added formaldehyde dry binder. In a no added formaldehyde binder, the binder itself has no formaldehyde, but formaldehyde may be a byproduct if the binder is burned.

In one exemplary embodiment, the insulation material that is used in the HVAC ducts disclosed by U.S. Pat. No. 3,092,529, PCT International Publication Number WO 2010/002958 and Pending U.S. patent application Ser. No. 13/764,920 is constructed from a binderless fiberglass pack made in accordance with one or more of the embodiments disclosed by the present patent application. In an exemplary embodiment, since the fiberglass pack is binderless, there is no formaldehyde in the insulation material.

Fiberglass insulation packs described by this patent application can be used in a wide variety of different acoustic applications and can have a variety of different configurations in each application. Examples of Acoustic insulation batts include Owens Corning Sound Attenuation Batt and Owens Corning Sonobatts insulation, which can be positioned behind a variety of panels of a building, such as ceiling tiles and wall. U.S. Pat. Nos. 7,329,456 and 7,294,218 describe examples of applications of acoustic insulation and are incorporated herein by reference in their entirety. The fiberglass packs described herein can be used in place of the insulation of the Owens Corning Sound Attenuation Batt and Owens Corning Sonobatts and can be used in any of the applications disclosed by U.S. Pat. Nos. 7,329,456 and 7,294,218. Additional acoustic applications for fiberglass insulation packs described by this patent application include, but are not limited to, duct liner, duct wrap, ceiling panels, wall panels, and the like.

In one exemplary embodiment, an acoustic insulation pack made in accordance with one or more of the embodiments of a binderless pack or dry binder pack disclosed by the present patent application tested according to ASTM C522 within 1,500 feet of sea level has an average airflow resistivity of 3,000-150,000 (mks Rayls/m). In one exemplary embodiment, an acoustic insulation pack made in accordance with one or more of the embodiments of a binderless pack or dry binder pack disclosed by the present patent application tested according to ASTM C423 within 1,500 feet of sea level has a Sound Absorbtion Average (SAA) in the range of 0.25 to 1.25. In one exemplary embodiment, an acoustic insulation pack made in accordance with one or more of the embodiments of a binderless pack or dry binder pack disclosed by the present patent application tested according to ISO 354 within 1,500 feet of sea level has a Sound Absorbtion coefficient $\alpha_W$ in the range of 0.25 to 1.25.

TABLE 2

| Test Conditions | |
|---|---|
| Temp. (degrees C.) | 26 |
| Humidity (% Relative Humidity) | 13.3 |
| Barometric Pressure (mmHg) | 732 |
| Binderless Specimen Summary | |
| Thickness (mm) | 17-19.5 |
| Area Density (Kg/m^2) | 0.9-1.1 |
| Density (Kg/m^3) | 55-60 |
| Test Results | |
| Average Specific Airflow Resistance (mks Rayls) | 1700-1800 |
| Average Airflow Resistivity (mks Rayls/m) | 90,000-100,000 |

In one exemplary embodiment, the insulation material that is used in place of the insulation of the Owens Corning Sound Attenuation Batt and Owens Corning Sonobatts and/or in any of the applications disclosed by U.S. Pat. Nos. 7,329,456 and 7,294,218 is constructed from a dry binder fiberglass pack made in accordance with one or more of the embodiments disclosed by the present patent application. In this exemplary embodiment, the dry binder may be a formaldehyde free dry binder or a no added formaldehyde dry binder. In a no added formaldehyde binder, the binder itself has no formaldehyde, but formaldehyde may be a byproduct if the binder is burned.

In one exemplary embodiment, the insulation material that is used in place of the insulation of the Owens Corning Sound Attenuation Batt and Owens Corning Sonobatts and/or in any of the applications disclosed by U.S. Pat. Nos. 7,329,456 and 7,294,218 is constructed from a binderless fiberglass pack made in accordance with one or more of the embodiments disclosed by the present patent application. In an exemplary embodiment, since the fiberglass pack is binderless, there is no formaldehyde in the insulation material.

Fiberglass insulation packs described by this patent application can be used in a wide variety of molded fiberglass products. For example, referring to FIGS. 15A-15C in one exemplary embodiment the binderless and/or dry binder fiberglass packs described by this application can be used to make a compression molded fiberglass product. Referring to FIG. 15A, a binderless or dry binder fiberglass pack 1522 made in accordance with any of the exemplary embodiments described by this application is positioned between first and second mold halves 1502. In one exemplary embodiment, only the binderless or dry binder fiberglass pack 1522 is positioned between the mold halves. That is, not additional materials, such as plastic sheets or plastic resin are molded with the fiberglass pack.

Referring to FIG. 15B, the mold halves compress the fiberglass pack 1522 as indicated by arrows 1504. Heat is optionally applied to the mold halves and/or to the fiberglass pack as indicated by arrows 1506. For example, when the pack 1522 is a binderless fiberglass pack, the mold halves and/or to the fiberglass pack may be heated to a high temperature, such as a temperature above 700 degrees F., such as between 700 degrees F. and 1100 degrees F., and in one exemplary embodiment, about 900 degrees F. When the pack 1522 is a dry binder fiberglass pack, the mold halves and/or to the fiberglass pack may be heated to a lower temperature, such as the melting temperature of the dry binder of the pack.

Referring to FIG. 15C, the mold halves are then moved apart as indicated by arrows 1508 and the compression molded fiberglass part 1510 is removed. In one exemplary embodiment, the compression molded fiberglass part 1510 consists of or consists essentially of only the material of the pack 1522.

In the example illustrated by FIGS. 15A-15C, the compression molded fiberglass part is contoured. However, in other exemplary embodiments the compression molded fiberglass part may be substantially flat. In one exemplary embodiment, the binderless or dry binder compression molded fiberglass part 1610 has a density that is substantially higher than the density of the originally provided fiberglass pack 1522, such as four or more times the density of the originally provided fiberglass pack 1522.

Referring to FIG. 16A-16C, in one exemplary embodiment the binderless and/or dry binder fiberglass packs described by this application can be used to make a vacuum molded fiberglass product. Referring to FIG. 16A, a binderless or dry binder fiberglass pack 1522 made in accordance with any of the exemplary embodiments described by this application is positioned on a vacuum mold component 1602. In one exemplary embodiment, only the binderless or dry binder fiberglass pack 1522 is positioned on the mold component 1602. That is, not additional materials, such as plastic sheets or plastic resin are molded with the fiberglass pack.

Referring to FIG. 16B, the mold component applies a vacuum to the fiberglass pack 1522 as indicated by arrows 1604. Heat is optionally applied to the mold component 1602 and/or to the fiberglass pack as indicated by arrows 1606. For example, when the pack 1522 is a binderless fiberglass pack, the vacuum mold component 1602 and/or to the fiberglass pack 1522 may be heated to a high temperature, such as a temperature above 700 degrees F., such as between 700 degrees F. and 1100 degrees F., and in one exemplary embodiment, about 900 degrees F. When the pack 1522 is a dry binder fiberglass pack, the mold halves and/or to the fiberglass pack may be heated to a lower temperature, such as the melting temperature of the dry binder of the pack.

Referring to FIG. 15C, the vacuum mold component 1602 stops applying the vacuum and the vacuum molded fiberglass part 1610 is removed. In one exemplary embodiment, the compression molded fiberglass part 1610 consists of or consists essentially of only the material of the pack 1522.

In the example illustrated by FIGS. 16A-16C, the vacuum molded fiberglass part is contoured. However, in other exemplary embodiments the vacuum molded fiberglass part may be substantially flat. In one exemplary embodiment, the binderless or dry binder vacuum molded fiberglass part 1610 has a density that is substantially higher than the density of the originally provided fiberglass pack 1522, such as four or more times the density of the originally provided fiberglass pack 1522.

In one exemplary embodiment, the insulation material that is molded in accordance with the embodiment illustrated by FIG. 15A-15C or the embodiment illustrated by FIGS. 16A-16C is made from a binderless fiberglass pack made in accordance with one or more of the embodiments disclosed by the present patent application. In an exemplary embodiment, since the fiberglass pack is binderless, there is no formaldehyde in the compression molded part 1510 or the vacuum molded part of the embodiments illustrated by FIGS. 15A-15C and 16A-16C.

In one exemplary embodiment, the insulation material that is molded in accordance with the embodiment illustrated by FIG. 15A-15C or the embodiment illustrated by FIGS. 16A-16C is made from a dry binder fiberglass pack made in accordance with one or more of the embodiments disclosed by the present patent application. In this exemplary embodiment, the dry binder may be a formaldehyde free dry binder or a no added formaldehyde binder. In a no added formaldehyde binder, the binder itself has no formaldehyde, but formaldehyde may be a byproduct if the binder is burned.

Several exemplary embodiments of mineral fiber webs, packs, and staple fibers and methods of producing mineral fiber webs, packs, and staple fibers are disclosed by this application. Mineral fiber webs and packs and methods of producing mineral fiber webs and packs in accordance with the present invention may include any combination or subcombination of the features disclosed by the present application.

In accordance with the provisions of the patent statutes, the principles and modes of the improved methods of forming a pack from fibrous materials have been explained and illustrated in its preferred embodiment. However, it must be understood that the improved method of forming a pack from fibrous materials may be practiced otherwise than as specifically explained and illustrated without departing from its spirit or scope.

The invention claimed is:

1. A continuous method for forming a pack of glass fibers, the continuous method comprising:
   melting glass into molten glass;
   forming glass fibers from the molten glass;
   forming a binderless web of glass fibers from the glass fibers, the binderless web of glass fibers having a thickness of 0.1 to 0.5 inches;
   lapping the binderless web of glass fibers to form a layered pack of glass fibers, said layered pack of glass fibers consisting essentially of glass fibers, the layered pack of glass fibers is free of any material that may bind the glass fibers together, wherein the layered pack of glass fibers has thickness of 0.75 inches to less than 2 inches and an area weight within the range of 0.10 pounds per square foot to 0.38 pounds per square foot; and
   mechanically entangling the glass fibers of the layered pack of glass fibers, wherein the mechanically entangling comprises needling;
   wherein the glass fibers have a diameter within the range of 15 to 19 hundred-thousandths of an inch;
   wherein the glass fibers have a length within the range of 0.25 to 10.0 inches; and
   wherein the melting, forming, and lapping steps occur without substantial breaks in production.

2. The continuous method of claim 1 wherein a first portion of the binderless web is disposed at a top surface of the pack, and a second portion of the binderless web is disposed at a bottom surface of the pack.

3. The continuous method of claim 1 wherein the step of lapping the binderless web of glass fibers comprises crosslapping.

4. The continuous method of claim 1, wherein said layered pack of glass fibers has a width of 98.0 inches to 236.0 inches.

5. A continuous method for forming a pack of glass fibers, the continuous method comprising:
   melting glass into molten glass;
   forming glass fibers from the molten glass;
   cooling said glass fibers in an accumulator;
   forming a binderless web of glass fibers from the glass fibers, the binderless web of glass fibers having a thickness of 0.1 to 0.5 inches; and
   lapping the binderless web of glass fibers to form a layered pack of glass fibers, said layered pack of glass fibers comprising 99% to 100% of glass fibers, the layered pack of glass fibers is free of any material that may bind the glass fibers together, wherein the layered pack of glass fibers has thickness of 0.75 inches to less than 2 inches and an area weight within the range of 0.10 pounds per square foot to 0.38 pounds per square foot;
   wherein the glass fibers have a diameter within the range of 15 to 19 hundred-thousandths of an inch;
   wherein the glass fibers have a length within the range of about 0.25 to about 10.0 inches; and.

6. The continuous method of claim 5 wherein a first portion of the binderless web is disposed at a top surface of the pack, and a second portion of the binderless web is disposed at a bottom surface of the pack.

7. The continuous method of claim 5 wherein the step of lapping the binderless web of glass fibers comprises crosslapping.

8. The continuous method of claim 1, wherein said layered pack of glass fibers has a width of 98.0 inches to 236.0 inches.

* * * * *